US008626752B2

(12) United States Patent  (10) Patent No.: US 8,626,752 B2
Fiero  (45) Date of Patent: *Jan. 7, 2014

(54) BROADCAST NETWORK PLATFORM SYSTEM

(75) Inventor: Alex O. Fiero, Loganville, GA (US)

(73) Assignee: Peach Wiz, Inc., Loganville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,878

(22) Filed: Jan. 3, 2011

(65) Prior Publication Data

US 2011/0276555 A1     Nov. 10, 2011

Related U.S. Application Data

(63) Continuation-in-part of application No. 10/252,806, filed on Sep. 23, 2002, now Pat. No. 7,865,498, and a continuation-in-part of application No. 11/858,103, filed on Sep. 19, 2007, now Pat. No. 8,176,028.

(51) Int. Cl.
*G06F 17/30*     (2006.01)
(52) U.S. Cl.
USPC ........................................ 707/723; 707/707
(58) Field of Classification Search
USPC ................................. 707/723, 707
See application file for complete search history.

(56) References Cited

U.S. PATENT DOCUMENTS

| | | | | |
|---|---|---|---|---|
| 6,484,199 B2* | 11/2002 | Eyal | | 709/223 |
| 7,162,493 B2* | 1/2007 | Weiss et al. | | 1/1 |
| 7,865,366 B2* | 1/2011 | Johnson et al. | | 704/260 |
| 8,032,580 B2* | 10/2011 | Slik | | 709/201 |
| 2006/0089912 A1* | 4/2006 | Spagna et al. | | 705/51 |
| 2006/0141962 A1* | 6/2006 | Forbes et al. | | 455/186.1 |
| 2007/0277205 A1* | 11/2007 | Grannan | | 725/80 |
| 2007/0282909 A1* | 12/2007 | Watson et al. | | 707/104.1 |
| 2011/0320568 A1* | 12/2011 | Slik | | 709/217 |

* cited by examiner

*Primary Examiner* — Debbie Le
(74) *Attorney, Agent, or Firm* — John C. Smith

(57) ABSTRACT

A system that associates audio and/or video data with one or more calls for action, and manages, queries and displays the audio and video associated with a call for action based on defined or predefined criteria related to the audio and video data. The system selectively updates media files and Metadata from Meta tags, or Metadata feeds. The system spiders the Metadata or Metadata feeds for new Metadata to automate the submission and programming the audio and video data over a network. The system provides users with other call to action options including click to call, literature, order forms, and/or applications. The system optionally schedules audio and video media to target users by time of day, location, device, and other parameters to offer a call to action to different user audiences.

16 Claims, 47 Drawing Sheets

Broadcast Directory Root  Figure 22

Channel:
Please select a broadcast directory and follow broadcast rules for each directory.

| | | |
|---|---|---|
| Business & Industry | Broadcast Rules For: | Business & Industry |
| Classifieds | Broadcast Rules For: | Classifieds |
| Entertainment | Broadcast Rules For: | Entertainment |
| Government | Broadcast Rules For: | Government |
| Leisure & Recreation | Broadcast Rules For: | Leisure & Recreation |
| Reference & Information | Broadcast Rules For: | Reference & Information |
| Services | Broadcast Rules For: | Services |
| Shopping | Broadcast Rules For: | Shopping |

Figure 23

Broadcast Directory Sample Root Broadcast Rules

Channel:
Please select a broadcast directory and follow broadcast rules for each directory.

Business & Industry   Broadcast Rules For:   Business & Industry

Broadcast Directiory Content: Business and Industry Broadcast Directory contains broadcasts about company profiles of corporations, business entities, and commercial enterprises.

Broadcast Directiory Content: Business and Industry Broadcast Directory exists solely to provide official broadcasts for and about corporations and other business entities as well as commercial enterises that offer products and services tobusinesses (B2B) and consumers (B2C). Broadcasts focus on the practical or operational aspects of a business enterprise, with illustrations, information, introductions, announcements about corporations, business entities personnel, policies, mission, history, internal operations, etc.

| | | |
|---|---|---|
| Classifieds | Broadcast Rules For: | Classifieds |
| Entertainment | Broadcast Rules For: | Entertainment |
| Government | Broadcast Rules For: | Government |
| Leisure & Recreation | Broadcast Rules For: | Leisure & Recreation |
| Reference & Information | Broadcast Rules For: | Reference & Information |

Broadcast SUB Directory Sample Root Broadcast Rules

Figure 25

| | |
|---|---|
| Will you be uploading images, video footage or any other items needed to produce your video? | ○ Yes ● No |
| Would you like us to use our in-house images & stock footage? | ○ Yes ● No |
| Voice Over Voice | ● No Preference ○ Male Voice ○ Female Voice |
| Voice Over Script | ( You may enter up to 450 characters. )<br><br>450  Characters left |
| Package | |
| Order Insertion Date | 3/27/2007 11:37:58 AM |
| Broadcast Order Notes & Comments | (any additional comments for clarification) |

Figure 26A
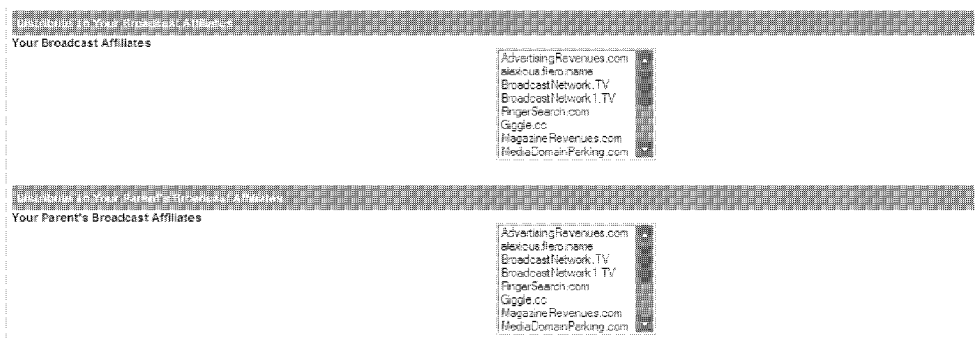
Images and Icons representative of the webpage
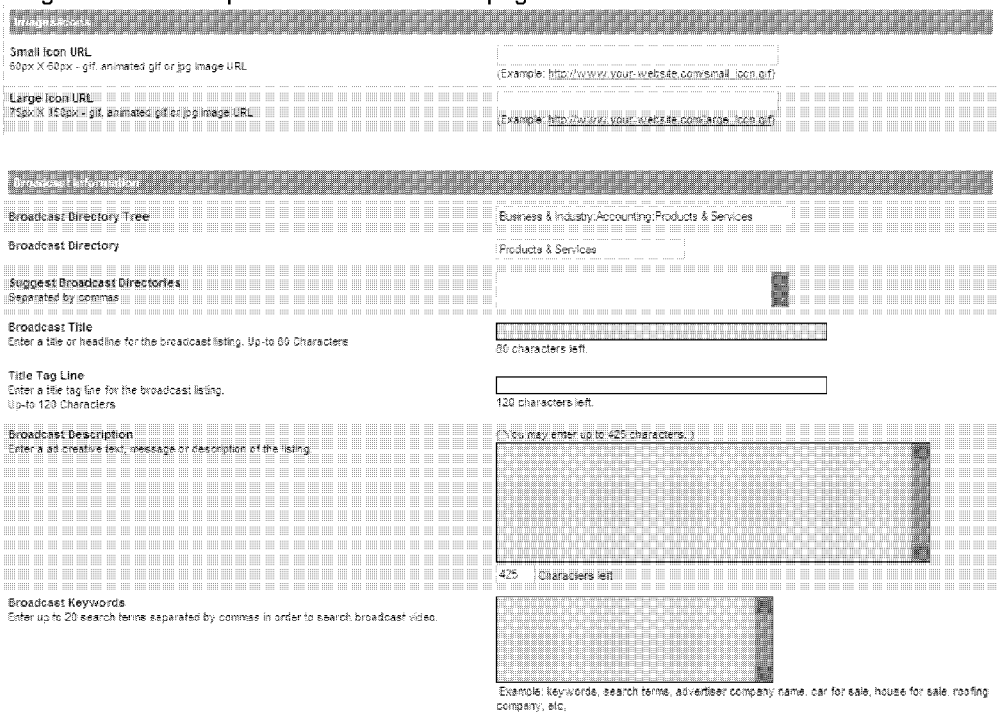

Figure 26B

Other action items representative of the webpage

Figure 28

Enter IP Address
AREA Code
GPS Coordinates

Figure 29

Client Administrative Control Panel

Offline

Figure 40

Request ID # 46
Customer : Darlene
Department : Web Development
The Topic is :

Administrator> Welcome to ISMGOnline.com. Can I help you?

Figure 41

| SEND MESSAGE | SEND COMMAND | CANNED REPLY | CANNED PUSH | CANNED IMAGE | CANNED URL | CANNED EMAIL | GO TO URL | MY LINKS |

Type what you want to say to the customer

Message : [                    ]  Say

Request ID # 46 - Darlene       Topic :
Department : Web Development    Total Session Time :00:28
Session Rating : - Not Rated -

Figure 42

```
Sending Command

Broadcaster: ISMG
Request ID #: 1009
User: Mr. Jones
Topic:  Your product #001

Administrator> Welcome to ISMGOnline.com. Can I help you?
```

Select the command and type the URL that you want to send to the customer

Media: http://www.site.com/mediafile.swf     Send

Image:  :ne        Topic :
URL:    lopment    Total Session Time :03:19
EMail:  ated -

Searchmercial results can be presented on other websites or text based search engines using technologies such as javascript, flash or other available methods.
Results are based on searches or content of the webpages translated into queries and in turn searchmercials results are displayed results

Figure 49

 Searchmercial Title

Searchmercial Description, Searchmercial Description
Searchmercial Description, Searchmercial Description

 Searchmercial Title

Searchmercial Description, Searchmercial Description
Searchmercial Description, Searchmercial Description

 Searchmercial Title

Searchmercial Description, Searchmercial Description
Searchmercial Description, Searchmercial Description

 Searchmercial Title

Searchmercial Description, Searchmercial Description
Searchmercial Description, Searchmercial Description

 Searchmercial Title

Searchmercial Description, Searchmercial Description
Searchmercial Description, Searchmercial Description

BROADCAST NETWORK PLATFORM SYSTEM

CROSS-REFERENCE TO RELATED APPLICATIONS

This Continuation-in-Part application is related to the commonly owned co-pending non-provisional application entitled "Broadcast Network Platform System," filed Sep. 23, 2002, bearing U.S. Ser. No. 10/252,806 and naming Alex Fiero, the named inventor herein, as sole inventor, the contents of which are specifically incorporated by reference herein in their entirety, and the commonly owned co-pending non-provisional application entitled "Broadcast Network Platform System," filed Sep. 19, 2007, bearing U.S. Ser. No. 11/858,103 and naming Alex Fiero, the named inventor herein, as sole inventor, the contents of which are specifically incorporated by reference herein in their entirety.

BACKGROUND OF THE INVENTION

1. Technical Field

The present invention relates to a broadcast network platform system that provides for the integration of traditional television, HDTV (High Definition Television) commercial advertising, multimedia, video conferencing, Internet Search Broadcast System and the Internet all in a centralized richmedia platform. The broadcast network platform is composed of various components including Broadcast Allocation Nodes ("BANs"). The BANs are a unique method of numerically indexing and displaying a variety of conventional data types (i.e. text) as well as alternative data types, such as icons and multimedia, in a numerically indexed system that systematically centralizes, organizes, and classifies networks over the Internet through a single station node. This format is similar to the combination of radio and television broadcasting, but also provides the ability for Network Grouping or Node Grouping. This grouping provides a protocol that allows companies to tie networks, Websites and website links together into relevant groups in a platform that is subdivided into stations, channels, programs and file nodes, and to group subsidiaries, partners, affiliates, subdivisions, or departments into numerically indexed network nodes, providing users an experience similar to television channel switching or channel selection when accessing information on the Internet. The invention facilitates searching the broadcast network platform system through the use of searchmercials. In particular, the invention provides a video searchmercial system which uses video commercials designed specifically for online search and directories. The searchmercial provides video or audio data in combination with a call to action.

2. Background Art

With the advent of very large global computer networks, such as the Internet, individual users have an enormous amount of information available to them. Unfortunately, there is so much information available that it is difficult to locate the items that may be the most pertinent in terms of the user's interest. In response to this problem, a variety of search engines have been developed to assist users in locating the information they are seeking.

However, search engines are not charities. They are profit-making service provided by businesses. Because they have always been the busiest sites on the Web, entrepreneurs were prepared to invest in search engines at the outset on the theory that a high-volume of traffic could be used to generate a revenue stream. As proprietors of search engines sought ways to generate revenue from the traffic at their web site, they found that direct payment by visitors was unpopular and would result in a substantial loss of traffic. As a result, search engines inevitably turned to alternative ways of earning revenue. One of the most effective methods of generating revenue is through advertisements placed on the Web pages. Search engines have found that companies are willing to pay for advertising space for a variety of services, such as placing the company's brand names on the web portal's screen and/or through the use of banner advertising. However, a disadvantage associated with this strategy is that Web users dislike advertising which impacts performance by consuming communication bandwidth. Another disadvantage associated with this type of advertising is that in difficult economic times, such as occurred with the collapse of many Internet companies, advertisers were reluctant to spend substantial amounts on banner advertisements. As a result, the generation of advertising revenue through direct placement of advertisements on search engine Web pages has become more difficult.

With the decline of advertising revenue from direct placement of advertisements, the operators of search engines have turned to alternative methods of charging website owners a fee. In particular, Web site owner's seeking to direct traffic to their sites are willing to pay search engine operators in return for boosting their rankings in search results. As a practical matter, an advertiser's ranking in the search results is critically important since it directly relates to the probability that the searcher will actually get to the advertiser's entry in the search results, and potentially visit the site. Likewise, the lower an advertiser's rankings are, the less likely it is that a searcher will visit their site. The practice of paying for placement enables companies to ensure higher ranking for their sites than they might objectively deserve. Because of its effectiveness, the practice of paying for enhanced ranking position rapidly became widespread. Unfortunately, this practice introduces a substantial imperfection into the frictionless marketplace that the Web could become, because millions of naive users are being frequently directed to sites that have paid a premium for preferred placement, rather than to sites that may have more pertinent information. In theory, the Web makes it possible for customers to locate the best supplier, but it can only deliver on that promise if the search process is objective. When search results are artificially distorted by the paid alteration of ranking results, the Web is unable to deliver the best search results for the searcher, and instead becomes a tool for entities with more resources to effectively monopolize the marketplace. In addition to the use of artificially altered rankings as they relate to direct sales of products, paying for placement in search results also distorts the Web as a medium for the unfettered dissemination of ideas. For example, if powerful institutions such as governments and large corporations can influence the outcome of Web searches, they can effectively ensure that some voices are rarely heard.

A recent substantial change in Web use has been the rapid shift in the use of the Web by television broadcasters. Due to rapid increases in communications bandwidth, there is an increasingly large audience for high bandwidth Internet television. This usage is growing exponentially and represents an opportunity for television broadcasters to greatly expand their reach to the ultimate consumers of their products. It would be advantageous to have a method that allows an individual to have easy access to a multitude of broadcast outlets from a single Web portal. Today, there is intense competition by the developers of video content over video and multimedia standards. As a result, the current versions of these formats are often incompatible and the market suffers from their incompatibility. It would be desirable to have a network system capable of providing the necessary structure and application system to allow the various developing technologies, which are otherwise incompatible, to function together and provide rich new media, video, and multimedia content, and which further could be simultaneously presented as search results via a single search engine.

Another change in the nature of search engines has been the need to handle multiple types of data, in particular, video data. Recently, video producers and digital creators have witnessed a remarkable transformation in the tools that have begun to flood the current marketplace to create new content. Ten years ago, the ability to work with video data was reserved for those with access to high-end professional digital facilities. Today, digital video camcorders, personal computers and software tools can provide high quality content and production capabilities for a relatively nominal cost. When the personal computer was introduced, it was difficult to imagine that it would have such a profound effect on the professional video production industry. Those most threatened by this new technology argued that new tools running on off-the-shelf computers would never match the capabilities of the proprietary computer "Black Boxes" that were typical of the pre-PC year. They were wrong and we are now entering an age of video workstations. It would be desirable to be able to use the powerful new video technologies, which are now available today by both advertisers and end-users, when they're using search engines.

For nearly two decades, the personal computer revolution has been riding an exponential growth curve, enabled by the phenomenon identified by Moore's Law, which postulates that the number of transistors on a chip design doubles every 18 months. This has resulted in the development of nominally priced notebook computers that offer digital video production capabilities to virtually anyone. In addition, the multimedia products generated by these machines can be used on the Web by anyone who has a Web site. Today, we live in the infancy stage of the convergence of multiple media types. As a result, video data is now just another form of information. Anyone with the capability to produce video can also acquire a channel from a station that provides video streaming capabilities. The network broadcasting business is no longer defined by traditional broadcast platforms. It would be advantageous to have the ability to deliver any type of broadcast data on the Web and to provide traditional broadcast media via an entirely new technological area for delivery of their product. More importantly, it would be very advantageous to provide this video data as just another type of data that is presented as the result of a search.

One problem faced by Web sites is that the Meta tags used by search engines today focus on text based information. Of course, a principal advantage of global networks, such as the Internet, is that they allow the transfer of large amounts of data through video or multimedia information. By focusing on textual data types, conventional search engines fail to take advantage of the inherent information rich media, which data types such as audio, video, and multimedia, provide. Currently, there are no Meta tags specifically designed for use with icons, URLs for streaming multimedia data, or multimedia audio tags. In order to make this type of data available to search engines, the search engines would first have knowledge of, and access to Meta tags specifically designed for those types of data. Unfortunately, these Meta tags do not exist at present. It would be advantageous to provide a search system that is able to use multimedia Meta tags that allow the search engine to search different types of multimedia data, and to provide a search results list that contains any combination of text, icons, audio, video, and/or multimedia.

Another disadvantage of conventional search engines is that they typically provide a list of text results describing potentially interesting sites with links to those sites. Unfortunately a substantial amount of time can be wasted in the linking process, only to find that the site that was linked to is of no interest to the searcher. A main reason for this is due to the fact that text based search results are limited to a certain number of characters per search result and cannot properly inform the searcher of the contents of the landing page link. Not only does linking to the Web site waste time and effort, sometimes the site which is linked to does not allow the searcher to return to the search list. This causes an even greater waste of the user's time by disrupting the search, which may have taken considerable time to execute; and, which now may have to be re-executed from the beginning. It would be advantageous to have a search engine that allows the searcher to examine data, including multimedia, audio, and video data from a potential linking site that can give a more informative message without actually leaving the search results Web page.

One of the quickest ways to pull lots of prospects to your web site is to get listed prominently in search engines. Unfortunately, with over one billion sites catalogued around the web, your message can get lost in the crowd or appear to be all the same. Prior art organic search engines today consist of text based results and text based search ads, the text based search ads help search engines monetize the organic portions of their business. Users today are confronted with an average of 255 characters per individual search result to decide whether or not linking to a website is warranted. It would be desirable to provide search results with a substantial amount of information as part of the search result so that the searcher could make a better decision as to whether to link to a particular site.

Prior art video search systems that scour the web for video content are designed to find video on the web, and either show a portion of the content, the whole content or a link where the content is located. Some prior art systems and methods for generating and providing previews of electronic files such as web files scours the web for content, then imports a portion of the content and makes it available on search results. If they were to scour the web and find a video, it will capture a portion of the video (a couple of seconds) in hopes that when the user searches and sees a portion of the video it would link to the video file in order to see the rest of the video or the full video, or webpage or image. At no time is there a communication strategy directing a user to a desired URL such as an order form, subscription form, shopping cart, home page, literature, click to call application, email the video owner, etc.

While the prior art has attempted to provide a variety of methods to search the Web, it has failed to provide a multimedia search system which provides Meta tags to allow the search of multimedia, audio and icon data in addition to the text data available by conventional search systems. It has also failed to provide search results containing multiple data types, including text, icons, video, audio, and/or multimedia data into the search results list. It has failed to allow searchers to preview data (which may be an advertisement or information or promotional multimedia files) associated with linkable sites prior to linking to those sites. In addition, it has failed to allow search results to be presented in a variety of formats, including a conventional search list, or a multimedia search list that provides video as part of search results to better inform the user as to the contents of the link, or a multimedia network platform that uses a numeric index to access data. Further, the prior art has failed to provide a method of using searchmercials to provide information to searchers and give them a call to action based on the content of the searchmercial.

BRIEF DESCRIPTION OF THE DRAWINGS

FIG. 22 illustrates a preferred embodiment of a web-based selection menu used to access the broadcast directory.

FIG. 23 illustrates a preferred embodiment of the webpage selection menu used to access the broadcast directory sample root broadcast rules.

In FIG. 25, the video production webpage form is illustrated. This form provides the user with control over the content of video can be used for production.

FIG. 26A-B illustrates a preferred embodiment of the webpage selection menu used to select the distribution according to the user's affiliates, and other action items.

FIG. 28 illustrates a form utilized to submit locational Metadata for video content.

FIG. 29 illustrates the main admin panel for the live video communication service.

FIG. 40 illustrates the administrative communication interface.

FIG. 41 illustrates the administrative communication interface and available communication options.

FIG. 42 illustrates the administrative communication interface and the available options within and communication option.

FIG. 49 illustrates an embodiment where search results can be displayed on other interfaces and receive queries based on search criteria, predetermined criteria.

SUMMARY

Figure 1:
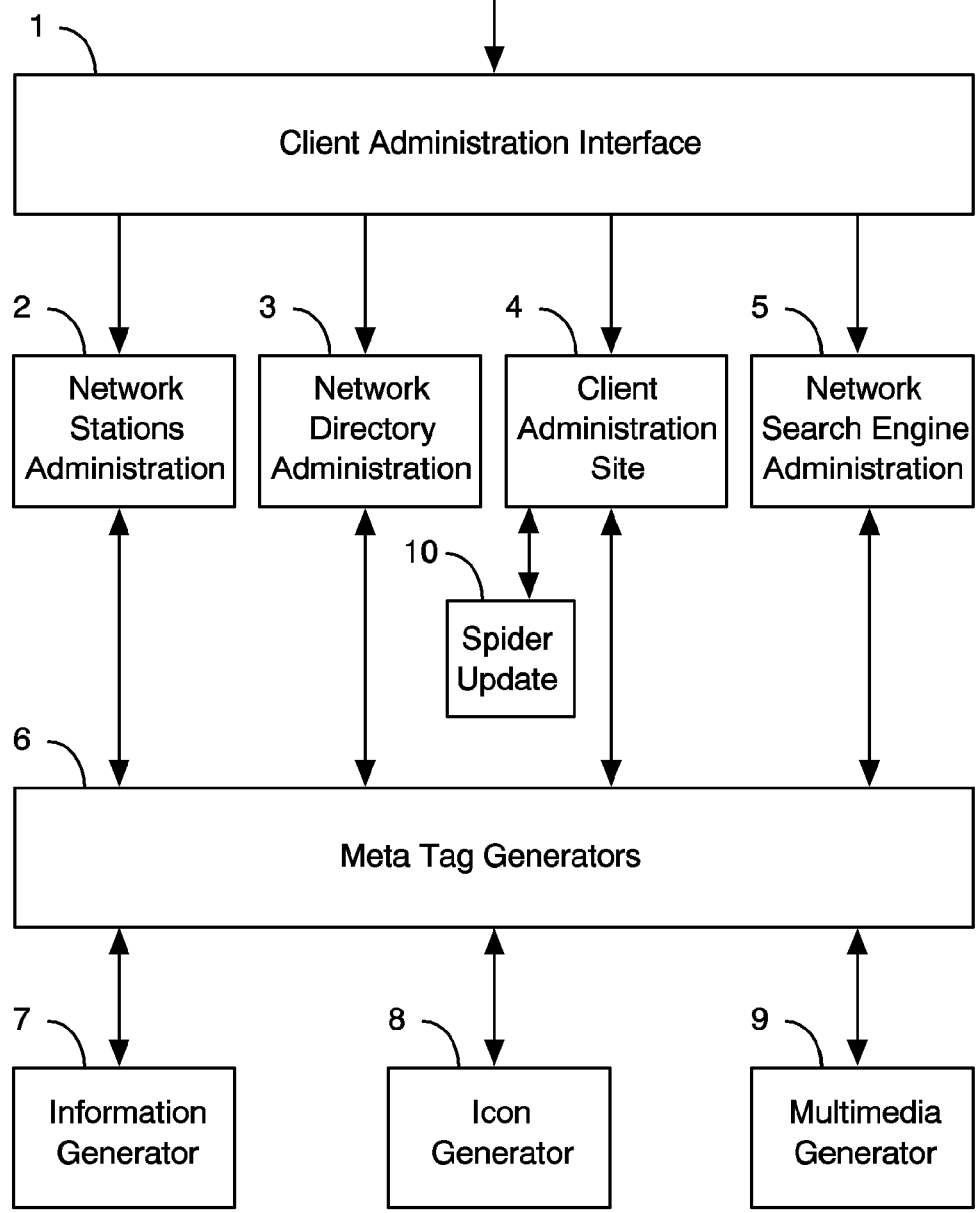
FIG. 1 is a block diagram that illustrates the client administration interface and the broadcast network platform system main components.

The present invention solves the foregoing problems by providing a search engine with the ability provide more informed results with searchmercials and providing more calls to action for each searchmercial's listing, listed in the search results screen without linking directly to the web site or to a call to action. A preferred embodiment displays searchmercials search results entries in a window on the search results screen from a list of search results entries. The searcher has the ability to step from entry to entry based on information presented in the searchmercials in the search results screen, or to link to the Web site presenting the searchmercial on the search results screen. In another preferred embodiment, the search engine provides an icon that is displayed on the search results screen and which can be selected to cause a searchmercial multimedia file from the linkable Web site identified by the icon to be streamed to the search results page for display, or alternatively the searcher can link directly to the linkable Web site associated with the icon based on the information provided by the searchmercial. Another preferred embodiment provides a text list that allows the searcher to display a searchmercial multimedia file based on text presented on the search results screen, or to link directly to the linkable call to action associated with a text search results entry. In each of the embodiments, the searcher has the option of previewing searchmercial multimedia information on the search results screen to determine if the user wishes to link to another searchmercial, and then selectably linking to the web site or call to action based on the information delivered in the previewed multimedia file.

The system uses Metadata specifically designed to identify and locate searchmercial multimedia data and associated Metadata, including searchmercials multimedia data. The Metadata identify the location of information on remote Web sites that may include general information about the searchmercial, and in addition, the addresses where multimedia files, which are to be downloaded and displayed on the search results screen, can be found. The Metadata can be manually inputted into the system or stored on the remote server. The owner of the remote Web site accesses the system and issues instructions to have a spider access the remote server system for the purpose of retrieving the information in the Metadata. The Metadata can be stored on a remote URL in form of novel Metatags designed specifically for the searchmercials system or can be stored in a remote server in form of a data feed that can be parsed and stored into the system. This gives the owner of the searchmercial control over the content of the Metadata, and also gives the owner of the searchmercial control over when the search engine is updated with the content.

The system provides a number of search capabilities to deliver search results in an organized and synchronized fashion. The user may specify the style of the views, including the arrangement of the views provided by the system. The views may include multimedia, multimedia and text, icons, icons and text, text, etc. The user may input search criteria to the system that searches the system and locates searchmercials for information and calls to action associated with the search criteria. The system displays a selection of views that allow the searcher to choose the format of the search results. The format of the search results may be multimedia, text, icons, icons and text, or combinations of the foregoing. The user selects views from user-customized favorite program files, and several graphic display and search switching capabilities within the application. In addition, an optional advanced Internet multimedia and broadcast management network platform system permits users to access information on the Web by Means of a numerical index system in which multimedia broadcasting sources provide numerical addressing information related to a station/channel/program structured environment. Each station, channel, or program contains a destination address for a source text, icon, audio, video, and/or multimedia file for one or more programs. The user enters a preselected numerical code to access a selected station/channel/program.

DESCRIPTION OF THE PREFERRED EMBODIMENT

Prior to a detailed discussion of the figures, a general overview of the system will be presented. The present invention relates to a broadcast network platform system (the "World Wide Broadcast Network" or "WWBN") that provides for the integration of traditional television, HDTV (High Definition Television) commercial advertising, multimedia, video conferencing, Internet Search Broadcast System and the Internet all in a centralized rich-media platform. The system enables these media elements to interact with each other in an open source environment. The system can be implemented to run under any suitable operating systems such as windows, Linux, MAC and online so that it is an open source environment capable of interacting with all media types. It provides searchmercials that improve on conventional search engines by providing a video description of the content of remote URLs or landing page without requiring a searcher to access the remote URL or landing page.

A Video Searchmercial is defined as follows: A searchmercial is a form of video or audio promotion that is primarily used online and displayed in directories or search results. A video "searchmercial" is a video commercial designed specifically for online search and directories. Unlike display ads or in-stream video ads that are designed to demand attention and create a brand preference, the purpose of the searchmercial is to appeal to the active searcher by providing the information sought with video or audio and a call to action. Its advantage is that there is no need to cut through the clutter or generate effective reach; a searchmercial simply needs to tell a story and communicate value. In fact, where traditional advertising is designed to stand out from the content the audience is viewing, the searchmercial is the content. Preferably, searchmercials run between 30 to 90 seconds and can be placed on the online directory or an Internet search engine. They can be created cost effectively because they simply need to efficiently tell the story of the business. No need for the "big idea" or expensive talent. Searchmercials should: 1) Answer the target searcher's inquiry. People searching for a product or service have a question to be answered. The searchmercial answers that question, 2) include a call-to-action and ensure it can be easily edited. 3) Searchmercials can be optimized not only for the search, but also for the response itself. 4) A call to action within the searchmercial can be a discount, monthly coupon, etc., 5) searchmercials provide efficient transfer of information by answering a question and quickly giving a call-to-action, 6) searchmercials can repurpose TV commercials, 7) some TV commercials that promote websites or landing pages within websites can be repurposed for searchmercials. It is important to optimize the Metadata for search results. Close attention should be paid to the data associated with the searchmercial. This data will be read by search engines, and it is imperative that the searchmercial show up in searches that are likely to generate the most prospective customers.

Prior art organic search engines today consist of text based results and text based search ads, the text based search ads help search engines monetize the organic portions of their business. Users today are confronted with an average of 255 characters per individual search result to decide whether or not linking to a website is warranted. This inventive system improves on text based search engines prior art with a searchmercial, as a part of the result. Because there is an unlimited amount of information that can be provided to the user through a searchmercial that cannot be done with 255 characters, the user can determine if linking to the website is warranted or using any other available calls to action is warranted with more detailed information from the content owner.

Prior art video search systems that scour the web for video content cannot perform with the same functions and have the same desired impact as a Searchmercials search engine because they are designed to find video on the web, and either show a portion of the content, the whole content or a link where the content is located. At no time is there a communication strategy directing a user to a desired URL such as an order form, subscription form, shopping cart, home page, literature, click to call application, email the video owner, etc. Therefore the specific goals cannot be accomplished organically.

Some prior art systems and methods for generating and providing previews of electronic files such as web files scour the web for content, then import a portion of the content and makes it available on search results. If they were to scour the web and find a video, it will capture a portion of the video (a couple of seconds) in hopes that when the user searches and sees a portion of the video it would link to the video file in order to see the rest of the video or the full video, or webpage or image. This method does not serve the user seeking to promote a link to a shopping cart for the user to purchase a product or service, nor can it convince a user to click on any call to action such as click to call the advertiser, link to the landing page URL or email the advertiser etc. Although conceptually similar they are not in the same world, nor do they achieve the same objectives.

As the Internet, television broadcasting, and television networks evolve, they will one day converge. With devices such as TIVO™ eliminating commercials on programming and those commercials offered to users randomly will make a transformation to user requested commercials. For example if users are watching a sports show, they may have Searchmercials options on the side or bottom of the display that relates to sports equipment, sports tickets related to the games or team etc. They can also search for a search term such as sneakers or Lakers game tickets and get searchmercials related to their inquiry and each searchmercial provides a call for action. Therefore the commercials are not seemed as unwanted interruptions but as information requested by the user. Conventional high bandwidth search engines work well for basic information on the web, but for those looking to promote a URL or call for action, an effective search has to make a transformation to searchmercials and its methods and systems.

In the inventive searchmercials system there has to be human interaction to manage the efforts of the campaign or the message in the searchmercial. The content cannot be randomly scoured or spidered as it is in a conventional search system, the search terms need to be focused and call for actions are to be strategized and configured. The invention's Searchmercials allows companies to promote their business with the power of multimedia integrated into an interactive search campaign. Enhance their web links, call to action items and destination URLs with video.

An advantage of searchmercials is that they communicate the benefits of a company, product or service with the "High Wow" impact of multimedia integrated into user's search results. Sleek presentations and messages will enable companies to reach their target audience and attract more users to their landing pages, call for action items or web links. Searchmercials provide companies with first-hand exposure and continuous contact in direct response to user's inquiries in the market to which their searchmercials message is directed. Users are eagerly searching the Internet for the most pertinent information and latest developments. A searchmerical's message will come across as needed, in response to user's inquiries, giving the searchmercial's message a more persuasive edge without distractions by intruding unrelated advertisements, giving a company's message a more prestigious status and a stronger persuasive marketing edge causing a call for action.

An Interactive Experience, as it is described herein, consists of several elements that communicate with each other, as well as between the website and the user, in unique ways. The elements can include text, graphics, audio, video, or a combination of all elements. Combining these media elements adds value because they have the ability of far greater user experience than what each individual media element can achieve on its own.

Pay For Performance, also called pay-per-click, is a service model for advertising that's simple to grasp: You pay to rank your searchmercials well. You select keywords or key phrases relevant to your business goals, and the highest bidder ranks the best. Because you only pay after a visitor clicks your link, no money is wasted on up-front costs, hence the term "Pay For Performance". Unlike standard Pay Per Click text based search engines, the invention enables vendors to communicate the benefits of their company, product, or service with the High WOW impact of video to best describe their offerings. Vendors can start reaching customers at the point of search with a searchmercial.

Searchmercials combine the best features of search advertising: multimedia, pay-for-performance, keyword targeting and budget control to give vendors an additional cost-effective way to reach your target audience. You advertise to prospective customers who are already searching for your products and services. You pay only when users click through to your website. You communicate with a market that is in an information gathering mode. You set your own cost-per-click. You begin your Searchmercial PPC campaign with minimum cost. Searchmercials enhance your listing with a stronger call to action. Customers click To Call. You can use phone tracking. You can provide a Landing Page call to action (buy, literature, more info, contact sales rep, visit web sit link URL, etc.

Your advertising video message (searchmercials) can best describe your product or service and can thus come across as needed, in direct response to user inquiries, giving your company a more persuasive marketing edge as users preview your company's video before clicking through to your website. Searchmercials provide companies with the ability to communicate with a market that is in an information gathering mode, with the power of multimedia integrated into a cutting edge video marketing campaign. Your advertising video message can best describe your product or service and can thus come across as needed, in direct response to user inquiries, giving your company a more persuasive marketing edge as users preview your company's video information before clicking through to your website. Your sleek video presentations (searchmercials) enable you to reach your target audience and attract more users to your web links and destination URLs. By allowing consumers to preview relative videos during a search, publishers can aggressively target an audience at the point of search with strategies that highlights your company's strongest selling points. Because the searchmercials system is a managed submission system it provides several options, such as an administrative interface for users to manually enter the data into the system and manage their campaign, submit their searchmercials data with XML, mRSS or other means of automation managed by the user. Assign a set of specialized Meta tags provided by the system to then schedule the spider to scour and update the information for the searchmercial.

The WWBN incorporates a variety of components in its broadcast network platform system, including Broadcast Allocation Nodes ("BANs"). The BANs architecture is a unique method of numerically indexing and displaying a variety of conventional data types (i.e. text) as well as alternative data types, such as icons and multimedia, in a numerically indexed system that systematically centralizes, organizes, and classifies networks over the Internet through a single station node. This format is similar to the combination of radio and television broadcasting, but also provides the ability for Network Grouping or Node Grouping. This type of grouping sets a protocol that allows companies to tie networks, Websites and website links together into relevant groups in a platform that is subdivided into stations, channels, programs and file nodes. In other words, this system allows a company to group subsidiaries, partners, affiliates, subdivisions, or departments into numerically indexed network nodes. This provides a user with a similar experience to television channel switching or channel selection when accessing information on the Internet. For example: a large electronics manufacturing company would be assigned as station 1. Each category or service would be assigned as a separate Channel (music 1, computers 2, telecommunication 3, televisions 4, etc.). Its products would be numerically indexed under the channel or category (CDs 1.1, Cassettes 1.2; HP 2.1, IBM 2.2, etc.).

Another component of the invention is the World Wide Broadcast Network ("WWBN") Directory System. This is a market-driven, human-edited, directory-based platform that categorizes the management of Website link identifies, multimedia, icons and other network resources. By incorporating a search system into the system, the invention provides a more effective and structured search result. Users can locate and view the results of their inquiry expeditiously, thus providing the user with a more accurate and relevant result faster. Users also have the ability to save their search results for future use, participate in a rating system of a site (thus ensuring the sites' validity and usefulness), and view other user's opinions regarding another site in order to compare findings based on content, information, data, etc. Strategic positioning is a method used by WWBN Directory that enables companies to market various areas of its Website or network by listing these links and the appropriate categories within the WWBN Directory. This method allows for independent links of Websites to be displayed under the relevant categories resulting in diverse connections to the various areas (products or services) within the site. Categories can be created, deleted, or changed as new markets emerge and existing markets change, thus expanding the pool for marketing strategies which separate and/or combine the stations, channels, programs and file nodes. This enhanced numerically indexed system of specific sites of the Internet provides search results that are categorized and sub categorized by subject matter through the WWBN Directory, thus allowing the searcher to quickly locate potential Websites of interest. For example, a Station Node can either provide information to users with regard to the station and its channels or broadcast information direct, the Channel Nodes can either provide information to users with regard to the channel or its programs or broadcast information direct, the Program Nodes can either provide information to users with regard to its programs its files or broadcast information direct, and the File Nodes can broadcast directly. This allows a company to develop a full scale marketing platform capable of broadcasting its complete line of products, services, website links, divisions, subsidiaries, etc. under one centralized platform. This enables the company to reach those consumers specifically in the market for what the organization has to offer while enticing them to explore the company and its information further without the intrusion of the general Internet population. The Station Node serves as the focal point of all that the organization has to offer through the channels programs and files that the station possesses.

A component of the invention is the WWBN's Searchmercials System. The system utilizes specific information in form of searchmercials that provides for relevant and specific information as a result to users. This eliminates the cumbersome and irrelevant information that is retrieved through the use of most text based search engines in use today. Strategic targeting is a method used by the Searchmercials System to enable users to find individual links, departments or sections to a website that should be identified by its own merits. For example one searchmercial can be targeting a homepage talking about a specific website about shoes and the call to action may be the home page of the website and another searchmercial can be about a specific model of shoe and the call to action can be a shopping cart, literature, a chat with a sales rep, a video of the same shoes in different colors, etc. In other words, by assigning searchmercials targeting specific criteria that focus on the specific area of a site or specific marketing goals, users will be able to quickly find the specific area or link in a website. This allows for a more relevant search result for the specific link within a site than it would be if the criteria were to be the same on all the website's pages. The method enables users to link directly to a specific area of a site, allowing the advertiser, marketer or owner of the site to narrow and focus its searchmercials advertising strategies and highlight the specific qualities of that segment of the company, product or service.

The Search Broadcast System integrates broadcasting solutions and multimedia with search engine capability. By integrating search together with video commercials designed for search in form of searchmercials the system provides a relationship where the roles of the advertiser and the consumer are reversed. Instead of investing time, money and unfocused efforts trying to find, identify, define and reach a particular segment of the market, our searchmercials system will provide an environment where the consumer seeks the commercial information relevant to their needs and interacts in direct response to their inquiries according to the calls to action available. Advertisers will thus reach consumers looking for the specific information, product or service offered while the user is in an information gathering mode or ready to purchase, instead of waiting to see who got caught in the advertisement net. The Searchmercials System provides for search results in several forms, including a audio or video only form, a text only form, an icon form, or a combination of media form types, including text and/or icons and/or multimedia. The search results can be multimedia only, with the user having the option of playing the entire multimedia searchmercial result item, or skipping to the next entry, etc. Alternatively, the search engine can display search results in a user's choice of text, or icons, or both with the ability to selectably display multimedia items.

As can be seen, the system provides the searcher with the capability of first examining an introductory data item with a searchmercial. Searchmercials can display instantaneously or can be triggered in several ways such as an icon representing a multimedia file presented on the search screen, to determine whether to link to call to action associated with that searchmercial. Once the searcher selects the icon, a searchmercial multimedia file is streamed to the search results screen. After viewing the searchmercial multimedia file, the searcher can then elect to link to the Web site or to any other available call to action presented by the searchmercial. The search engine provides for the integration (i.e., "plug-in") of streaming broadcasting signals in one or more media formats, and/or their file names, multimedia files, Web pages or domain addresses, applications on the Internet or on any other public, private or global network. The multimedia data platform is open source in that it can present multimedia files having a variety of data formats, such as commercially available MPEG, AVI, etc., formats to display content on any device.

The system provides a new method of searching and displaying searchmercials in a variety of conventional data types (e.g., text) as well as alternative data types, such as audio, video, multimedia streaming data, large and small icons, as well as combinations of those data types. The variety of data provided by the system is presented as results on the search screen, and which may be selected by the searcher for the searcher's examination. The system is able to identify a variety of data types to the search engine by the creation of a set of new Meta tags which provide destination addresses for these multimedia data files on the Web. By having the ability to access multiple types of data, the system provides the searcher with substantially more information than would be presented by a conventional text based search system and thus have the ability to serve a multitude of devices such as TIVO, GPS, Television, Mobile Devices, etc.

Another advantage of the searchmercials system is that due to high bandwidth availability in homes, users would prefer to view more informative searchmercials with more call to action options than to read through text based results that are usually limited to 255 characters and then link to the website to then later return and sometimes have to begin the search all over again.

Another advantage of the searchmercials system is that it can function in any device such as television, as televisions become digital, manufacturers are integrating computing and Internet options to the new digital television monitors. User watching TV can now skip through unwanted commercials with the use of built in systems or services such as TIVO and others. Unwanted commercials have always monetized television broadcasting, but with the advent of TIVO and other services, commercials have to become an asset to the user. A searchmercial is requested by the user and is received as useful and requested information and unlike the prior art of presenting random commercials to the public for branding with no call to action, searchmercials have the ability to provide the user with needed information and several calls to action, providing advertisers an immediate return on their investment.

Another advantage of the searchmercials system is the ability to handle multiple criteria and predetermined criteria such as search terms, location data, and IP data to determine a list of results. This becomes useful in locational devices and GPS capable devices that can have audio or video searchmercials presented to them as they move from location to location.

Another advantage provided by this invention is the ability of the searcher to select a searchmercial multimedia file, such as a streaming audio/video file, and to access that searchmercial multimedia data file at its location on the Web and display it in a window on the searcher's search results screen. Streaming the searchmercial multimedia file to the search results screen eliminates the need for the searcher to link to the source site to find out whether that site contains information of interest. The host of the Web site provides searchmercial streaming data to the searcher's page that is presented in the window. After the searcher views the searchmercial information presented by the streaming data, the searcher can elect to link to that site. This eliminates a number of problems associated with prior art search engines. In particular, it eliminates the problem associated with Web pages that do not, for one reason or another, allow the searcher to return to the search results page. Frequently, this results in the searcher having to re-execute the search that may result in substantial wasted time. Of course, when the searcher reenters the search keywords, those keywords may be slightly different, and as a result, in search results may also be different. In addition, streaming a small advertisement or searchmercial of a tentative linkable site will improve system performance by avoiding the overhead associated with linking to that site and then having to return.

Another component of the invention is the utilization of Application Service Providers (ASP). This is an up and coming alternative to buying software. The system provides a unique platform in the system's directory that tailors specifically to the ASP market by making available to users the various applications published by Application Service Providers online. ASPs or software subscription-based models allow users to connect to a server maintained by the ASP for a monthly, quarterly or annual fee. Users then access and use one or more applications or programs from the ASP server without the need of downloading, upgrading or purchasing software to be installed into their computer. In this manner ASP customers become steady monthly or quarterly sources of revenue while producing lower costs for the developers with regard to software upgrades, operating system compatibility, distribution and piracy.

In the last few years, there has been an exponential increase in computer power, bandwidth span, and powerful positioning of the Internet worldwide. The rapid increase in broadband usage has not produced a resulting increase in easy, cost-effective multimedia broadcasting capability. The problem for content providers and distributors is the difficulty in serving three major media platforms (QuickTime, Real Media, Windows Media) to appease users' media players' preferences. The WWBN architecture provides compatibility between software and application service providers and developers, search technologies, and multimedia vendors' products and services through common, public-domain standards. The opposite paradigm (proprietary standards) would limit companies to one vendor's offerings, thereby achieving compatibility within an organization's network while jeopardizing compatibility with global networks, customers, suppliers and partners. As a result of this invention, numerous industries that have recently shown an impasse in productivity due to cost and availability, namely, the streaming industry, data management centers, and data distribution centers, will receive a substantial productivity boost in their ability to reach their respective customers. The potential for these industries to grow and succeed will be possible with the integration of the WWBN System, which provides a centralized Rich-media platform for the dissemination of rich-media content.

At present, many traditional media companies with offline syndication models are taking a wait-and-see approach, waiting until there is a significant competitive advantage before moving online. Despite the growing rich media syndication market, content distributors are still waiting for a "giant content bazaar" to be built online that would facilitate centralized, easy, cost-effective multimedia broadcasting. WWBN provides the platform to achieve integration and compatibility among search engines, online broadcasting, and streaming, finally providing the advantage that content distributors seek. The WWBN system provides a platform with the necessary structure that will allow the various developing technologies of search engine algorithms, competing video content and multimedia providers to function together, and will allow video and multimedia content to be simultaneously presented as search results via a single rich-media platform.

The WWBN system offers much more than a repository for data. It combines traditional television, search technology, multimedia and the Internet into a powerful broadcasting tool with unequalled advertising potential. It is, in fact, a centralized rich-media platform that allows media elements and digital assets to interact with each other. The rich-media platform increases the demand for streaming, rich media storage and hosting services. Service providers, broadcasters, data centers, media buyers, hosting companies, advertising agencies, search engines, content providers and distributors can participate in providing streaming and hosting services for clients using the WWBN as a centralized distribution hub for dissemination of rich-media content. The WWBN system is commercially and economically equal in functionality to the Internet, as television commercialism is to network broadcasting. Further, the WWBN architecture allows compatibility through common, public-domain norms as opposed to proprietary standards that hinder communication, technological expansion and collaboration. The WWBN platform provides for the broadcast of a variety of multimedia content, such as business and television broadcasting, multimedia, commercials, flash animations, and stored and streaming video. These are processed through a single rich-media platform that integrates with all media formats available today, such as MPEG, Real Media, QuickTime, Panoramic and Object Oriented Virtual Tours, Windows Media, Flash, AVI, etc., so personalized communications can be generated to customers quickly and easily. Companies that have developed high quality state-of-the-art technologies in areas such as search, multimedia, and other related technologies can use that WWBN platform that allows for the integration and sharing of technologies. The WWBN system creates a symbiotic, mutually beneficial relationship with its users, clients, service providers, partners and affiliates, guaranteeing its rapid implementation and adoption.

The WWBN System is much more than a search engine or broadcasting medium. It provides for the integration of television and the Internet into a powerful, interactive entertainment and marketing venue that promises to link all the disparate media into one all-purpose tool. The WWBN can run continuously on an HDTV screen in every household. Through our broadcast network platform system, Users will be able to shop, work, entertain, answer, and receive videophone messages, videoconference with other users, retrieve and share information, etc., all in a single all-inclusive medium. Search engines with streaming and multimedia broadcasting capabilities, in a standardized, common, centralized platform is a component that will propel the emergence of this new medium. The WWBN System provides the platform that allows this integration.

A principal advantage of the WWBN system is to take the public "out of the box" of confining and limiting exclusive programs, applications and search tools. The WWBN System is the beginning of a new wave of full compatibility in digital data manipulation. Information is a powerful tool that should not be wasted, controlled in an elitist fashion, or restrained. Information has become a currency and it is manipulated as such. The proficiency in the exchange of this currency guarantees success, and the development WWBN System optimizes this exchange.

Addition to the foregoing, the WWBN system provides a new method of searching and displaying a variety of conventional data types (e.g., text) as well as alternative data types, such as audio, video, multimedia streaming data, large and small icons, as well as combinations of those data types. The variety of data provided by the system is presented as results on the search screen, and which may be selected by the searcher for the searcher's examination. The system is able to identify a variety of data types to the search engine by the creation of a set of new Meta tags which provide destination addresses for these multimedia data files on the Web. By having the ability to access multiple types of data, the system provides the searcher with substantially more information than would be presented by a conventional text based search system.

Another advantage provided by the WWBN system is the ability of the searcher to select a multimedia file, such as a streaming audio/video file, and to access that multimedia data file at its location on the Web and display it in a window on the searcher's search results screen. By streaming the multimedia file to the search results screen it eliminates the need for the searcher to link to the source site to find out whether that site contains information of interest. The host of the Web site provides streaming data to the searcher's results page that is presented in the window. After the searcher views the information presented by the streaming data, the searcher can elect to link to that site or not. This eliminates a number of problems associated with prior art search engines. In particular, it eliminates the problem associated with Web pages that do not, for one reason or another, allow the searcher to return to the search results page. Frequently, this results in the searcher having to re-execute the search that may result in substantial wasted time. Of course, when the searcher reenters the search keywords, those keywords may be slightly different, and as a result, will provide different search results. In addition, streaming a small advertisement or description of a tentative linkable site will improve system performance by avoiding the overhead associated with linking to that site and then having to return.

As can be seen, the WWBN system provides a search engine that has a search results screen that combines multiple data types, including text, audio, video, multimedia, icons, etc. into a single search results screen that provides far richer data than previously available. In addition, the preview capability associated with multimedia data, which is streamed for a direct presentation on the search results Web page, provides increased convenience and improved performance over prior art systems which require searchers to link to a Web page listed as part of the search results. The multimedia data allows substantial amounts of information to be quickly presented to the searcher, and avoids interference with the search by some linked-to Web pages that do not allow return to the search results Web page.

The WWBN system further improves upon prior art search engines by providing a new method of accessing data. In particular, an optional numerical index system allows a user to input a number related to a station/channel/program format which provides search results that are categorized and sub categorized by subject matter to allow the searcher to quickly locate potential Web sites of interest. The station/channel/program format used by the system is implemented as follows:

1. A Web site proprietor would advertise its Web site and include a numerical address code in the advertisement. For example, a large electronics company may advertise the product, such as an inkjet printer with a code of 2.1.3 wherein a number 2 may indicate a station, the number 1 may indicate a channel, and the number 3 may indicate a program.

2. A "Station" may represent a Web site which has a variety of content and which may include multiple channels and programs within those channels. For example, if an individual is looking for an electronic product such as a computer printer, the numerical code for the station may list the home page of a large electronics manufacturer that has a broad range of products. That home page would function as the station that would provide access to a variety of channels, each related to different product categories. One channel may be related to printers, one to display monitors, one to notebook computers, etc. This is an improvement over the prior art in that it provides a short identification code that is much easier for a consumer to remember.

3. A "channel" can represent a category of related items. Once a searcher has selected a station, the searcher would then use the numerical code 1 (which may indicate printers) to select the appropriate channel within the station. Using the example given above, the searcher would access the Web site of a manufacturer (i.e. the station), then access the channel related to printers.

4. A "program" represents a particular item within a category. Again, using the example given above, once the printer channel is selected, each program may be related to a particular printer within a line of printers. The searcher would then use the numeral 3 to select the program (i.e., the printer) the searcher was interested in.

By way of example, a large manufacturer such as Sony Corporation may use an Internet address on its advertisements related to products that it sells. If Sony was advertising a specific type of television (e.g. an HDTV television), with a specific model number (e.g. a model 301), the advertisement may have a spelled out Internet address so that the consumer can later access the Internet for more detailed information regarding the product. In this case, the spelled out Internet address may have a form such as "WWW.Sony.com/HDTV/model-301" which would indicate the address of the Sony Web site, the subsection of the Sony Web site devoted to high-definition televisions, and the particular Web page devoted to that particular model of high definition television. The problem associated with this type of Web page identification is that the addresses can be long and cumbersome. Long addresses such as this can be difficult to remember and can contribute to mistakes on the part of the consumer entering the address. For example, the dash in the term "model-301" might be easily forgotten or omitted by the consumer, which would result in the consumer not being able to get to the correct Web page. Quite often, when this happens a consumer will become frustrated and not pursue obtaining the information that the manufacturer may wish to present. In turn, this may result in the loss of sales.

The advantage provided by the WWBN system is that by using the abbreviated station/channel/program address structure, the Web site address can be reduced to an address that is much easier for the consumer to remember. In particular, if the station address for Sony Corporation is the number 1, and the channel address for Sony's line of HDTV televisions is the number 3, and the program address for their HDTV model 301 is the number 2, then the numeric addressing provided by this invention would use a code 1.3.2 to indicate the address of their Web page for the model 301 HDTV. As can be seen, the number 1.3.2 is far easier for an ordinary individual to remember than the extended Web address ("WWW.Sony.com/HDTV/model-301") for that Web page. By using the numeric addressing system presented herein, it is easier for the consumer to remember Internet addresses presented in advertisements, and it eliminates frustration caused by addressing errors which may in turn cause the consumer to abandon efforts to locate the Web site.

Those skilled in the art will recognize that the station/channel/program architecture used above can be used in conjunction with any type of subject matter.

Another feature of the invention, which improves over the prior art, is the addition of several new Meta tags (discussed more fully below) which are used by the search system to define multimedia data, and icon data. These Meta tags are used by the search engine to provide new types of data as a result of the search. When the search engine identifies specific multimedia types (e.g., text, digital image, audio, video, multimedia, icons, streaming multimedia, etc.) through the use of the new Meta tags, the system can display search results which include icons that represent any or all of the different data types as items in the search results.

By using the station/channel/program format in combination with the new multimedia Meta tags, the search engine presents the user with search results that are categorized based on related subject matter (e.g. science, finance, politics, etc.). In addition, the search results can be presented as text material, still video images, icons, full motion video, multimedia video, and/or audio. In addition, the system also provides the user with the ability to select a program in the search results list and link directly to the Web page represented by that program, or alternatively, to initiate the presentation of a multimedia file on the current Web page by selecting an icon in the search results list. Once selected, the multimedia file is streamed to a window on the search results page. After viewing the multimedia file, the searcher can then decide whether to move on to another item in the search results list or to link to the Web site page associated with the multimedia file. This provides the searcher with a flexible and rapid method of examining results of the search. In particular, the multimedia file acts as an advertisement and/or an introductory presentation that allows the searcher to make a decision as to whether a site is worth visiting. Likewise, in place of the multimedia file, an icon can be selected that results in an audio file being played, or in video images being displayed in the window on the search results screen, or even text messages being displayed within the window.

As can be seen, the WWBN system disclosed herein provides a system platform for the integration and "plug-in" of broadcasting signals and/or video, audio, or multimedia files, Web pages or domain addresses as items in a list of search results. Various methods and systems for the handling of broadcast signals, files, web pages, multimedia files, and file names are also disclosed. An exemplary method includes: (1)

the ability to switch signals, streams, files and file names in a systematic platform; (2) a modifiable network of stations, channels and programs providing rich multimedia data; (3) a hierarchical directory system categorizing results in multimedia, video, audio, new media and graphical displays; and (4) a search conducted using keyboard query searches resulting in commercial multimedia, video, audio, new media and graphical displays presented on the search results screen.

The WWBN system provides a search system that enables integration of multimedia from various sources into one central platform by providing an open platform where Web sites can plug in as stations to broadcast multimedia, video, and digital rich media channels. The system numbers, categorizes, and classifies destination source files (i.e. broadcast data files, and other data types). The system systematically categorizes, and classifies the destination files into related groups containing multimedia content that allows graphical and interactive searches through a series of searchable subdirectories containing data from a variety of Web sites.

The WWBN system organizes the destination files containing multimedia content into a station/channel/program structure with similarly categorized data presented as programs in the same channel This allows the user to be able to switch channels to step from one type of subject matter to another. Once a channel is selected, the user can then step from one related program to another. As a result, the user can graphically and interactively search through collections of sites represented having multimedia and video data with related subject matter. Each channel then categorizes and classifies related data that results in "programs within the channel.

The search system also allows the user to search the Web using a keyboard query. The search results are grouped into subject matter related stations and channels that the user can review, and then to perform the more detailed review of the programs within a channel. Each program represents a particular Web site or Web page. The system contains links to each of the Web sites and allows multimedia information to be presented on the search results screen for the purpose of enabling the user to determine if the user wishes to visit that site. In the preferred embodiment, multimedia information from a particular Web site can be presented on a portion of the search page to allow the user to determine if they want to exit the search page to visit the Web site associated with the multimedia information.

The component of WWBN system platform that provides the search function uses several components. In order to properly categorize a particular Web site so it can be associated with a channel that contains related data, the system must first obtain data from the various Web sites that are to be searched. This function is performed by the Meta Tag Spider ("MTS") application. The MTS spiders the selected URL addresses and collects Meta tag data and stores it in a Web site database which contains descriptions of the various Web sites. Meta tags and URL addresses are well-known in the art. However, Meta tags as currently used by the prior art are limited to text data and do not provide any method of handling the types of data, such as multimedia, audio, icons, etc., which are needed to implement the invention. The multimedia related Meta tags and icons provided by this invention allow the system to search multimedia items in the same manner as text items are searched in the prior art. Once the MTS has completed the process of obtaining descriptions of the various Web sites, the Web site database has information that will allow each Web site to be placed into categories that relate to the various channels.

Another important part of the WWBN system is the search system. The search system is an application that allows users to enter predetermined search keywords and provides a list of results containing site information and media elements pertaining to each Web site. The search system uses the Web site database to determine which channels are related to those keywords, and which Web site entries in the database are also related to those keywords. As a result, when the user performs a search, the resulting Web sites are each displayed in the appropriate channel with other Web sites having related data. In the process of determining the order of display, the search engine can then arrange the resulting programs in any appropriate order.

Another part of the WWBN system is the network station application that designates Web sites as stations in the network platform. Each station may maintain one or more channels that may also contain one or more programs. The client uses the network station application to control a variety of options related to stations belonging to the client. The client may use the network station application to add additional stations, or to alter options and/or information related to a particular station. When the client purchases a station, the client will enter a variety of information related to that station including the station title, the station description, and station keywords. These keywords are used by the search engine to determine if the station is related to the subject matter being searched. In addition, the client is also able to enter file destination source addresses related to icons as well as destination source addresses related to multimedia data. The network station application also links to the Meta tag generator (discussed more fully below) for the purpose of creating Meta tags that describe the station. The Meta tag generator creates the Meta tags later used by the search engine to identify desired stations.

Another part of the system is the Directory System application. This application categorizes Web sites by providing category search parameters. From here the client can select a particular category of subject matter that best describes a particular site. The client can then enter title information, site description information, site keywords, icon destination source file addresses, and multimedia source file addresses. By providing the client the ability to describe stations and channels in this manner, the system is able to conduct searches of all stations, or alternatively, to conduct a search within a single channel. Due to the Meta tags provided by the invention, the search can be made against not only text, but also against multimedia files. Once the search has been completed, the linkable sites have the option of providing icons which can be used to access multimedia files that are displayed on the search results screen to enable the searcher to determine whether or not the searcher wishes to link to that site.

The Visual Client Interface ("VCI") is used by Web site owners. It allows a client to purchase services from the system. For example, a client can order one or more stations and which the client can then administer directly. The client can select destination source files of multimedia content, description of files, subject matter, company information, product information service information, and the necessary information regarding the destination source file. The same destination source files may be associated with more than one station or channel based on the content within that destination source file. For example, destination source files related to hybrid engines for automobiles may be placed in one category related to automobiles, in a second category related to the environment, and in the third category related to tax exemptions for economical automotive fuel systems. The VCI is used by information providers (i.e., the clients) to include information used as keywords that are matched against keywords input to the search system when searching, and also to provide the information and data that is presented the users as a result of the search.

The Multimedia Meta Tag Generator ("MMTG") is an application that generates the source code necessary to allow the Meta Tag Spider to spider and retrieve the Meta Tags related to a specific program. The term "spider," as used herein, is well known in the art. When a client initializes, or later updates, information related to the client's Web site, the Meta tags used to describe the client's Web site and the destination files therein are set up by the client through the use of the Meta tag generators. Once these Meta tags are created, or modified, they are available to the search engine that uses them to determine which destination source files would be of interest to a searcher based on the searcher's keywords. Meta tags can provide information related to a Web site, provide information related to icons, and/or provide information related to multimedia files. Once Meta tags have been created or modified on one or more of the client's Web sites, the client can then log onto the search engine Web site and instruct it to use the Meta tag spider to access the client's Web sites and extract data from the Meta tags for use by the search engine. An advantage of the new Meta tags is that the system can now search not only text data, but also icon, audio, video, and multimedia data files.

Once the client has provided the information required by the system to conduct a search, and the system has gathered that information via the spider, the client's Web site and information are now available to a user conducted search. The Visual User Interface ("VUI") is a visual interface used by an individual who is conducting a search. The VUI allows the user to input keyword parameters that define the search criteria used by the search engine to identify the destination file names that represent the programs associated with a particular channel.

Desktop Internet Management System ("DIMS") is an application that allows users to customize the sites preferred by the users in a categorized and hierarchical system. The DIMS application allows the user to access user account information, such as email, time planners, events counters, and communications notices. In addition, from the DIMS application, the user can access and control a personalized menu or a tools menu. The personalized menu provides a convenience for the user that allows the user to access personal sites, business sites, financial sites, educational sites, government sites, entertainment sites, health sites, etc. If the user accesses the tools menu, the user is able to control a variety of features related to the search system, and to control how the results of a search are presented.

The system has the following advantages: it allows commercial multimedia and Web site information to be selected as the result of user defined input and/or a queried search criteria. The system can be used in conjunction with other portals, search engines, and/or directories. The system can be integrated with other search portal technologies. It can systematically organize, classify, distribute, and display in a systematic manner a variety of multimedia and video content on the Internet. The clients can control how their Web sites are classified for the purposes of a search. In addition, they can now use new Meta tags to allow multimedia files to be searched in the same manner as text files, and to present multimedia advertisements or samples on the search results page to entice a user to visit their Web site. Likewise, users can control what categories they wish to see and how they want the search results to be presented. As a result, both the client and the user have greater control of how search results are presented. In addition, multimedia data can be streamed directly to the search page without requiring the user to link to the Web site represented by an icon in the search results.

The network platform system embodiment is as follows. The embodiment has a number of broadcasting network stations that consist of individual broadcasting channels. The system designates channel id parameters and program id parameters within channels. In particular, station networks are sites providing streaming video and audio, multimedia content and multimedia, media files and file names. Programs are individual items within the network channels. Any channel can have an unlimited number of programs having video, multimedia, audio, or other content or programming. These stations, channels, and programs may be accessed by numerical indexing, as discussed above.

The invention provides several advantages. It solves the long filename problem, discussed above. It allows not only text to be searched, but also icon, audio, video, and multimedia files to be searched. It provides the capability of inserting rich multimedia files, audio files, video files and/or icons into the search results list, resulting in rich multimedia query results. It provides the searcher the ability to view a multimedia file related to a selected search result without requiring the searcher to link to the Web site associated with the multimedia file. Having discussed the invention in general terms, we turn now to a more detailed discussion of the figures.

FIG. 1 illustrates the methods used by a client to control how the system would determine that the client's site should be presented to a user as a search result item. When a client decides to update information related to the client's site, the client accesses the system via the system's Web site. When the client first enters the system's Web site, the client initially accesses the Web page on the system's Web site that represents the client administration interface 1. From the client administration interface 1, the client can perform any actions necessary to manage the client's data that is presented to users as the result of a search. The first action taken by the client at this Web page is to log on to the system. Once the client has logged on and is recognized by the system, the client can then access a list of services on the client administration interface 1 Web page. The services available to the client from this Web page are the network stations administration 2 Web page, the network directory administration 3 Web page, the client administration 4 Web page, and the network search engine administration Web page 5.

From the client administration interface 1, the client can access the network stations administration 2 Web page, which has several functions. In particular, the client can select options related to material presented to the system as part of the station. The client can specify one or more channels which are to be associated with a particular station. In addition, the client can specify one or more programs which are to be associated with particular channels within the station. The client can also select multiple channels in the cases where the subject matter can appropriately be associated with more than one channel.

In the preferred embodiment, the client would purchase space on each channel the client desired. The client would also enter general information here, such as program title, program description and keywords used to locate the program during a search. The client can also define the address of an icon associated with a particular item. The icon will eventually be displayed on the search results screen to provide easier access for the user. From this screen, the client can also enter the destination source address for any multimedia data that the user may access from the search results screen. The information provided by the client is input to the Meta tag generators 6 from this page. The Meta tag generators 6 are used to create Meta tags which provide information related to the client's stations that is used by the search engine during a search.

If the client accesses the network directory administration 3 Web page, the client can access several functions for use with any Web sites owned by the client. From here, the client would select the category that best describes each site's classification. For each site, the client may add a variety of information, including site title, site description, site keywords, icon destination source file locations, and/or multimedia source file locations. This information is also input to the Meta tag generators 6 to create Meta tags which are ultimately used by the search engine.

If the client accesses the client administration site 4 Web page, the client can access several other functions. In particular, after the initial activation of a client program (e.g. multimedia file, Web site, software program, etc.), the client will use the client site information update 4 Web page to update the information related to that program whenever changes are made to the site holding the client program information. The client can add information related to the program including title, description information, keywords, icon destination source file location, and/or multimedia source file location information. An advantage associated with this update process is that it provides a simple method the client can use to directly control how its entries are searched.

In normal use, the Meta tag generator 6 is accessed by the network directory administration 3 and the client administration site 4 uses the information generator 7 to update the Meta tags having site information. The icon generator 8 is used by the client administration site 4 to generate icons related to the client program. Likewise, the multimedia generator 9 is used by the client administration site 4 to generate Meta tags related to multimedia files used by the client program. The client interfaces to the system website allow the client to add, delete or update all aspects of Meta tags used by the system search engine. As a result, the client has direct control of how the client's information is searched.

If the client accesses the network search engine administration 5 Web page, the site title, site description, site keywords, site icon and site multimedia files can be set up for any programs provided by the client. This information will be directly searchable via the user's network directory, discussed below.

The following is an example of preferred embodiments of document, small icon, large icon, audio, and multimedia META tags:

```
<head>
<title>My Document</title>
<meta Name="Description" content="This is my document">
<meta Name="Keywords" content="My document, my name and my keywords">
<meta Name="Small icon url" content=""http://www.mysite.com/mysicon.ico">
<meta Name="Large icon url" content=""http://www.mysite.com/mylicon.ico">
<meta Name="Audiourl" content=""http://www.mysite.com/mystream.wav">
<meta Name="Mmurl" content="http://www.mysite.com/mystream.mov">
</head>
```

Those skilled in the art will recognize that the foregoing examples of Meta tags are provided for illustrative purposes only. Any number of data types, or data type names, or combination of the above can be defined by the Meta tags in place of the examples provided above. Therefore, the particular structure of the Meta tags given above does not limit the number of Meta tags that are potentially available. The only requirement is that the Meta tags provide information related to a variety of data format types, and/or are also capable of providing information related to the location of those in data types on remote Web sites. Likewise, those skilled in the art will recognize that a particular Web site would not necessarily require all potential Meta tags. Typically, an appropriate mix would be selected which would reflect the particular types of data that the remote Web site wishes to present.

Also shown in this figure is the spider update 10. When the client activates the spider update 10 for a Web site, the spider will access the URL for that Web site, access that Web site, and retrieve the Meta tag information related to that site and provide it to the search engine database so that is available for future searches. As can be seen, the client administration interface 1 allows the client to directly control information used by the search engine to perform a search, and allows the client to select and make available advertising or invitational multimedia files for use by the search engine on the search engine's results page.

Figure 2:
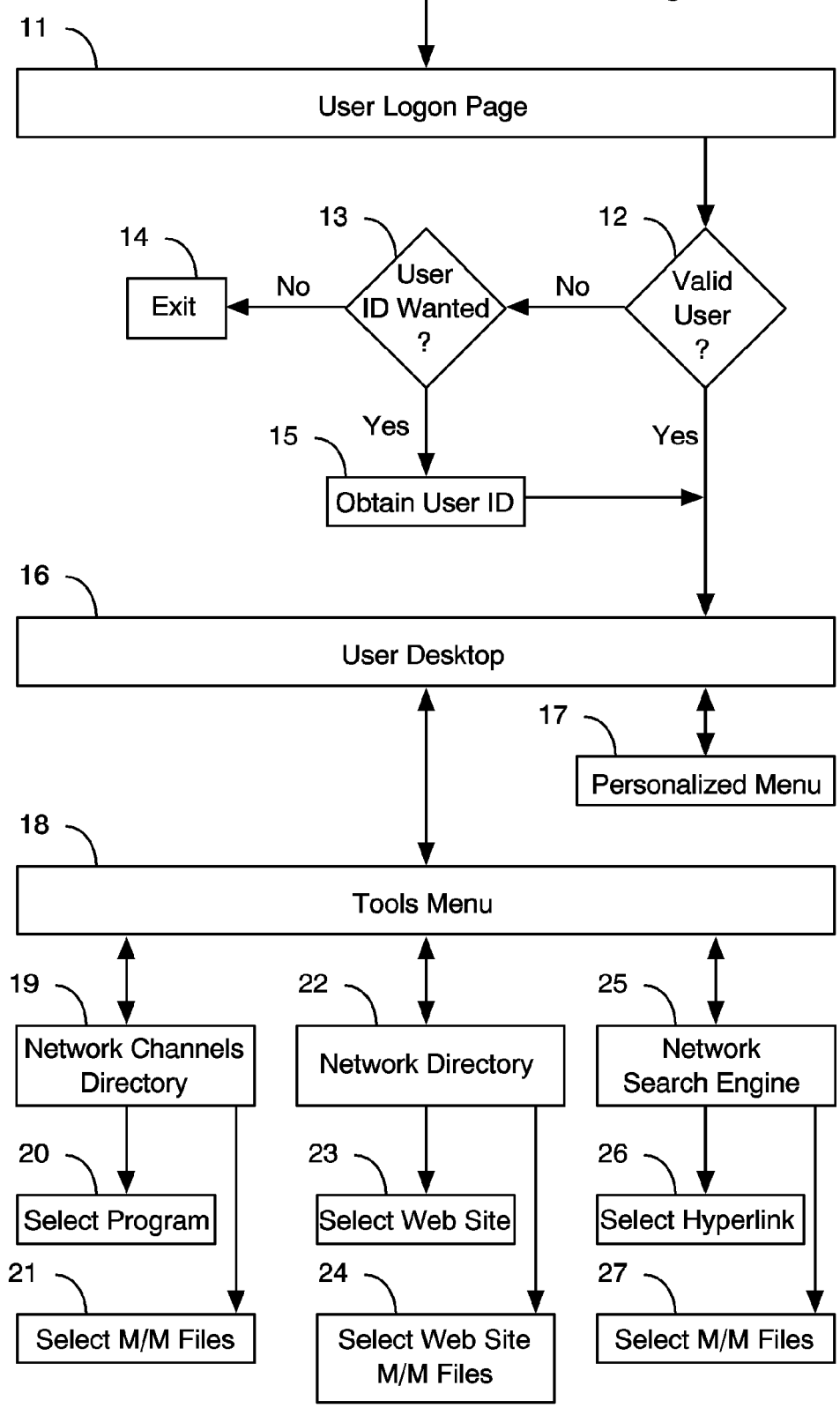
FIG. 2 is a block diagram that illustrates the interface between a user and the search system.

FIG. 2 illustrates how a user conducts a search and accesses information in the search results. When the user accesses the system Web site, the first step is to enter the user logon page 11. At this point, the system queries the user at step 12 to determine if the user is authorized to enter the search system. If the user has a valid user id, then the user proceeds to the user desktop at step 16. If the user does not have a valid user id, an offer is extended to obtain one at step 13. If the user declines, then access to the system is terminated at step 14. If the user elects to obtain a valid user id at step 15, then the user may access the user desktop at step 16.

From the user desktop at step 16, the user may access either the user's personalized menu at step 17 or the tools menu at step. If the user accesses the user's personalized menu at step 17, that menu provides the user with selected links and data, such as the user's personal sites, business sites, financial sites, educational sites, government sites, entertainment sites, health sites, etc. In a preferred embodiment, each site is represented by an icon. When the user selects an icon that represents a site or data source, the system will link to that site or access that data source.

In the event the user selects the tools menu 18, the user can access the network stations directory 19, the network directory 22, or the network search engine 25. If the user selects the network stations directory 19, then the user searches stations, channels, and programs. The user can view the search results as follows: the user can select from a list of icons at step 20 which contain information related to the Web site, or the user can select an icon at step 21 which contains information related to a multimedia file. If the icon at step 20 is selected, then the user will link directly to the Web site represented by the selected icon. Alternatively, the user can directly view multimedia files which are selected by control buttons on the search screen and which allow the user to move from one multimedia file to another.

If the user selects the multimedia files option at step 21, then a multimedia file will be streamed and presented in window 36 on the search results page. This multimedia file will have information designed to invite the user to link to the source Web page. It may be in the form of an advertisement, an informational message, etc. The multimedia display window 36 provided by the invention allows a user conducting a search to conveniently review information about the Web page that forms part of the search results without having to go to the Web page itself. The clients who own each Web page in the search results also enjoy an advantage with this invention in that they decide what type of message will be presented in the search results page multimedia window. Therefore, they have control over an important marketing tool.

If the user selects the network directory 22, the user is presented with a list of categories and sub categories that relate to specific subject matter areas. The user can examine the list of categories and decide which categories are of interest.

The following illustrates an exemplary root directory structure consisting of ten named categories:

| | | |
|---|---|---|
| 1. | Applications | |
| 2. | Business & Economy | |
| 3. | Communications & Internet | |
| 4. | Arts & Entertainment | |
| 5. | Leisure & Recreation | |
| 6. | Government | |
| 7. | Reference & Information | |
| 8. | Services | |
| 9. | Shopping | |
| 10. | Education | |

An advantage of the present invention is that the system utilizes the search engine to search for keywords or phrases within the root directory system which have either a text or multimedia content result according to user's choice. In addition, the users can search by keywords or phrases in the main directories of the root directory, targeting the search to the selected main directory for more accurate results. Further, users can search by keywords or phrases in the sub directories to the main directories, targeting the search to the selected sub directory for more accurate results within each sub directory defining the search criteria. The system adds, on an as-needed basis, sub categories to the main categories in the root directory. Example of current directories and their respective sub-directories are as follows:

| | | |
|---|---|---|
| 1. | Applications | |
| | a. | Business Application |
| | b. | Home Management |
| | c. | Personal Management |
| | d. | Graphics |
| | e. | Web Design |
| | f. | Video Editing |

| | | |
|---|---|---|
| 2. | Communications and Internet | |
| | a. | On line chats |
| | b. | Wireless WAP |
| | c. | Communities |
| | d. | Directories |
| | e. | Portals |
| | f. | Search Engines |

| | | |
|---|---|---|
| 3. | Leisure and Recreation | |
| | a. | Sports |
| | b. | Dining |
| | c. | Hobbies |
| | d. | Travel |
| | e. | Dancing |
| | f. | Adult |

| | | |
|---|---|---|
| 4. | Reference | |
| | a. | Dictionaries |
| | b. | Encyclopedias |
| | c. | People & History |
| | d. | Science & Technology |
| | e. | Health & Medicine |
| | f. | Maps & Atlas |
| | g. | Pets & Animals |
| | h. | Educational |

| | | |
|---|---|---|
| 5. | Shopping | |
| | a. | Department Stores |
| | b. | Postage & Shipping |
| | c. | Malls |
| | d. | Shoes & Clothing |
| | e. | Office Products |
| | f. | Transportation Products |
| | g. | Sporting Goods |
| | h. | Pets & Supplies |
| | i. | Jewelry |
| | j. | Discounters |
| | k. | Auctions |
| | l. | Eye Wear |
| | m. | Cosmetics |
| | n. | Pharmacies |
| | o. | Toys |
| | p. | Movies, Music & Books |
| | q. | Consumer Electronics & Appliances |
| | r. | Computing |
| | s. | Foods & Groceries |
| | t. | Home & Gardening |
| | u. | Hardware Products |
| | v. | Business To Business |
| | w. | Gifts & Flowers |
| | x. | Liquidation Sales |
| | y. | Art & Graphics |
| | z. | Hobbies |

| | | |
|---|---|---|
| 6. | Business and Economy | |
| | a. | Trade Associations |
| | b. | Chambers of Commerce |
| | c. | Wholesale & Distribution |
| | d. | Charitable Organizations |
| | e. | Corporate Web sites |
| | f. | Business Opportunities |

| | | |
|---|---|---|
| 7. | Arts & Entertainment | |
| | a. | Adult |
| | b. | Children |
| | c. | Games |
| | d. | Literature |
| | e. | E-Books |
| | f. | Comedy |
| | g. | News |
| | h. | Music |
| | i. | Movies |
| | j. | WebCams |
| | k. | Virtual Reality |
| | l. | Newspapers |
| | m. | Magazines |
| | n. | Television |

| | | |
|---|---|---|
| 8. | Government | |
| | a. | Departments |
| | b. | Military |
| | c. | Offices & Bureaus |
| | d. | Politics |

| | | |
|---|---|---|
| 9. | Services | |
| | a. | Business Services |
| | b. | Home & Family Services |
| | c. | Health & Fitness |
| | d. | Financial Services |
| | e. | Legal Services |
| | f. | Internet & Communications |
| | g. | Travel Services |
| | h. | Consumer Services |
| | i. | Educational Services |
| | j. | Auto & Truck Services |
| | k. | Online Photo Development |
| | l. | Shipping & Delivery |

Another advantage of the invention is that it can use the search engine to search for keywords or phrases within each sub directory of the system, providing either a text or multimedia content result according to user's choice, also providing a more targeted and defined search within the searched sub directory since the keywords will only pertain to the subdirectory being searched.

The user can select a Web site link at step 23 which will link directly to the particular Web site. Alternatively, the user can select an icon related to a multimedia presentation representing a Web site at step 24. When this alternative is used, the system streams a multimedia presentation from the Web site that is displayed to allow the user to decide whether or not the user wishes to access the Web site that provided the multimedia presentation. The user can then click a button 37 to link that site, if desired.

The user's other option is to select the network search engine at step 25. The user enters a series of keywords that are used as input to a search and a series of search results are presented as icons. The user can select an icon at step 26 or select a multimedia presentation representing a Web site at step 27.

Figure 3:
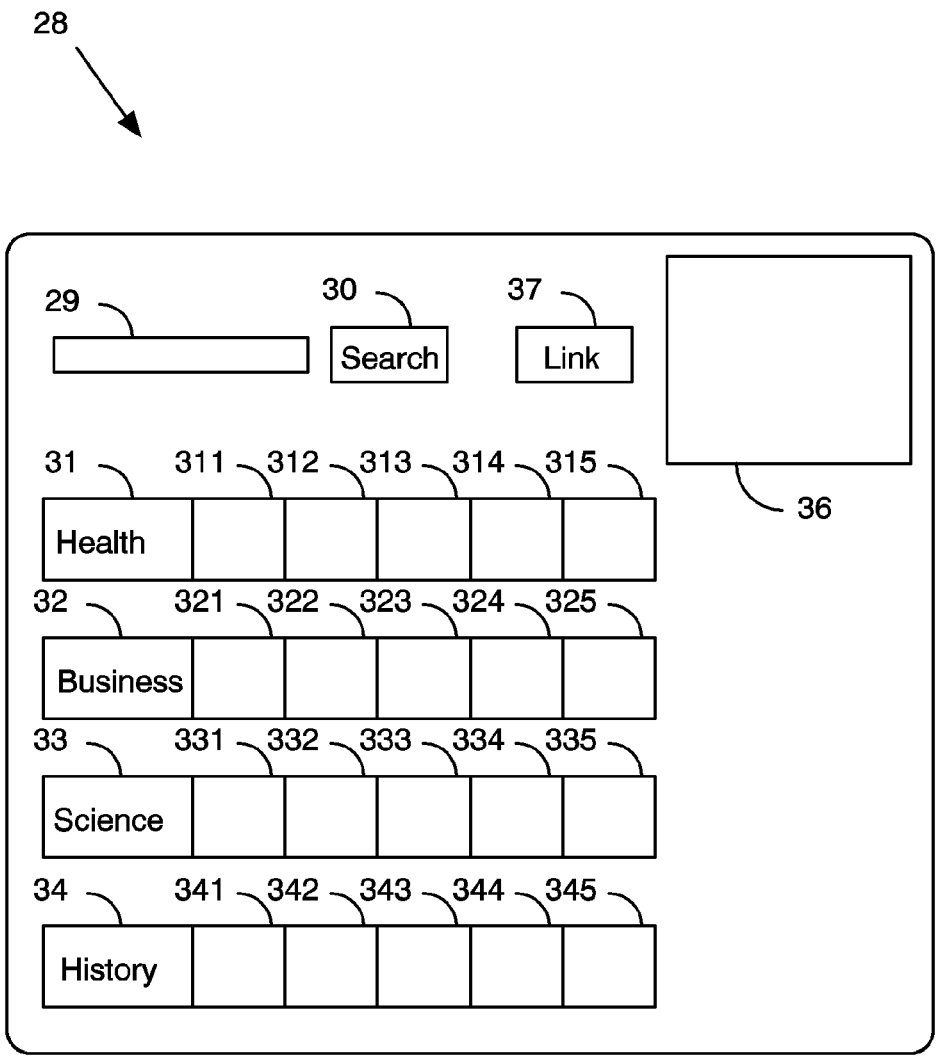
FIG. 3 is an illustration of a preferred embodiment of a network platform search results screen that displays a categorical directory, and a selectable multimedia display window.

FIG. 3 illustrates an optional preferred embodiment of a multimedia directory system that includes icons and multimedia files in the search results. When the user conducts a predetermined selection by category and sub categories to find information in relation to specific subject matter in relation to the category and sub category, the user can then view multimedia files within the selected category or sub category to preview site information and further determine if the site coincides with the subject matter the user wishes to review or to access. Each station 31-34 is associated with a particular subject matter category (e.g. health, business, science and history). Of course, there is no limit to the number of subject matter categories that can be established and searched. If an icon represents a multimedia file, it can be selected for display in window 36. This feature allows the user to preview the information available from a Web site found by the search in relation to the subject matter selected by the user. If the site appears to be of interest to the user, the user can then select button 37 to directly link to the Web site that streamed the multimedia presentation to the window 36.

Figure 4:
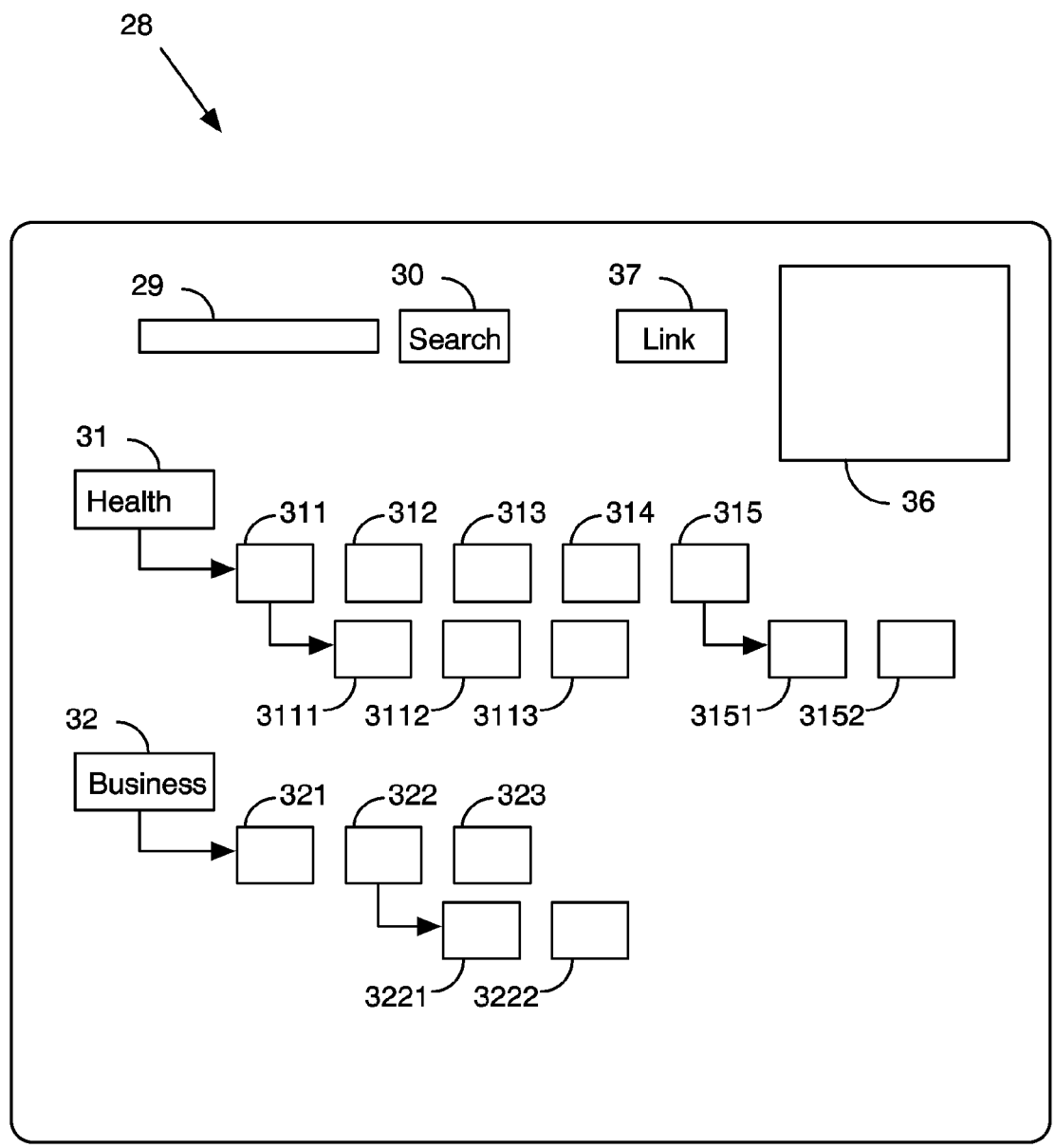
FIG. 4 is an illustration of an alternative preferred embodiment of a directory search results screen that displays stations, channels, programs, and a selectable multimedia display window.

In FIG. 4, an alternative preferred embodiment of the network platform system is shown. In this embodiment, the search results include station 31, which is directed to health related subject matter. The station 31 also has channels 311-315. Channel 311 has three programs 3111-3113 attached to it, and channel 315 has programs 3151-3152 attached to it. The same structure is shown in regard to station 32, which is directed to business related subject matter. Station 32 has channels 321-323 attached to it, and channel 322 has stations 3221 and 3222 attached to it.

The user may select program 3111 which for the sake of example may be an audio file. The user can select the audio file and program 3111 which will then be played through the sound system on the computer. The user may then decide to link to the Web site which streamed the audio file to it by selecting button 37. Likewise, if the program 3151 is an icon that points to the multimedia file on another Web site, the user can select the icon that will then display the multimedia file in window 36. After watching the multimedia presentation, the user may decide to link to the Web site which streamed the multimedia file to the user for display on the search results screen 28.

The following example illustrates a preferred embodiment of the numerical indexing used to identify and select stations, channels, and programs:

Example 1

Yahoo Corporation with multiple document entries under Station 1:

| | | |
|---|---|---|
| Yahoo.com | Home | Station 1 |
| Yahoo.com/shopping | Online Mall | Channel 1.1 |
| Yahoo.com/BillPay | Bill Paying Service | Channel 1.2 |
| Yahoo.com/BillPay/Phone | Phone Bills | Program 1.2.1 |
| Yahoo.com/BillPay/Electric | Electric Bills | Program 1.2.2 |
| Yahoo.com/Broadcast | Online Videos | Channel 1.3 |

The numerical indexing system illustrated above systematically organizes, and classifies data in a systematic manner so that it can receive multimedia and video content over the Internet in a format similar to that of a television. At the same time instead of advertising long document names they can advertise the station, channel, or program number.

Those skilled in the art will recognize that the stations, channels, and programs can be displayed on the search results screen 28 in any convenient manner, so long as the data is presented in an organized hierarchical manner such that a user is able to select a Web location and link directly to it, or in the alternative, the user can selectively display or play multimedia data on the search results screen and then decide whether or not to link to the external Web location after reviewing the multimedia presentation.

Figure 5:
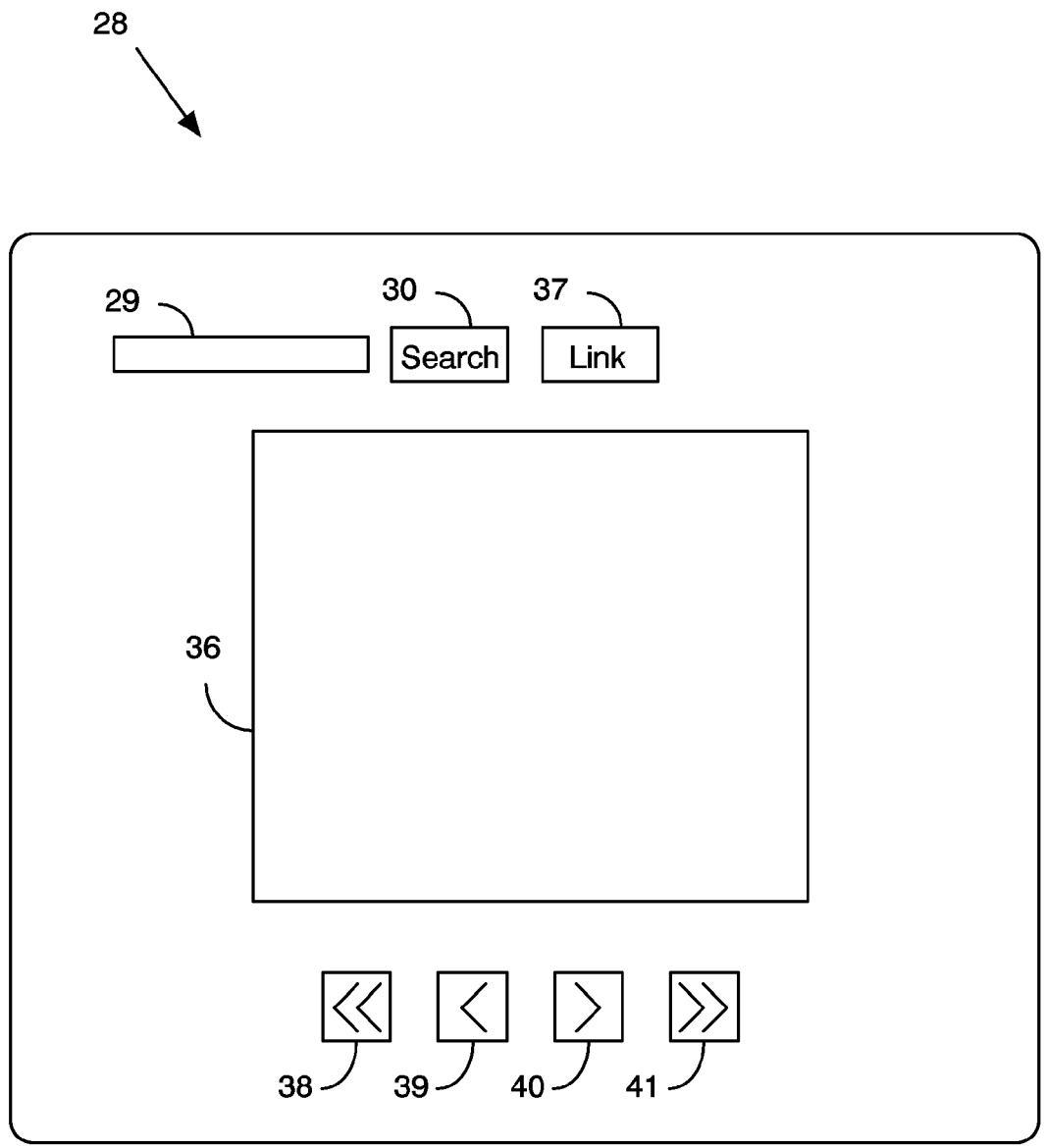
FIG. 5 illustrates another alternative preferred embodiment of a search results screen which displays individual multimedia search results in a multimedia display window. The multimedia files are automatically displayed and the user controls the stepping from one multimedia file to another.

In FIG. 5, another alternative preferred embodiment of the invention is shown. In this embodiment, the search screen 28 has an input window 29 to accept search parameters. Once the search parameters are entered, button 30 is selected to initiate a search. When the search is completed, the search results are presented as a multimedia file that is displayed in window 36. In this embodiment, the user steps forward and backward from one search result item to the next using forward and backward buttons 40 and 39, respectively. In addition, fast forward and fast reverse buttons 41 and 38, respectively, allow the searcher to move from one end of the search results list to the other end. Buttons 38-41 operate in the same manner as the forward and reverse buttons used on conventional recording devices such as cassette recorders and VCRs.

Once the user decides that a particular multimedia file displayed in window 36 is of interest, the user can then select link button 37 to link directly to the Web site that has supplied that multimedia file. This embodiment provides a pure multimedia search results list that allows the searcher to directly review multimedia search results without an intermediate step such as reading through text or selecting icons. Of course, this direct multimedia search capability could be combined with other search results such as listings and icon listings. This combined listing capability can easily be implemented by segmenting the search display screen.

Figure 6:
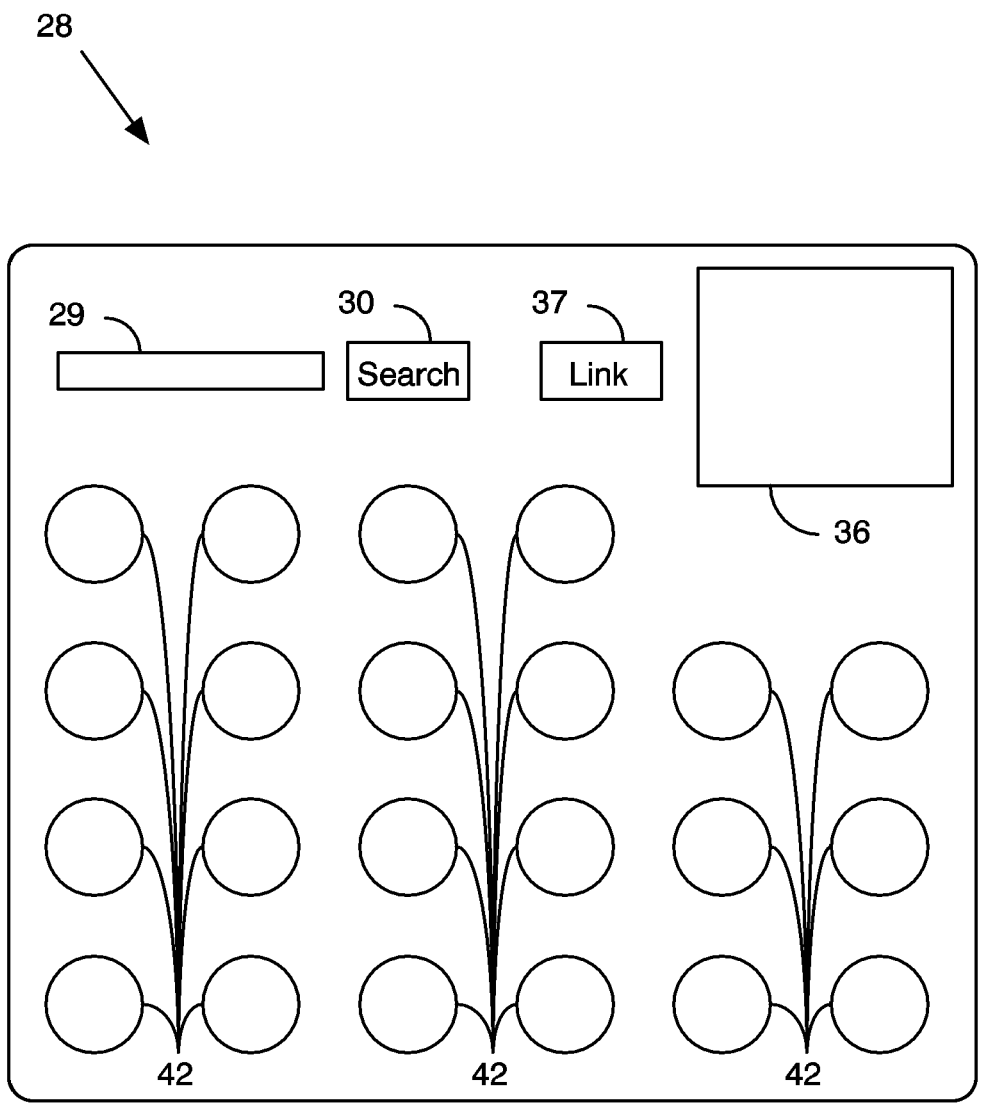
FIG. 6 illustrates yet another alternative preferred embodiment of a search results screen that displays individual multimedia search results in a multimedia display window. The multimedia files are displayed by selecting an icon on the search results display screen.

FIG. 6 illustrates another preferred embodiment. In this embodiment, the search results are displayed as a series of icons 42. When the searcher selects an icon 42, the Meta tag data associated with the icon is used to access the multimedia file which is then displayed on the search results screen window 36. After review of the multimedia file, the searcher can decide whether or not to link to the remote Web site associated with the icon. If the searcher decides to link to the remote Web site, the link button 37 is selected to initiate the transfer.

Figure 7:
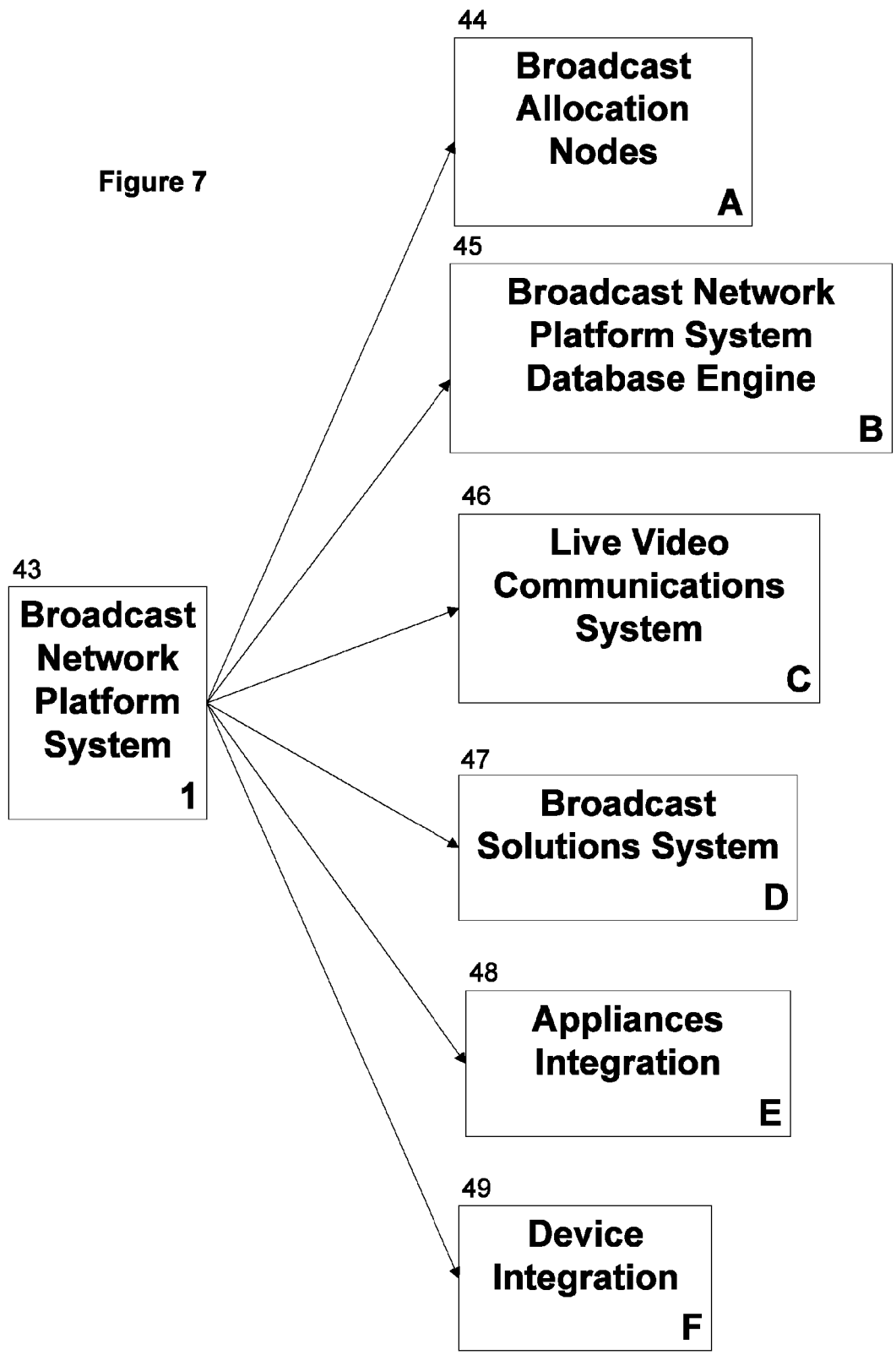
FIG. 7 is a block diagram that illustrates the main components in the broadcast network platform system administration.

The administration system in this continuation application is designed to maximize usage of the broadcast network allocation nodes and provide an end-to-end video and broadcast network system and solution platform administration. The following figures illustrate the backend portion of the system which allows remote websites to control the content of material presented to searchers by the system:

In regard to FIG. 7, this figure illustrates the main components listed in order of importance in the broadcast network platform system administration 43. Node A 44 represents a broadcast allocation node that a numerical indexing system uses to group networks, sub networks, categories and sub categories into network nodes to enable the system to access those nodes in an orderly manner.

Node B of FIG. 7 is a database engine 45 for the purpose of managing binary video data. The video binary database is an important component of the system due to its ability to provide high-performance data delivery to remote systems. It is the underlying component that the broadcast network Database Management System ("DBMS") uses to create, retrieve, update and delete ("CRUD") video binary data from the database. The database engine is accessible via the DBMS's own user interface, or through a network port.

Node C of FIG. 7 is the live video communications system 46 that enables clients to monitor media views and user interaction with media files. The system also enables clients and content owners to communicate with content viewers and users and enter into dialog with them. The system also enables users to communicate with content owners, and/or sales reps and enter into dialog with them. The system also enables clients to PUSH (i.e., present users with more video content, links, literature, and forms to users in relation to video content) data to users.

Node D of FIG. 7 is the broadcast solutions system 47 for managing video products and solutions. The system has the ability to customize products with a user-friendly drag and drop interface that sets up the underlying code.

Node E of FIG. 7 is the network appliances integration system 48 into the network's broadcast allocation nodes. Networks can place these appliances into their current networks and seamlessly integrate to the broadcast network platform system through an intranet or extranet for public networks or private networks.

Figure 8:
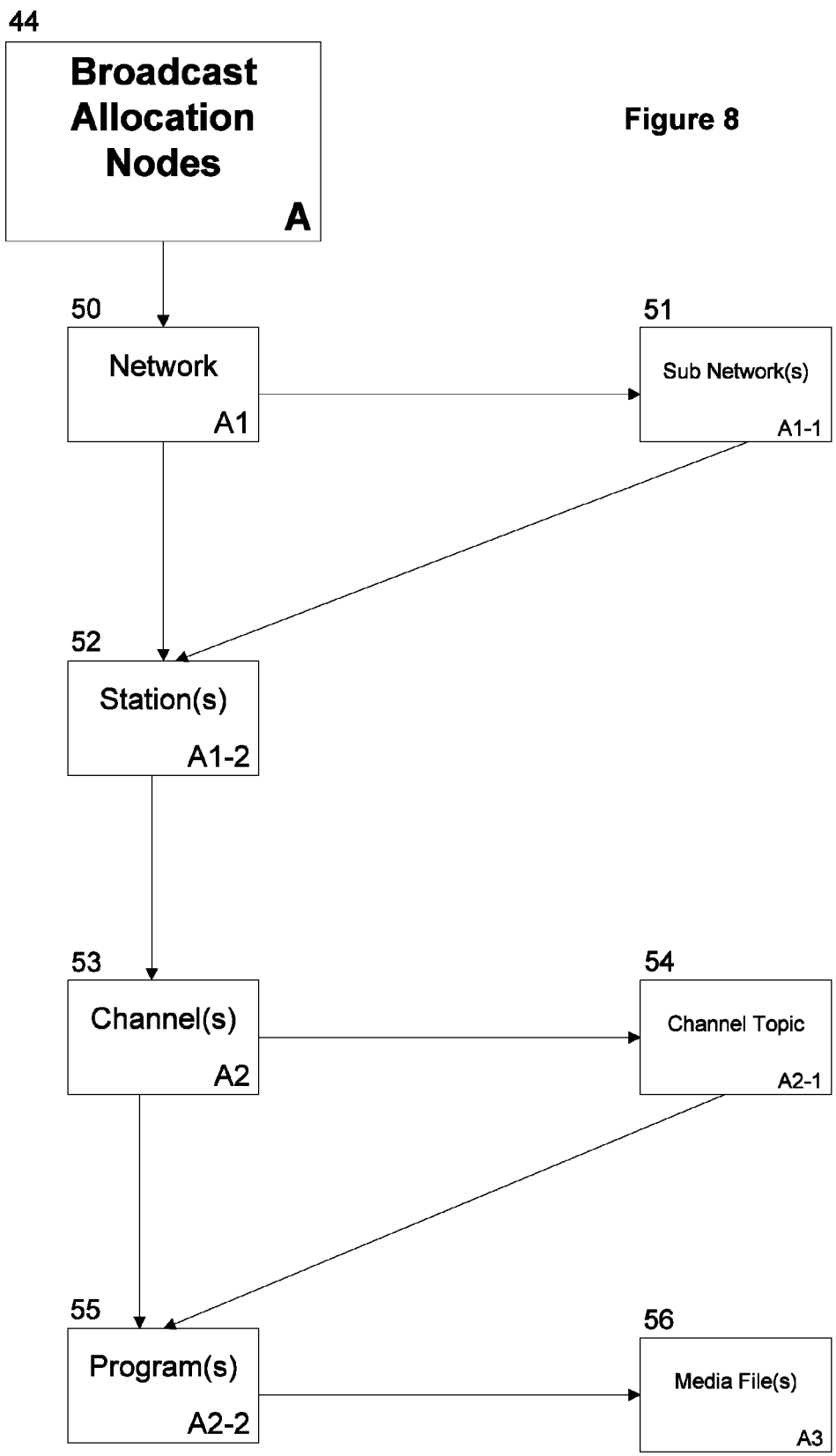
FIG. 8 is a block diagram that illustrates the broadcast allocation nodes utilized to group networks, stations, channels and programs.

Node F in the network device integration system 49 that enables network devices to interact with the broadcast network platform system's front-end and back-end. Regarding FIG. 8, Node A 44 is representative of the broadcast allocation nodes utilized to group networks 50, sub networks 51 and categories and sub categories into network nodes. Node A1 is representative of the administration of a network 50 such as entering account information and network description. When the network 50 is the top network node and has no sub-networks 51, as illustrated as Node A1-1 the network 50 can be its own station 52 as illustrated in Node A1-2. If the network has sub-networks 51 then the network remains the network and the sub networks become the networks station nodes 52 as illustrated in Node A1-2. The system provides a means to submit a network, to select a parent network, to manage affiliate networks from the parent network Visual Client interface. Node A2 53 is representative of a network's station node ability to set up channels to represent sub categories, departments, or topics of the network station and identify them into channels 54 by topic as represented in Node A2-1 or by location. The system also provides the means to make a distribution channel public or private. The channels of video broadcasting for the station can be public or private channels; meaning that public distribution channels can accept video from other networks and/or entities and private networks will only accept video from within the network station or its affiliate stations. Node A2-2 is representative of the programming 55 that goes into the channel by means of the media file's 56 selected programming directory. Node A3 is representative of the media file that inputted into the channel after selecting the programming directory.

Figure 9:
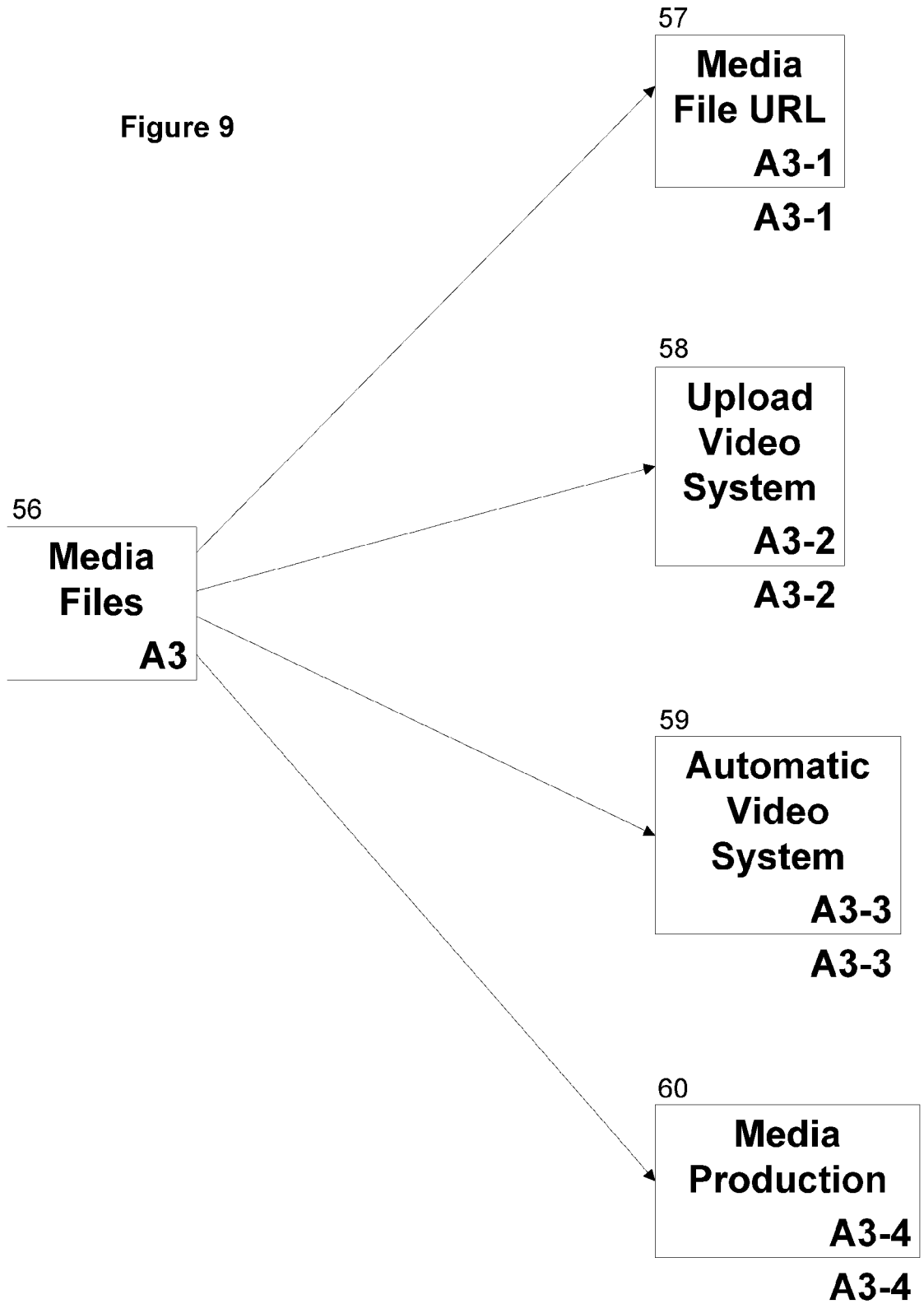
FIG. 9 illustrates the types of video submissions that can be administered within the broadcast network platform system.

Regarding FIG. 9, Node A3 56 illustrates the various methods in which video information can be stored into the system. Node A3-1 57 shown you think it would be one means no one as it was in was it avoids is the indication of the simplest video into the system and that is a video URL hosted by another entity other than the system. Node A3-2 58 is the upload of a video into the system to be hosted by the system or by a remote server hosted by another entity. Node A3-3 59 is the automated video production system that can generate the video automatically based on inputted data and uploaded or system assets. Node A3-4 60 is the Media Production and services provider pool and modulated system where the system sends the user's pre-determined request for a video produced by a service provider company for them to upload and/or host a video.

Figure 10:
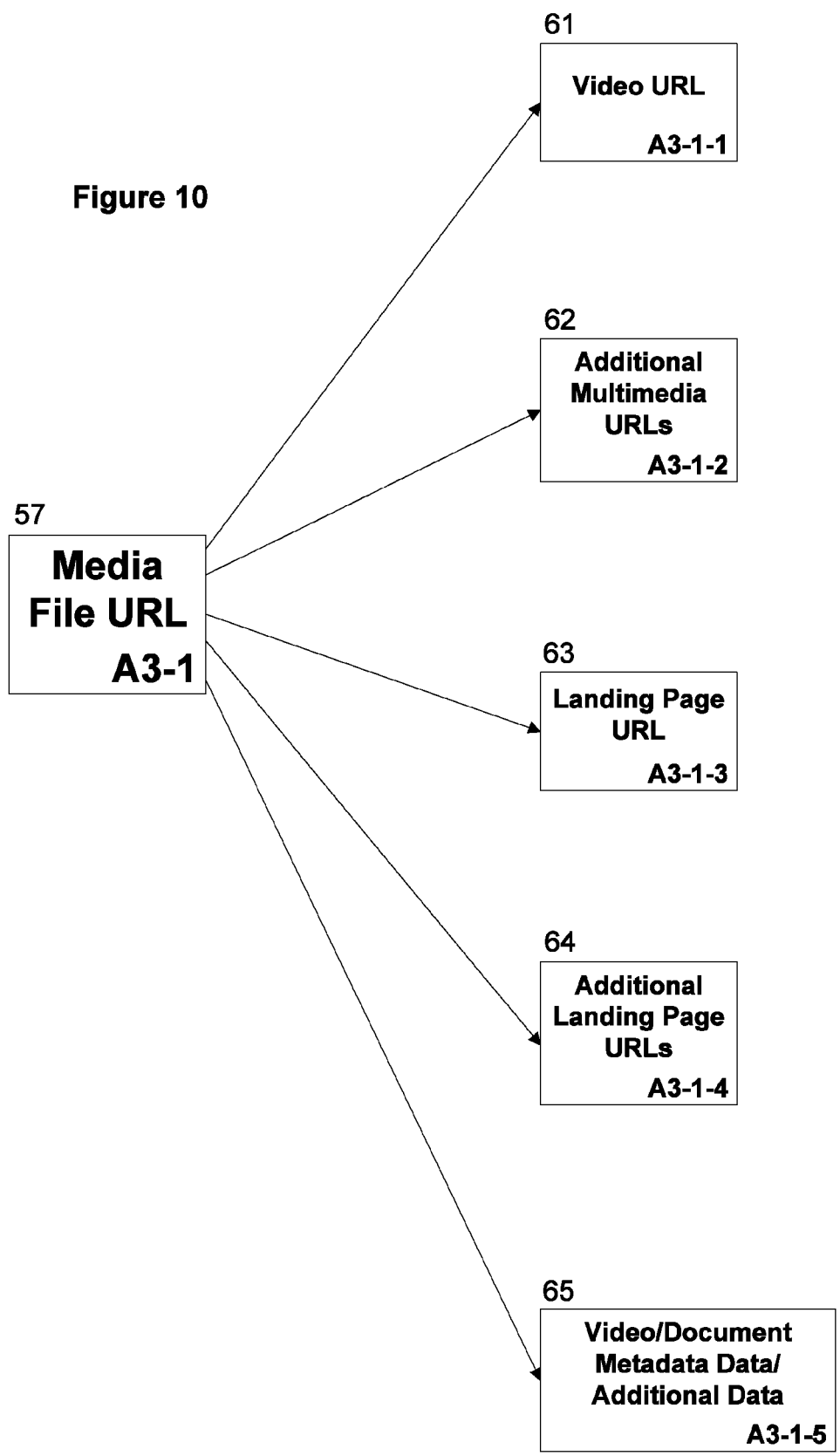
FIG. 10 illustrates the insertion of a media file's URL as a method of adding video into the system and related Metadata.

FIG. 10 illustrates the insertion of a media file's URL as the simplest way to add a video into the system. Node A3-1-1 61 is the video URL being entered into a form field, Node A3-1-2 62 is the additional multimedia URLs associated with the original media File URL such as images, animations or previews. Node A3-1-3 63 is the primary landing page URL that is entered into the system that coincides with the media file; and that the media file represents or is representative of the media file or is utilized to provide more information on or about the media file. Node A3-1-4 64 represents any additional URLs representative or related directly to the media file. Node A3-1-5 65 is the representation of any additional Metadata or multimedia URLs or related URLs into the system that are related directly with the media file.

Figure 11:
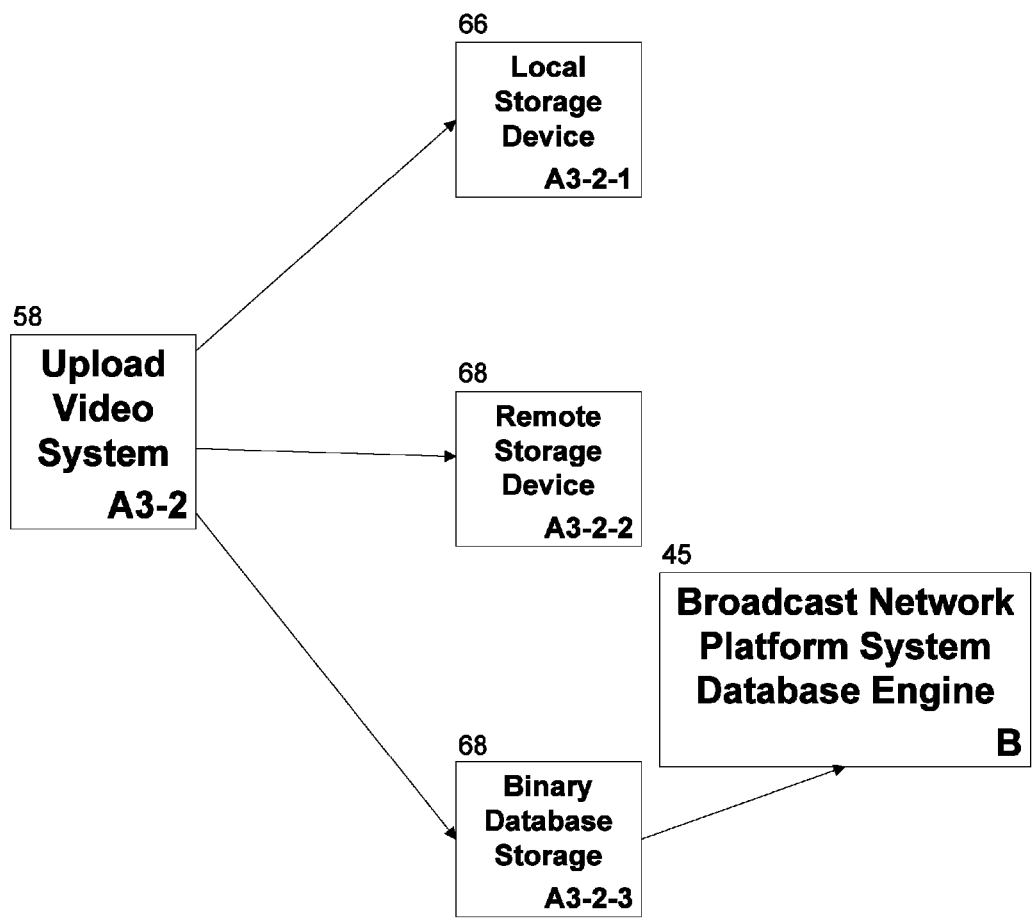
FIG. 11 illustrates the video upload/storage portion of the system.

FIG. 11 represents all nodes Node A3-2 58 with relation to a video being uploaded into the system. Node A3-2-1 66 is representative of a video being uploaded into a local server or remote server on the same network. Node A3-2-2 67 is representative of a video being uploaded into a remote server on another network using UNC or some other technology to store data on remote networks or systems. Node A3-2-3 68 is representative of a video being uploaded directly into the database in binary form. Video is then stored into a blob. A blob is a binary large object, and is a collection of binary data stored as a single entity in a database management system. Blobs are typically images, audio or other multimedia objects, though sometimes binary executable code is stored as a blob. Node B 45, is an internal binary database engine that is tailored uniquely for managing and disseminating video content and associated Metadata in binary form with the ability to reside in memory. Because database support for blobs is not universal internal database used by the invention can supply binary data to any user system.

Figure 12:
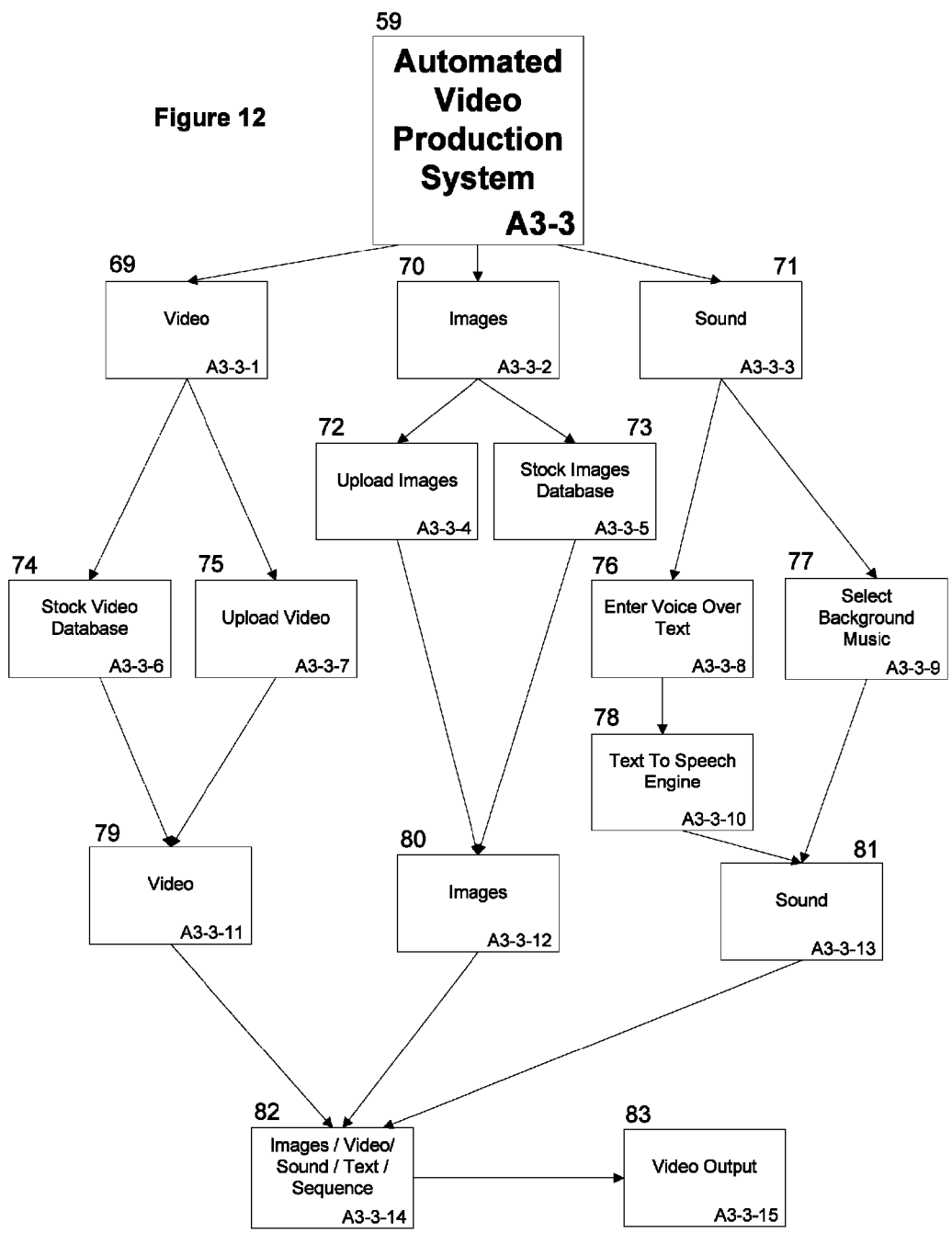
FIG. 12 is a block diagram that illustrates the automated video production system used by the invention.

In regard to FIG. 12, the automated video production system in Node A3-3 59 illustrated. All steps in Node A3-3-1, Node A3-3-2 & Node A3-3-2 69-71 are optional required to produce a video. Node A3-3-1 69 is representative of video content to be utilized to create a custom video by the system. Node A3-3-2 70 contains the images utilized to create a video by the system and Node A3-3-3 71 is the sound voice, voice-overs or music utilized to create a video. Node A3-3-4 72 is representative of a stock images database maintained by the system where a user can select images representative of the message the video is trying to relay. The stock images system database is categorized and classified in order to make navigation based on topics related to the initial media order entry. Node A3-3-5 73 is where the user uploads his own images for the video creation selecting not to use the system's stock images. Node A3-3-6 74 is representative of a stock footage database maintained by the system where a user can select video representative of the message the video is trying to relay. The stock footage system database is categorized and classified in order to make navigation based on topics related to the initial media order entry. Node A3-3-7 75 is where the user uploads his own videos footage for the video creation selecting not to use the system's stock footage. Node A3-3-8 76 is the voice-over text the user types into the system in order to have a voice-over done for the video. Node A3-3-9 77 is the sounds or music utilized in the background for the video if selected. The system maintains a database of sounds and music loops and tracks to create background sounds, sound effects and music for videos. The user can elect to bypass the step and upload his own voice or video file for video creation. Node A3-3-10 78 is representative of a text-to-speech engine using speech synthesis, which is the artificial production of human speech. A computer system used for this purpose is called a speech synthesizer, and can be implemented in software or hardware. A text-to-speech (TTS) system converts normal language text into speech; other systems render symbolic linguistic representations like phonetic transcriptions into speech. The user can select male, female or several languages to interpret the typed in voice over text for the video creation. Nodes A3-3-11, A3-3-12 and A3-3-13 79-81 are the accumulated/selected digital assets utilized in video creation. Node A3-3-14 82 is the sequence in which the Nodes A3-3-11, A3-3-13 and A3-3-13 79-81 are combined to create a video. Node A3-3-15 83 is the video output with all components combined.

Figure 13:
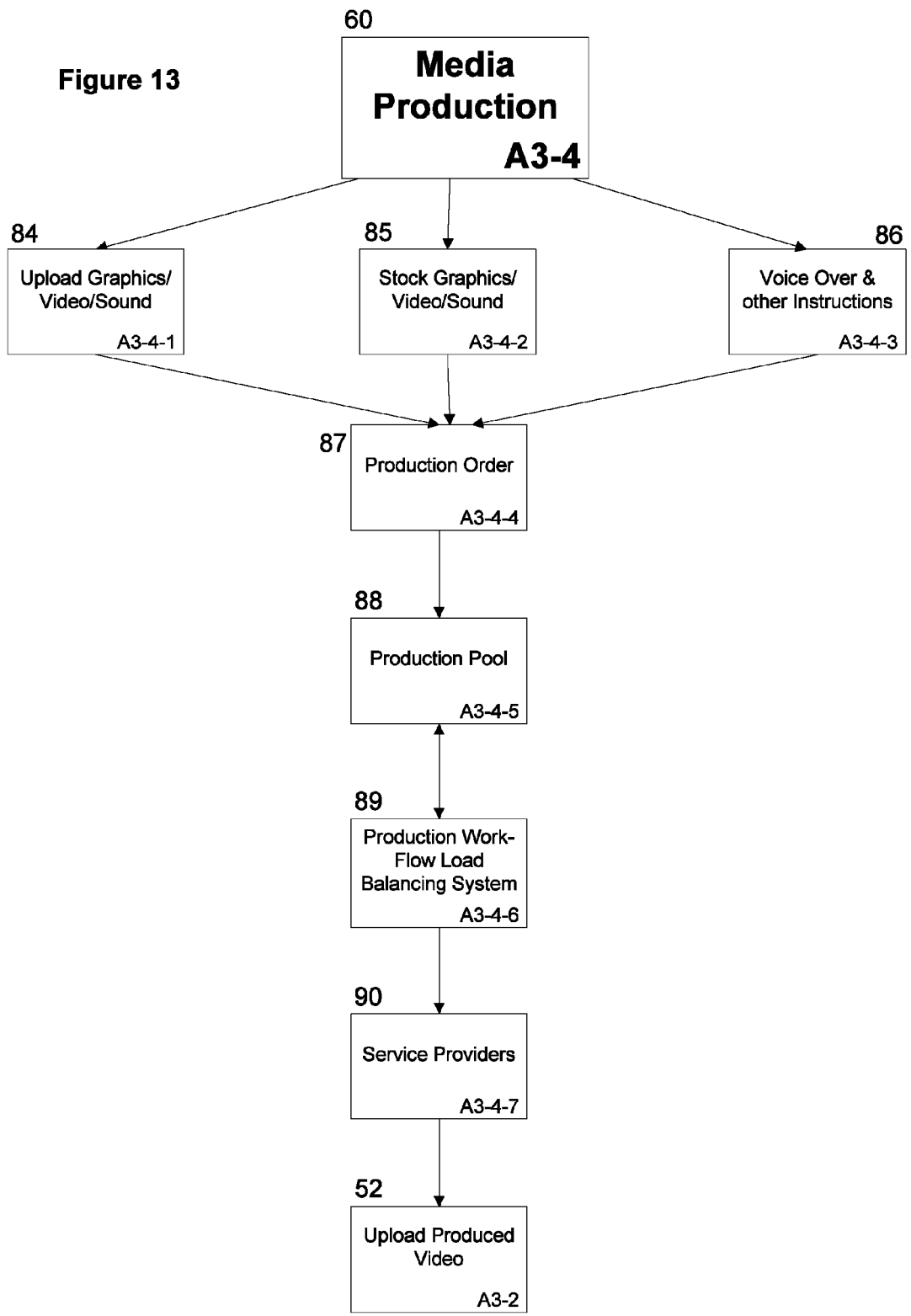
FIG. 13 is a block diagram that illustrates media production system used by the invention.

FIG. 13 contains all nodes pertaining to the media production and service provider pool system. Where Node A3-4 60 representative of the media production system. Node A3-4-1 84 provides the ability for users to upload graphics, video footage and sound on the add order form for a video to be produced by a service provider. Node A3-4-2 85 is the ability for the user to select stock video footage, stock graphics and stock sounds and music from the digital assets stock database based on categories from the original order entry. Node A3-4-3 86 is the voice over script and any additional instructions or data or Metadata pertaining to the video being produced. Node A3-4-4 87 is the media order with all assets for the media order as it is being processed into the production pool. Node A3-4-5 88 system enables service providers to add sub-service providers in pre-assigned pools according to service provider characteristics. The system also has an algorithm based on characteristics and criteria entered about the service provider to be able to manage work flow based on the service provider's capabilities and/or predetermined agreements or arrangements. The system performs load balancing for media production orders and production chaining for the various steps involved in video production from multiple service providers; one example of this chaining feature would involve a service provider company using a sub service provider to create a voice over, another sub service provider for special effects and another for video editing, the sequences in steps of the order process would be chained in order of execution per task to finalization of the final product video. Another example of the pools ability to load balance would be expressed by a service provider that can only handle 10 media orders at a time. The system would then send the next media order placed to the next available service provider based on the profile entered for the service provider. These load balancing and work flow chaining features are illustrated in Node A3-4-6. Node A3-4-7 86-87 and are representative of the various service providers and sub service providers that can be entered into the system. The service provider system has the pools management interface, service provider interface and pool assignment system as well as an independent interface for service providers to login and manage their orders. The system is further enhanced by enabling the service providers to upload orders to the system by means of Node A3-2 52 system upload features as shown in FIG. 1. Users have the ability to send orders back to a production queue for further production or editing before going live with the video.

Figure 14:
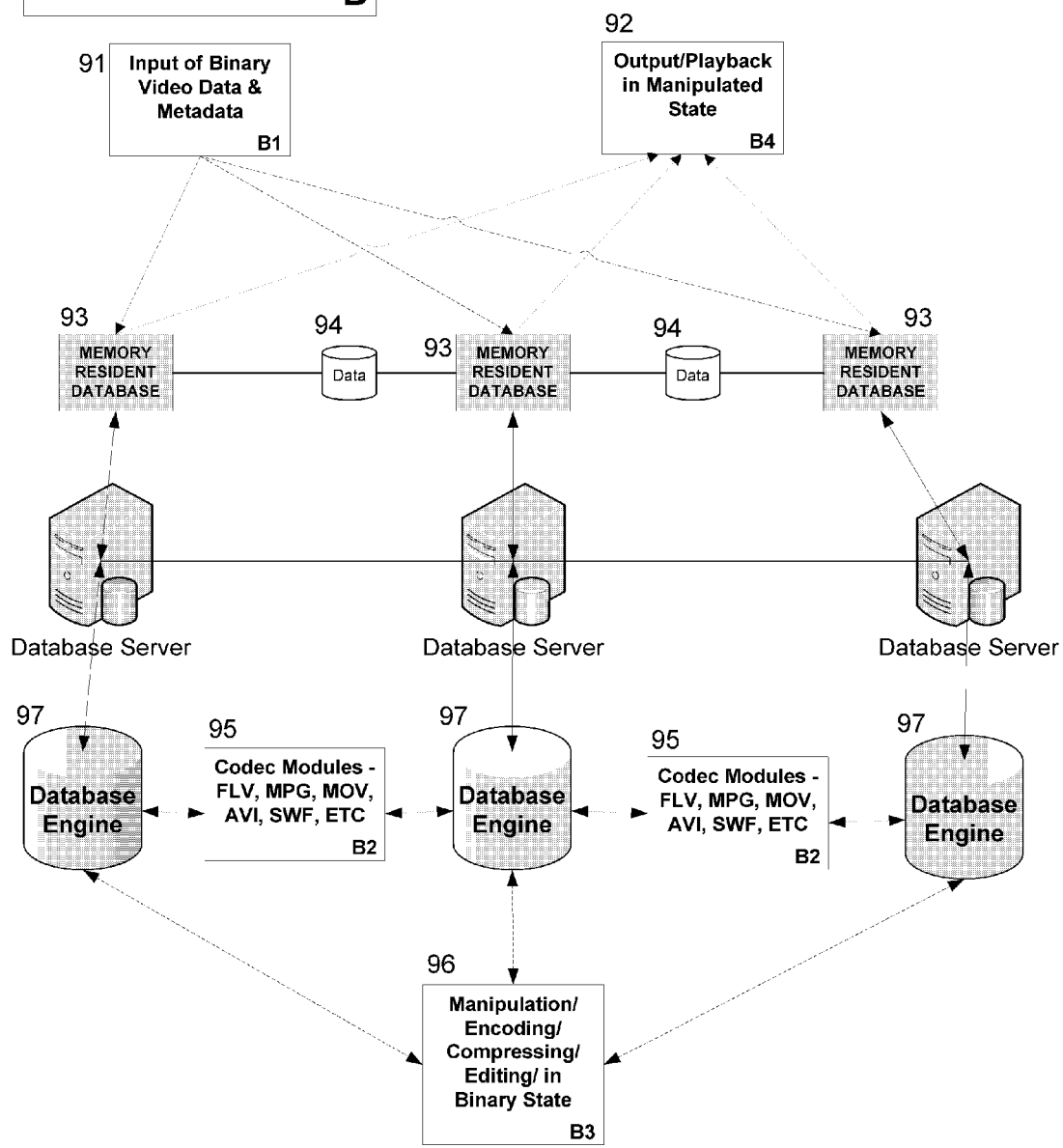
FIG. 14 is a block diagram that illustrates the broadcast network platform system database engine.

In FIG. 14, Node B 45 illustrates the broadcast network platform system database engine. This is a database engine for the unique purpose of understanding and handling binary video data and it is the underlying component that the broadcast network Database Management System (DBMS) uses to create, retrieve, update and delete (CRUD) video binary data from a database. One may command the database engine via the DBMS's own user interface, and/or through a network port. Node B1 91 is representative of a video upload in binary mode selection. The video is uploaded with its related or associated Metadata into the database in binary form. A video being uploaded directly into the database in binary form is then stored into a video blob. A video blob is a binary large object dedicated for video binary data, a video blob is a collection of binary data stored as a single entity in a database management system for the purpose of understanding video binary code. The blob is located, but not limited to a memory resident database 93. To enhance performance, the database is memory resident, and preferably uses hard drives 94 for back up only. However, those skilled in the art will recognize that any suitable data storage device can be used to store the database. Binary video data stored in blobs in a database residing on memory will play back faster and be more easily manipulated. Node B2 95 is where the database engine 97 can accept modules to read, understand, convert or encode video binary code on the fly. Node B3 96 is where video can be manipulated, encoded for media player format playback, compressed for mobile or HD devices or edited and spliced in binary state for commercial injection of pre-roll, mid-roll and post-roll commercials. The database engine 97 will also take incremental or sequenced snap shots of the database and back it up in devices such as hard drives or other storage devices. The database engine 97 enables databases to be clustered and replicated in memory and runs in memory. The database engine 97 enables databases to output video binary data and Metadata in memory in real time and output playback can be manipulated in memory as shown in Node B4 92 where playback format can be determined by the requested player and formatted for playback in binary form at the time of playback. Video binary data can be manipulated with ease and viewed in the requested format managed by the database engine 97.

Figure 15:
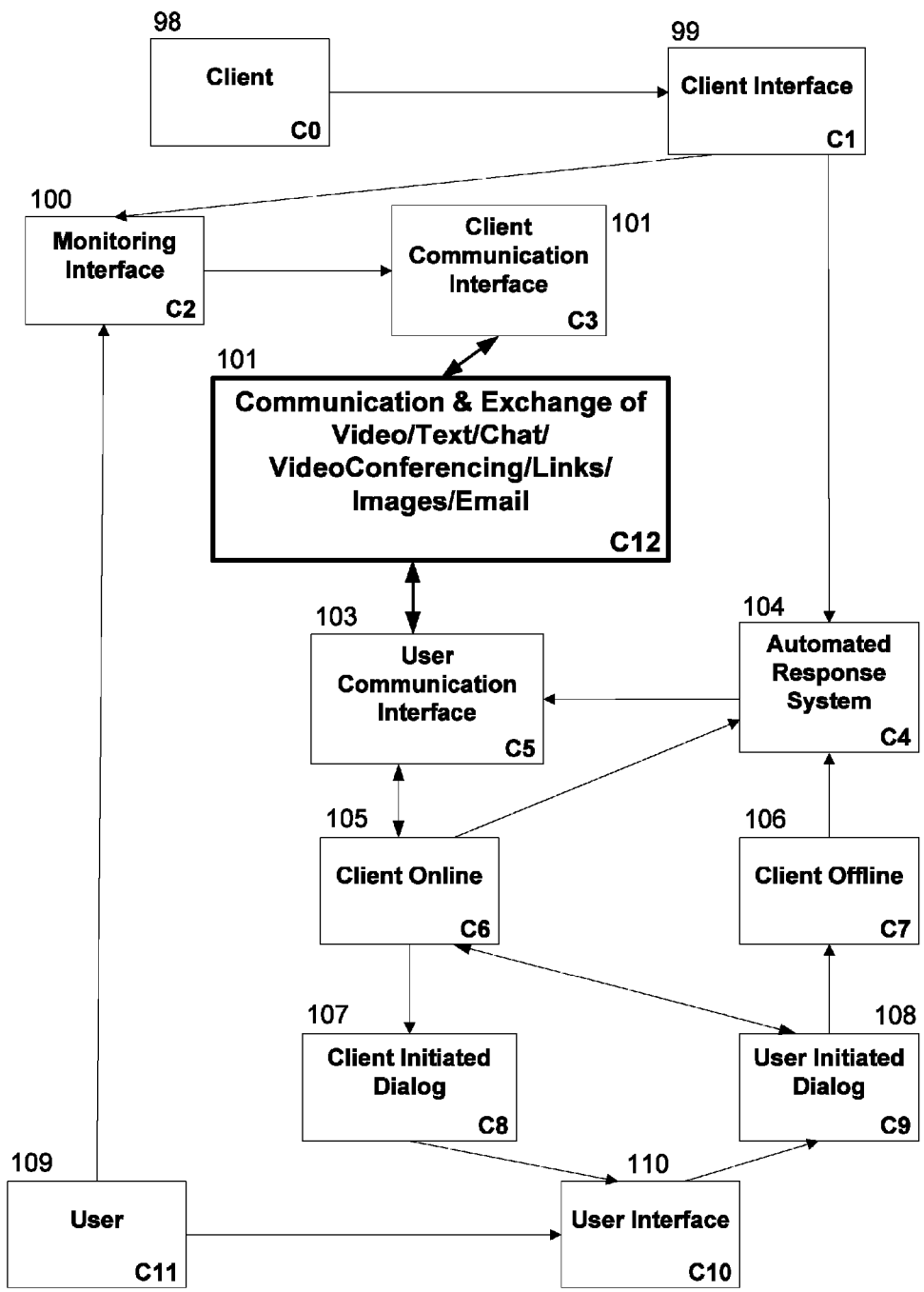
FIG. 15 is a flowchart that illustrates the live video communication system.

FIG. 15 is a flowchart illustrating the nodes used in the live video communication system. Node C0 98 is where the client is the content provider or the system client. Node C1 99 is the client interface where the client manages his live video service account. Part of the client administration is to enter into the system pre-determined questions and responses for the automated response system demonstrated in Node C4. Automated responses can be commonly asked questions and their responses, links that can be outputted to the user in response to a question or request such as a credit application or a PDF portable document format literature, or an image, or a video or multiples of the same. In a case of an auto sales person, he may keep videos of cars to be played in the user's video player window of the user interface upon dialog with a sales person. Another aspect of the client interface is where the client can manage his departments, the employees in his departments, assign rights and permissions to employees, see records of his dialogs with users or his employees dialog with users. Node C2 100 in the client video monitoring where in Node C11 109 a session is created and the user is identified by the system upon watching a client's video, then the client can see the user once the session is initiated by the user upon clicking to watch the client's video and the client can then elect to commence a dialog with the user. In Node C3 101, once the client is initiating a dialog with the user the client is presented with the client interface with the user's session ready for dialog initiation. The user is then prompted to enter into dialog with the client. The user can elect to not enter into dialog or can select to enter into dialog with the client. In Node C8 107 the user, upon entering into dialog with the client, the user and the client are presented with their respective communication interfaces in Node C3 101 for the client and Node C5 103 for the user and initial dialog remarks to commence the dialog. These initial dialog remarks can be pre generated or their initial remarks to commence the dialog. The dialog can be in text chat format or video conferencing format or video chat format. In Node C12 101, the client and the user can exchange communication dialog. The client also has the ability to send the user videos in response to a user's inquiry in order to provide more information. For instance the user may be looking at a car that is the color red in the player window. The client may then present the user with a video of the car in blue, yellow or green or the client may present the user with a totally different model that will play in the user's player window. The client may also send the user links, images, portable document formatted (PDF) literature, credit applications, forms, emails or other items of interest. These items of interest will open in the client's end, as is further described in FIG. 16. Another aspect to this invention is the user's ability to commence a user initiated dialog with the client in Node C9 108. The user will see two client status indicators Node C6 105 and Node C7 107, when the client is monitoring his videos through the monitoring interface on Node C2 100, the user will get an online indicator for the video when it is presented to the user. If the client is not monitoring his videos in Node C2 100, the user will get an offline indicator when watching the client's videos. The user can then elect to click on the indicators to commence a user initiated dialog. If the client is offline as in Node C7 107, the user will be presented with predetermined questions and responses from the automated response System in Node C4 104. This automated response system will contain questions that can best resemble the user's inquiries or a search bar for the user to search for information. The responses contained in the automated response system can be video, links to information or action items such as forms or sound recording with information regarding the initial inquiry. Finally the user can send the client an email for more information if the automated response system has not satisfied the inquiry. If the client is online the user will be presented with the user communication interface Node C5 103 and the user can request dialog with the client. The client will receive a dialog requesting the monitoring interface in Node C2 100, the client can then elect to accept the dialog in Node C12 101 or transfer the dialog to another employee that is monitoring the client's videos or dismiss the dialog altogether where the user will get the option to use the automated response system or email the client upon receiving a client is busy notification.

Figure 16:
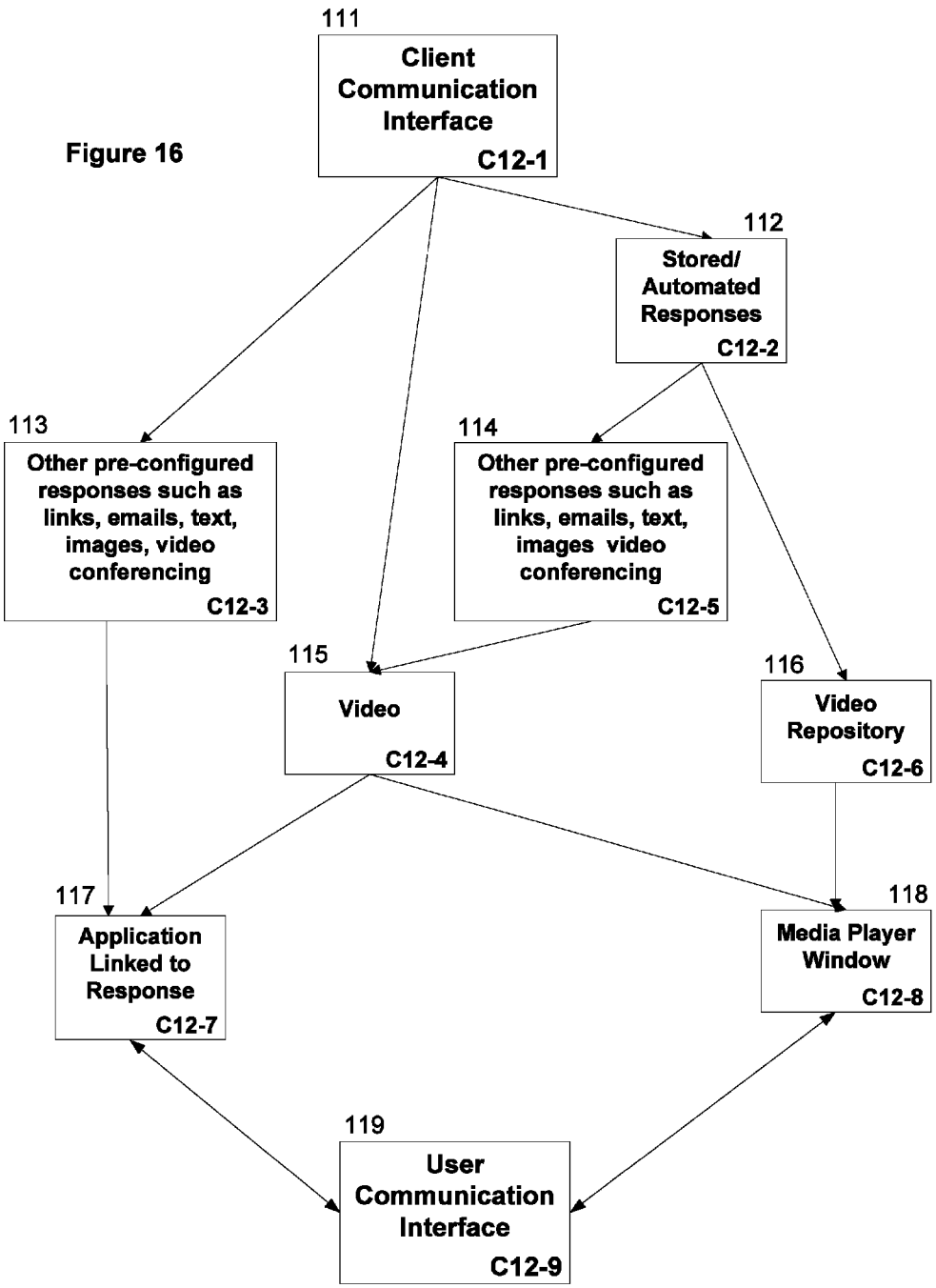
FIG. 16 is a flowchart that illustrates the client communication interface.

FIG. 16 further illustrates Node C12 101. In it, the client communication system 12-1, 111 controls the automated response system, where the automated response system in Node C12-2 112 has pre-determined responses to specific inquiries such as videos, links, emails, documents, forms, or sounds as in Node C12-5 114. In Node C12-3 113 the automated response system is being utilized by the client in order to provide quick responses to frequently asked inquiries and quick access to video in Node C12-6 116, files, links, forms and other responses stored in the automated response system, otherwise those responses can be submitted to the user on the fly and upon request as in Node C12-4 115. The videos in Node C12-6 160 or in Node C12-4 115 are presented to the user in the media player window as in Node C12-8 118 and other responses such as links to web pages, forms PDFs, sounds text will present themselves in a separate window or the same window with the associated application to the file. So for example in Node C12-7 117 if a client sends a PDF document of a red car to the user as literature and specifications a window with adobe acrobat can open with the document. On the other hand if the client wants to redirect the user to another section of the website the client can then elect to simply direct the user to the appropriate webpage without a separate window while still maintaining the user communication interface in Node C12-9 119.

Figure 17:
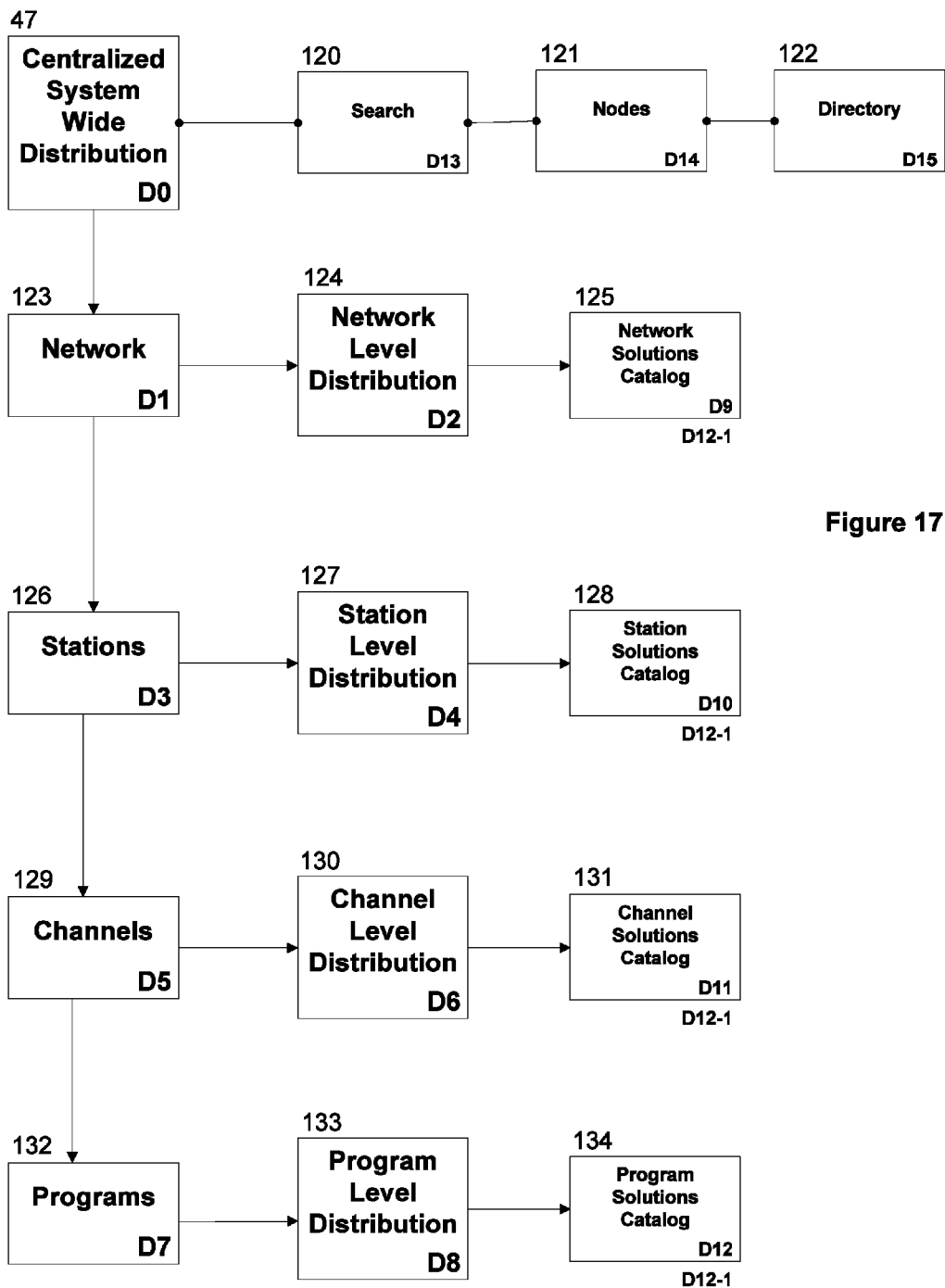
FIG. 17 illustrates the distribution system used by the invention.

FIG. 17 illustrates the underlying components of a centralized distribution platform for the media content in the system. By putting networks and sub-networks, categories and sub-categories into broadcast allocation nodes, the system can effectively search, categorize, index and cross reference by the same listed criteria while making the interne smaller and refining their search criteria into networks or categories or topics of video and websites. Node D1 123 further illustrates in the system how we can partition from a centralized distribution system into broadcast allocated distribution systems where a network level distribution system in Node D2 124 can have sub networks as stations in Node D3 126. In Node D2 124 the network level distribution would include any sub-stations Node D3 126, channels Node D5 129, programs Node D7 132 and files under the network in Node D2 124. Node D3 126 illustrates how a top level network with no sub stations can become the station himself, with channels of distribution Node D5 129, programs Node D7 132 of media file content. Node D6 130 illustrates a channel level content distribution with its programs and media files. Node D8 133 illustrates a program level of distribution for media files. Nodes D9 125, D10 128, D11 131 and D12 134 are further illustrated in FIG. 18 Node D12-1, where they illustrate in greater detail the various distribution products in the Solutions Catalog that work with the Broadcast Allocated Distribution Levels. It should be noted that the most natural state for broadcast allocation node content distribution is in a state of pure data which in today's internet can be RSS (Real Simple Syndication) or XML (Extensible Markup Language).

Figure 18:
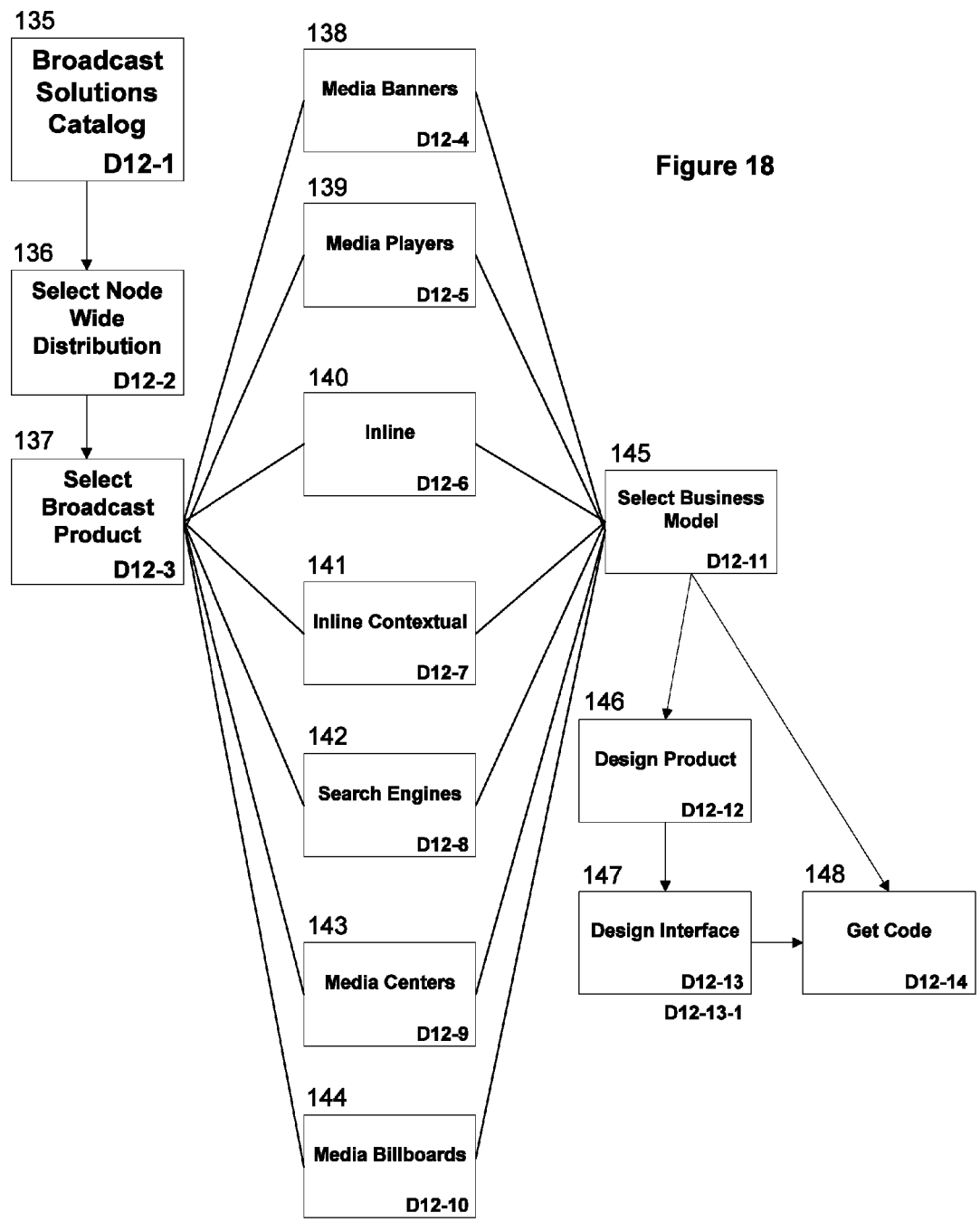
FIG. 18 illustrates the broadcast solutions catalog used by the invention.

Regarding FIG. 18, Node D12-1 illustrates the broadcast solutions catalog 125 128, 131, 134 where in FIG. 17 a node was selected for the level of distribution Node D12-2 136. Once a selected distribution was made whether it is a network wide, station wide, channel wide or program wide product a product can be selected in Node D12-3 137. Nodes D12-4, D12-5, D12-6, D12-7, D12-8, D12-9, D12-10, respectively 138-144, are representative of products in the catalog such as media banners, media players, inline media ads, inline contextual ads, video search engines, media centers, media billboards that display videos according to the broadcast allocation node it was intended to allocate videos for. In Node D12-11 145, upon selecting the product several business models are available for the allocated broadcast node such as pay per view, pay per listing, pay per click, pay per syndication or pay per subscription. A product can have a default design or can be customized in Node D12-12 146. Node D12-13 147, and further described in FIG. 19, the design interface enables the product to be easily modified and designed without needing to work or modify the underlying code through a interactive graphical display interface. Once the product is designed the code is made available for quick insertion into the broadcast allocated site with simple cut and paste or other integration solution.

Figure 19:
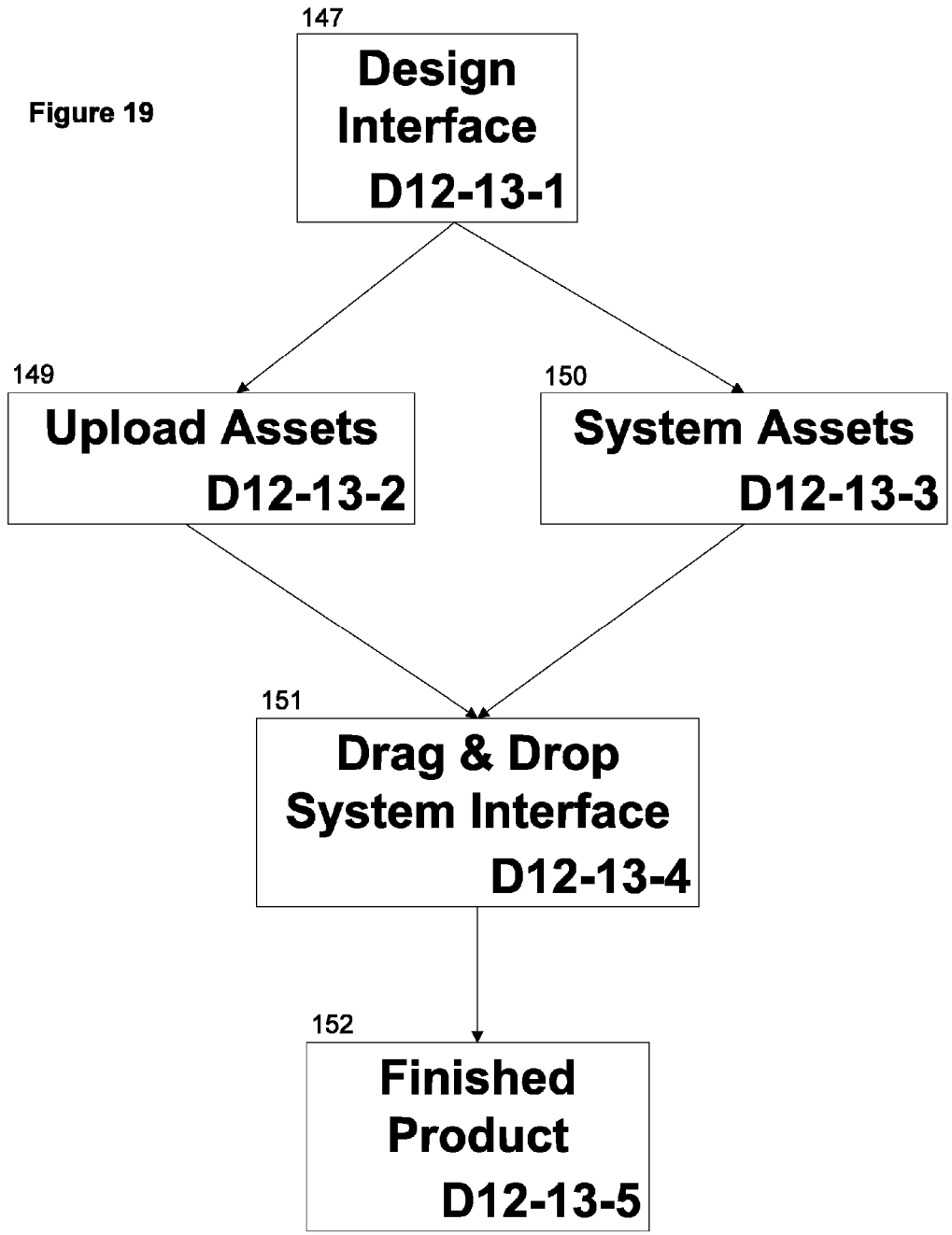
FIG. 19 illustrates the system's broadcast solutions design interface.

FIG. 19, Node D12-13-1 147, further illustrates the systems design interface for those entities that elect not to use RSS or XML to manage their content and have elected to use our products catalog we provide a very easy to use product design interface. The interface can be designed with images and assets uploaded as in Node D12-13-2 149 by the client such as logos, interface images, buttons, sounds, etc. or the client can use the systems database as in Node D12-13-3 150 of interface assets or the default interface for the product. The system provides the client with the design interface in Node D12-13-4 151 where the client can drag and drop upload or system elements and components to design the product. Once finished he can then save it and the finished product code is made available for integration Node D12-13-5 152.

Figure 20:
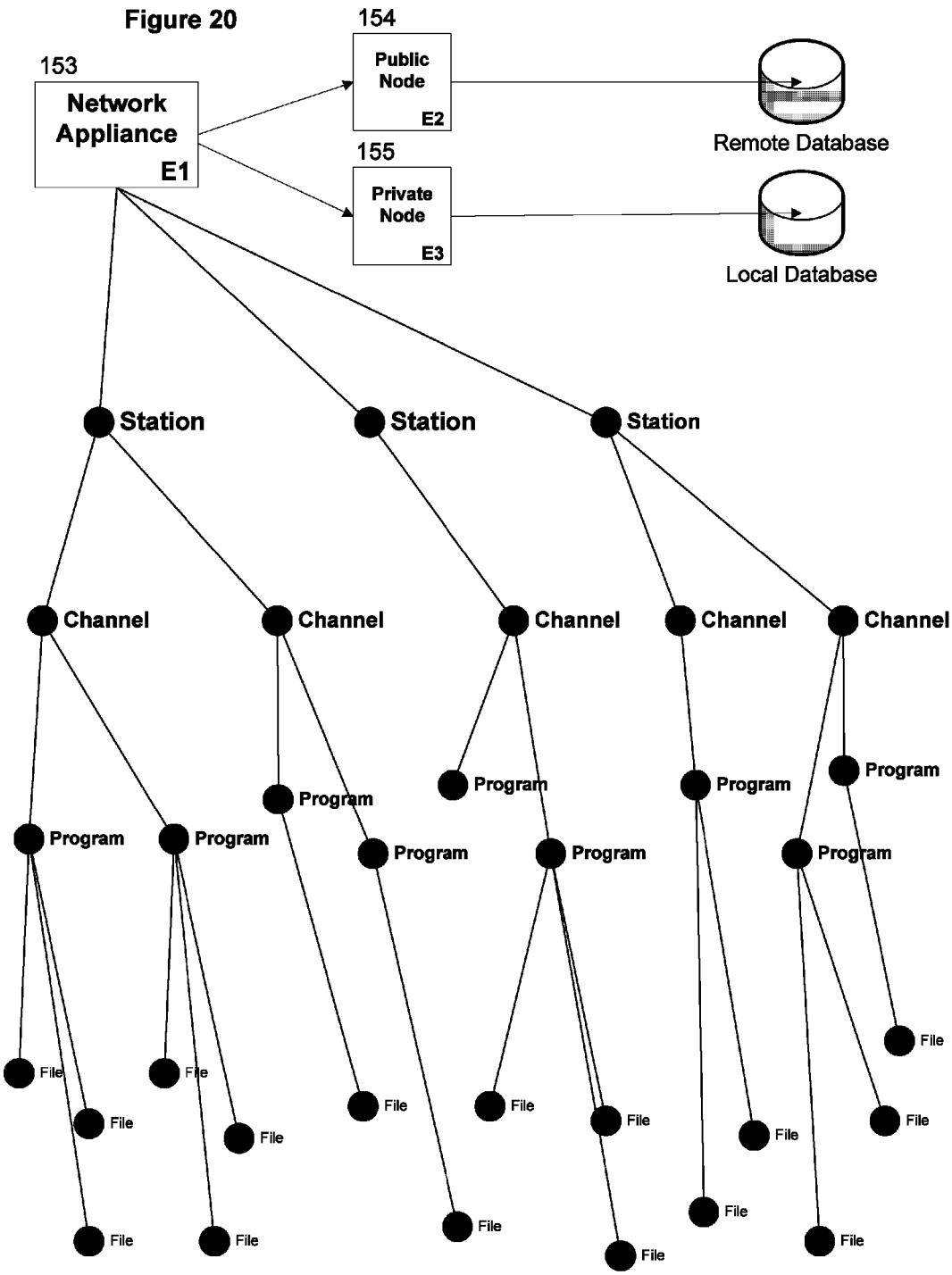
FIG. 20 illustrates a network appliance that is connected as part of a network node.

In FIG. 20, Appliance Integration 48 is further illustrated. Node E1 153 illustrates a network appliance as a device that is connected as part of a network node. Network appliance Nodes actively route data for the other networked devices as well as themselves. A network appliance can contain a top level network node (TNN): A grouping of one or more network elements (at one or more sites or networks) which provides network related functions and broadcast allocation nodes, and is administered as a single entity. A single site may contain more than one network node such a stations, channels, and programs. A network appliance can be public or private. A public Node E2 154 is connected to the central database and is a top level node in the broadcast network platform system. A public node can broadcast outside of its own network. A private appliance in Node E3 155 would have a self contained broadcast allocation node system to manage the broadcast network.

Figure 21:
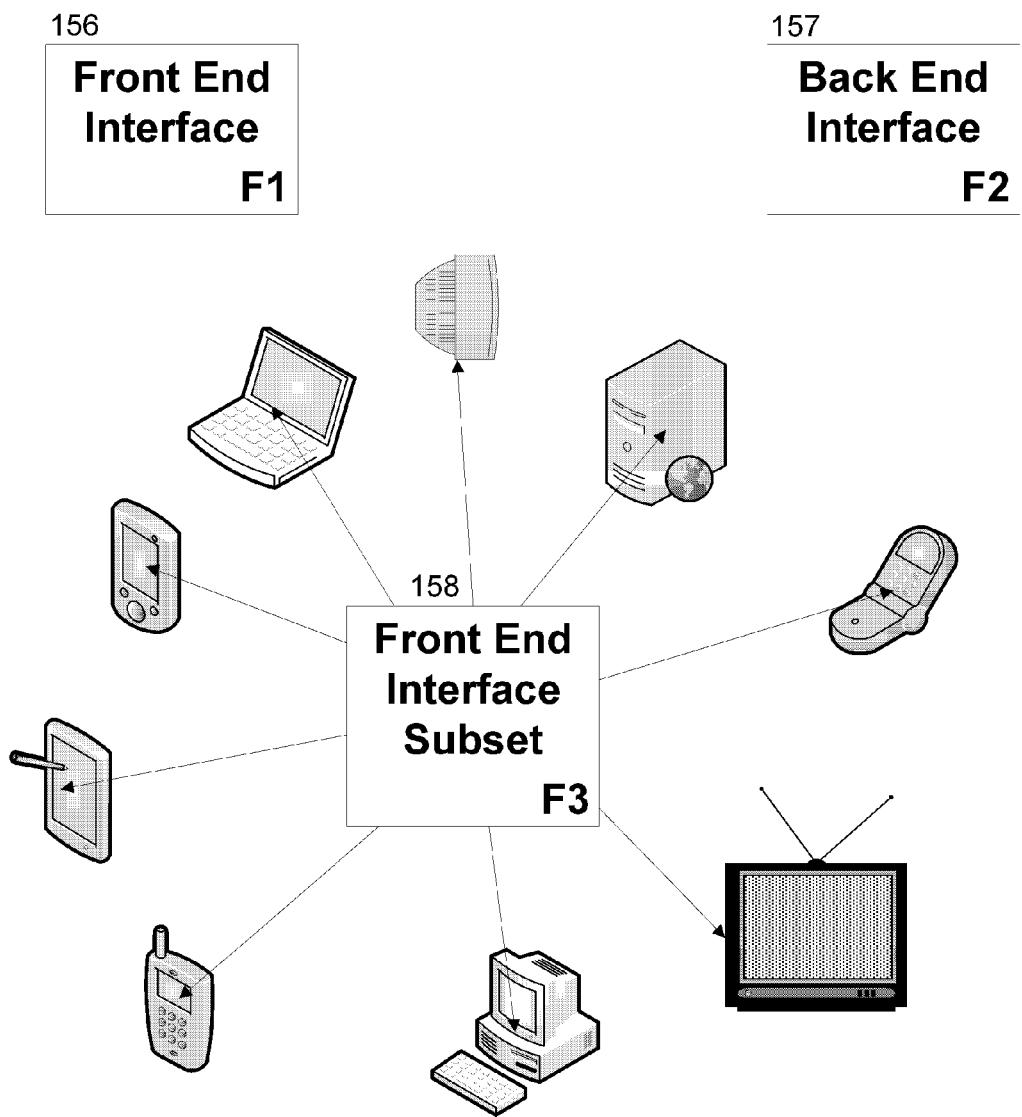
FIG. 21 illustrates the front and back ends used for device integration.

FIG. 21 further illustrates the device integration node 49. It illustrates network devices that can be computers, personal digital assistants (PDAs), cell phones, televisions, cable boxes, GPS location finding devices, etc. Where the front-end Node F1 156 and/or the back-end Node F2 157 interfaces can be viewed and used. A subset of the front end and back end interface can reside on the device for a customized integration as in Node F3 158. Another aspect of the invention is where the device is a location finding device and the search is conducted by the device itself by a predetermined criteria or method such as a GPS device providing videos based on location Metadata or other Metadata such as area code, address, postal code etc.

The following lists some of the features and advantages of the system:

The system also provides a number of other search capabilities to deliver search results having multiple data types, including text, icon, audio, video, and/or multimedia in relation to online documents or URLs.

The system displays a selection of views, which allow the User to view the multimedia in the repository in form of media players, search engines, rich media platforms, locational devices. The format may be multimedia, multimedia and text, icons, icons and text, icons and multimedia, text, or combinations of the foregoing.

The system also provides the ability to preview data associated with a potentially linkable Web site listed in the media window or search results screen, without linking directly to the Web site, by previewing a multimedia file from that linkable Web site on the media screen.

The searcher then has the option of linking to that Web site based on information delivered by the previewed multimedia file.

The user also has the ability to search using the numerical system in which a numerical index is used to access data, which is hierarchically in a station/channel/program/file structured environment. The user can directly access stations, channels, or programs using predefined numerical index numbers. The user can select the type of search results the user wishes to review from the foregoing list of possibilities.

The users can also cross-reference keyword searches by a numerical index system or categories of media classification.

The following is an example of how the Broadcast Network Platform System is used, which illustrates the features and advantages of the invention, which provides definitions of the various components and functions, and which discusses the various components of the system.

The Broadcast Network Platform System:

1—Broadcast Allocation Nodes

Administrative Application Background—The administrative application system has several modules.

Network Administration module is a module consisting of a network information entry form, where the information entered is then matched up to a parent network. A parent network consists of a:

A—Parent Network=Station. A Station is a "Top Node" for the broadcast network.

B—Affiliate Network=Channel. The Channel is a Network Node.

C—WWBN Directory Category Distribution Channel=Program. A Program is the Category or Topic Node.

D—Destination File=Media File. A File is the Numerical representation of the media file taking into account all previous nodes.

Example

| | | |
|---|---|---|
| TRIBUNE.COM | STATION | 5 |
| CHICAGOTRIBUNE.com | CHANNEL | 5.1 |
| CHICAGOTRIBUNE.com/employment/ | PROGRAM | 5.1.1 |
| CHICAGOTRIBUNE.com/employment/medical/ | FILE | 5.1.1.1 |
| CHICAGOTRIBUNE.com/automotive/ | PROGRAM | 5.1.2 |
| CHICAGOTRIBUNE.com/automotive/dealers/ | FILE | 5.1.2.1 |
| CHICAGOTRIBUNE.com/realestate/ | PROGRAM | 5.1.3 |
| CHICAGOTRIBUNE.com/realestate/brokers/ | FILE | 5.1.3.1 |

As indicated above, the numerical indexing system of the invention does not relate to IP addresses at all. In fact it creates a layer on top of the IP address layer of the Internet.

The purpose of a Broadcast Network Platform System is to do NETWORK GROUPING of Associated Networks. Network grouping is important because soon the Internet will be too big to search site by site. Because of that, the invention provides a system for Network Grouping with the Broadcast Network Platform System.

By way of example, the following illustrates several networks:
Tribune Interactive Network
Scripps Network Each network can have multiple websites such as newspapers and TV stations.

The following examples illustrates a preferred embodiment of the numerical indexing used to identify and select stations, channels, and programs:

Example 1

Tribune Network

Where the Tribune Owns the Chicago Tribune and the Los Angeles Times

| | | |
|---|---|---|
| TRIBUNE.COM | STATION | 5 |
| CHICAGOTRIBUNE.com | CHANNEL | 5.1 |
| CHICAGOTRIBUNE.com/employment/ | PROGRAM | 5.1.1 |
| CHICAGOTRIBUNE.com/employment/medical/ | FILE | 5.1.1.1 |
| CHICAGOTRIBUNE.com/automotive/ | PROGRAM | 5.1.2 |
| CHICAGOTRIBUNE.com/automotive/dealers/ | FILE | 5.1.2.1 |
| CHICAGOTRIBUNE.com/realestate/ | PROGRAM | 5.1.3 |
| CHICAGOTRIBUNE.com/realestate/brokers/ | FILE | 5.1.3.1 |
| LosAngelesTimes.com | CHANNEL | 5.2 |
| LosAngelesTimes.com/employment/ | PROGRAM | 5.2.1 |
| LosAngelesTimes.com/employment/accounting/ | FILE | 5.2.1.1 |
| LosAngelesTimes.com/automotive/ | PROGRAM | 5.2.2 |
| LosAngelesTimes.com/automotive/carsforsale/ | FILE | 5.2.2.1 |

Example 2

Scripps Network

Where SCRIPPS owns COMMERCIALAPPEAL and TCPALM

| | | |
|---|---|---|
| SCRIPPS.COM | STATION | 7 |
| COMMERCIALAPPEAL.com | CHANNEL | 7.1 |
| COMMERCIALAPPEAL.com/employment/ | PROGRAM | 7.1.1 |
| COMMERCIALAPPEAL.com/automotive/ | PROGRAM | 7.1.2 |
| COMMERCIALAPPEAL.com/realestate/ | PROGRAM | 7.1.3 |
| TCPALM.com | CHANNEL | 7.2 |
| TCPALM.com/employment/ | PROGRAM | 7.2.1 |
| TCPALM.com/automotive/ | PROGRAM | 7.2.2 |

Example 3

Network

Where the Yahoo Corporation has Multiple Distribution Channels Under One Domain

| | | |
|---|---|---|
| Yahoo.com | STATION | 1 |
| Yahoo.com/shopping/ | CHANNEL | 1.1 |
| Yahoo.com/BillPay/ | CHANNEL | 1.2 |
| Yahoo.com/BillPay/Phone_Phone_Bills/ | PROGRAM | 1.2.1 |
| Yahoo.com/BillPay/Electric_Electric_Bills/ | PROGRAM | 1.2.2 |
| Yahoo.com/Videos/ | CHANNEL | 1.3 |

Example 4

Google Network

Where the GOOGLE Corporation with Multiple Distribution Channels as Sub Domains Under One Domain

| | | |
|---|---|---|
| GOOGLE.com | STATION | 3 |
| books.GOOGLE.com | CHANNEL | 3.1 |
| video.GOOGLE.com/ | CHANNEL | 3.2 |
| maps.GOOGLE.com/ | CHANNEL | 3.3 |
| images.GOOGLE.com/ | CHANNEL | 3.4 |

2—WWBN Broadcast Directory System

The broadcast directory system serves as a set of rules or guide line for the media content classified in the directory topic. From the root of the directory, rules are defined to lay the ground work for the following rules in the sub directories. Each broadcast Directory is presented with a broadcast directory content description and content guidelines to set the parameters.

Example

Broadcast Rules for: Classifieds

Broadcast Directory Content: Classifieds presentation and information videos, news videos and advertisement broadcast listings of print media classified advertisements.

Directory Broadcast Content Guidelines: Classifieds Broadcast Directory exists solely to broadcast classified advertisements in order to market, announce, sell and seek goods and services to businesses (B2B) and consumers (B2C), with a primary focus on newspaper broadcast networks, news and print media classifieds.

Broadcast Rules For: Classifieds: Employment & Careers

Broadcast Directory Content: Employment and Careers Classifieds presentation and information videos, news videos and advertisement videos based on and primarily focusing on employment and careers classified ads.

Directory Broadcast Content Guidelines: Employment and Careers Classifieds Broadcast Directory exists solely to broadcast advertisement videos for business to business (B2B) business to consumers (B2C), and consumer to consumer (C2C) employment and careers Broadcast Rules For: Classifieds: Employment & Careers: Accounting Broadcast Directory Content: Accounting Employment presentation and information videos, and advertisement videos based on classified ads primarily focusing on accounting employment opportunities.

Directory Broadcast Content Guidelines: Accounting Employment Broadcast Directory exists solely to provide information on business-to-business (B2B) and business-to-consumer (B2C) classifieds, with a primary focus on accounting employment opportunities.

Broadcast Directory Root

FIG. 22 illustrates the broadcast directory root.

Broadcast Directory Sample Root Broadcast Rules

FIG. 23 illustrates the broadcast directory sample root broadcast rules.

Broadcast SUB Directory Sample Root Broadcast Rules

Figure 24:
FIG. 24 illustrates a preferred embodiment of the webpage selection menu used to access the broadcast sub directory sample root broadcast rules in order to classify video within the system.

FIG. 24 illustrates the broadcast sub directory sample the broadcast rules.

Another unique feature provided by the invention is Automated Voice Over and Video Creation using the Broadcast Network Platform System. In particular, the present invention relates to a system that will enable users to produce videos automatically at a fraction of the cost. One aspect of this invention relates to an administrative media order form that enables users to add their media elements to the Broadcast Network Platform System.

One of the forms is a voice over text box where the user enters the voice over script. A voice type selector where the user can enter the Voice Type—Male, Female, No Preference. This is illustrated in detail in FIGS. 25 and 27.

Figure 27:
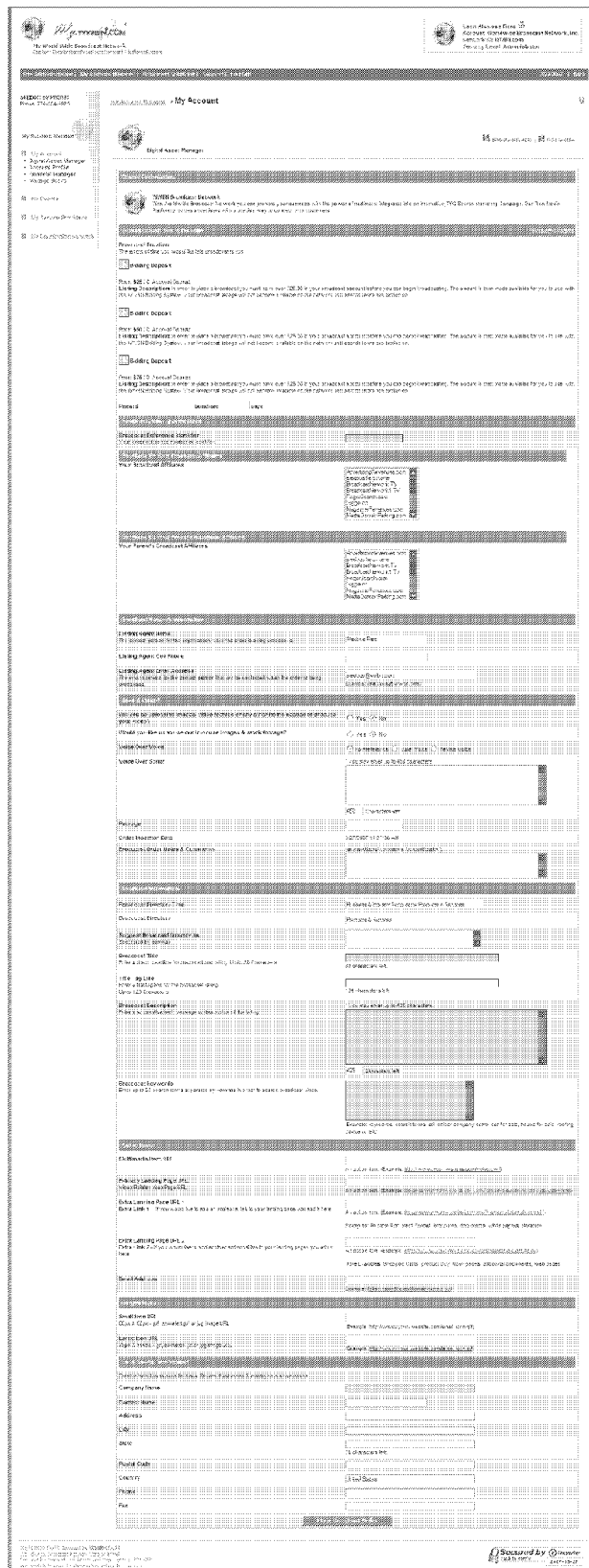
FIG. 27 illustrates a preferred embodiment of the webpage client input management form.

An images selector—Where the user can upload his video images or use pre-supplied in-house images for the video creation. This is illustrated in FIG. 27.

A Video selector—Upload video footage—Where the user can upload any video footage to insert into the video or use pre-supplied in-house video footage, or any combination of the above. This is illustrated in FIG. 27.

The system will then use a text to speech engine to produce the voice script in the voice over text box and incorporate any images and or video footage to create a video automatically for the user at minimal cost. In the preferred embodiment, the Bell Labs™ text to speech open source text to speech engine is used. However, those skilled in the art will recognize that any suitable text to speech technology may be used by the invention.

In FIG. 25, the video production webpage form is illustrated. This form provides the user with control over the content of video can be used.

FIG. 26A-B illustrates a preferred embodiment of the webpage selection menu used to select the distribution according to the user's affiliates, and other action items.

FIG. 27 illustrates a preferred embodiment of the webpage client agreement form.

Figures 28, 29:
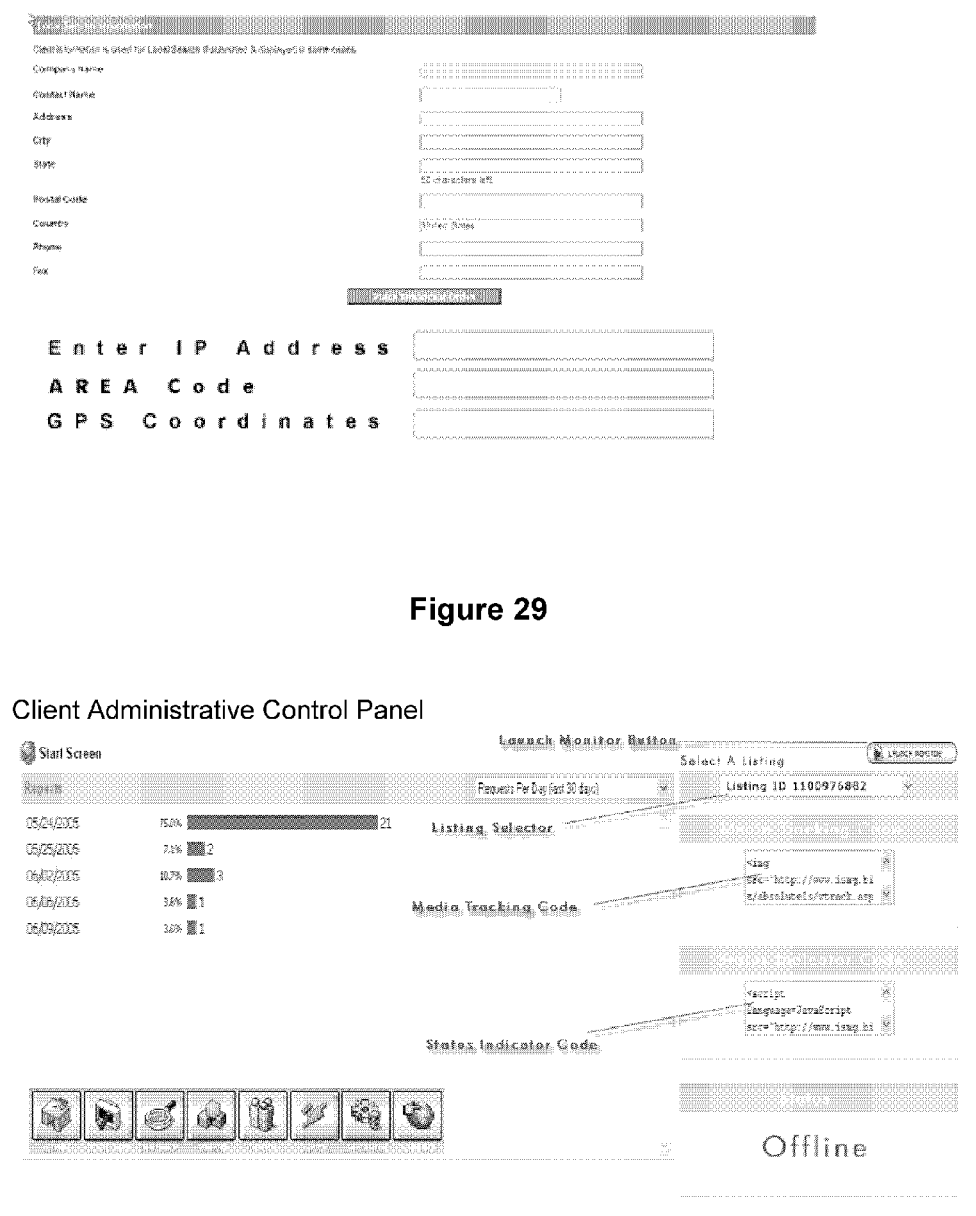

Another unique feature provided by the invention is a Locational Video Advertising System using an Area Wide Network and the Broadcast Network Platform System. In particular the present invention provides a system that enables a local transmitter to communicate through a specific frequency to a locational device. For example, a locational device can be a GPS-based device that uses standard GPS techniques. When the locational device comes within range of a transmitter, the user will be prompted to display local advertisements that are video based streamed from the Internet to the transmitter to the receiver on the locational device. Another aspect of this invention is that when the device displays a list of local results, the user will be optionally prompted to view videos of those results generated from a device source database or any third party database integrated with the locational device. The video data is transmitted from the Broadcast Network Platform System to the receiver via Internet or any other available area wide network. Those skilled in the art will understand that GPS is not the only location technology that can be used by the invention. An alternative embodiment of the invention uses a GEO IP database for determining the location on the locational device. Likewise, any other suitable technology can be used. FIG. 28 illustrates a preferred embodiment of a webpage menu that allows for input of location data.

Another novel feature of the invention is a Live Video Service/Live Search Communication System Using An Area Wide Network. The Video Service/Live Search Communication System enables Clients and Broadcasters to interactively communicate and provide content to Users and audiences using an area wide broadcast network. The Search Broadcast Communication System will provide the tools and structure to integrate to a Broadcast Network Platform System.

Tools available in the Broadcast Network Platform System include a Client Administration webpage as illustrated in FIG. 29. The Client Administrative Control Panel shown in FIG. 29 illustrates:

A Media Tracking Code: The Visitor Tracking Code is assigned to the Client media Listings automatically when a Listing is made and posted to the server. The Media Tracking Code is displayed with the media and sends a signal back to the server alerting the Client that the User at an IP address is looking at the Client's media file. The Media Tracking Code enables the Client to see who is watching his media via the Client Media Monitor. The media tracking code is a Java applet that that switches the online or offline indicators.

Figure 30:
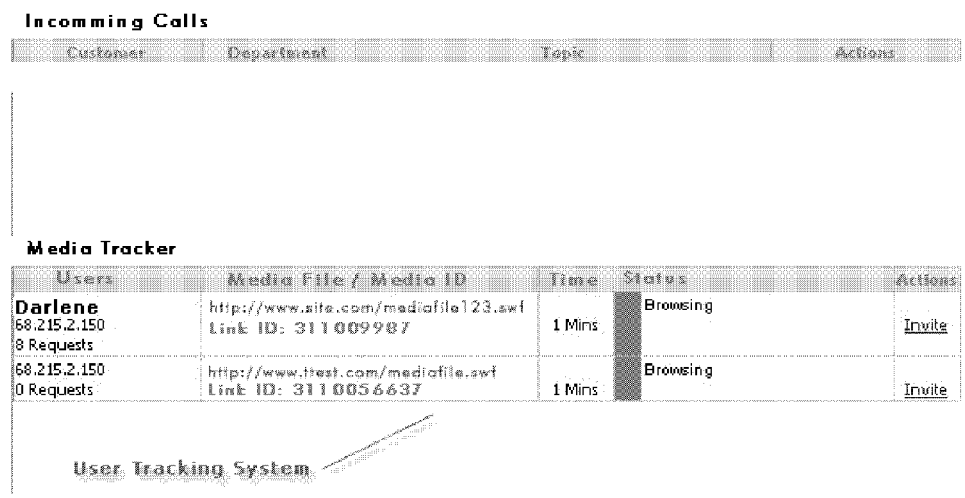
FIG. 30 illustrates a list of users currently viewing a video and locational information related each user.

The Launch Monitor Button: When the Client clicks on the Launch Monitor Button in FIG. 29, the Media Monitor opens. The media Monitor is illustrated in FIG. 30. The Media Monitor enables the client to Monitor Users who are watching his Media file through the Media Player Window. When the Media Monitor opens, the Status Indicators now will indicate that the Client is currently online and available to the Users via Status Indicators displayed on the search results page and in the Media Player Window.

Figure 31:
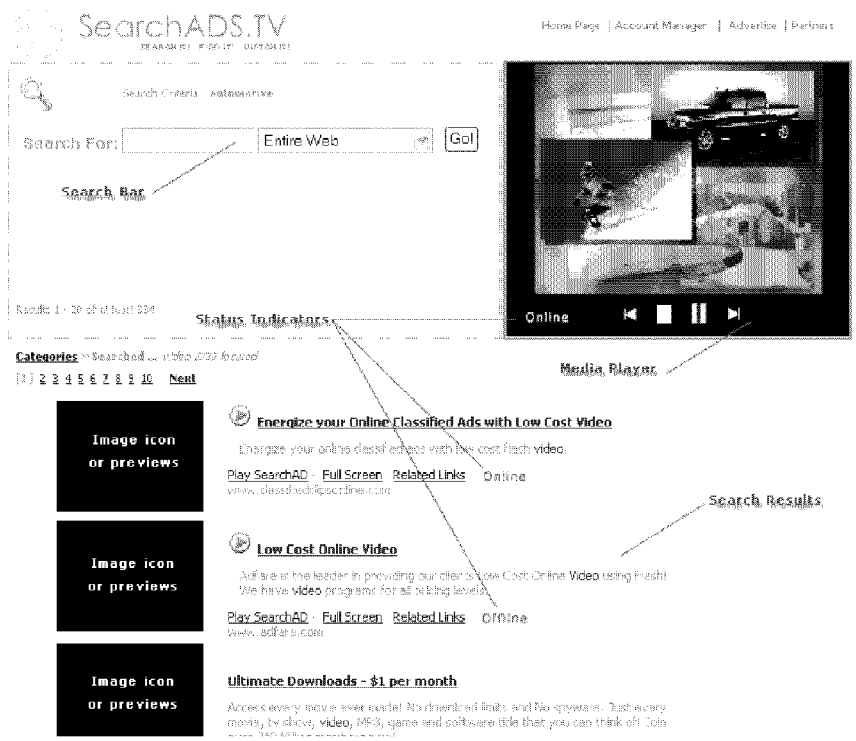
FIG. 31 illustrates a search results listing with live video service implemented, notifying the user if the owner of the content is online or offline with status indicators.
Figure 32:
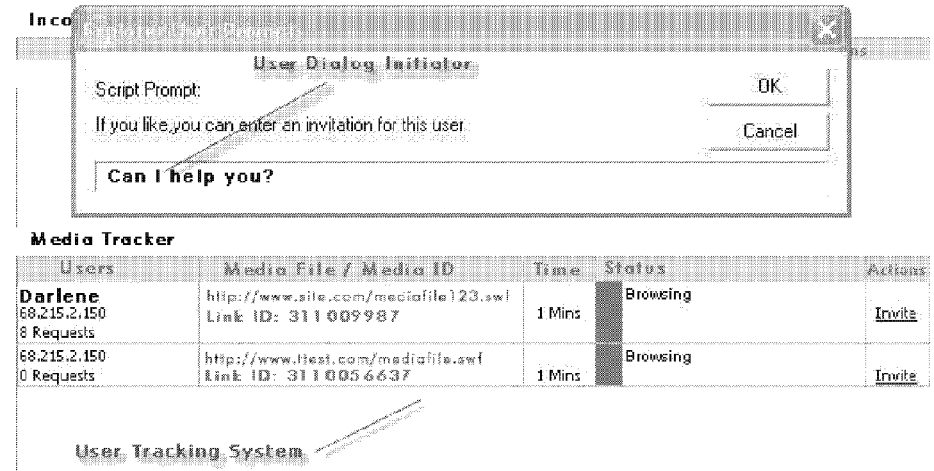
FIG. 32 illustrates an administrative view of the content owner's dialog form for communication with the viewer.
Figure 33:
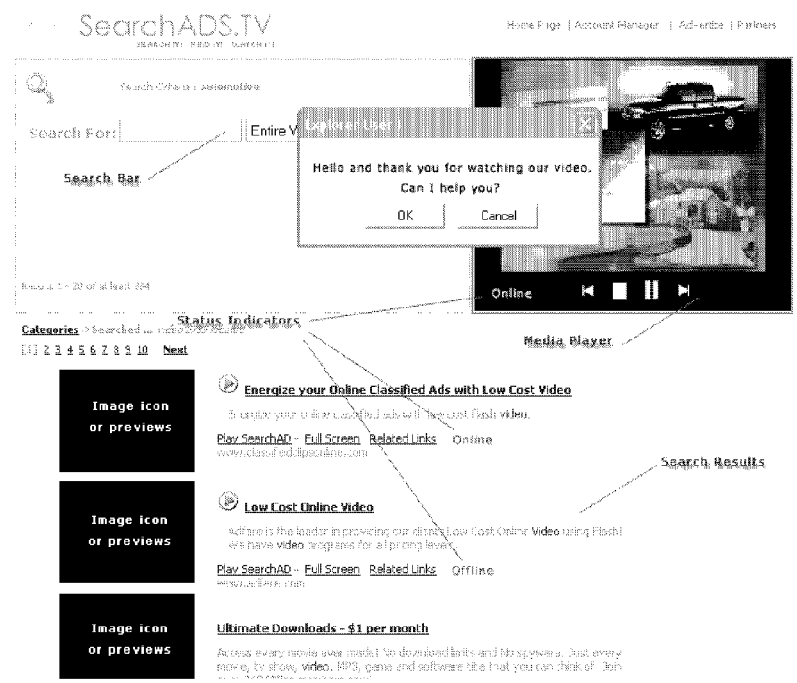
FIG. 33 illustrates a user's view of the dialog with the content owner.
Figure 34:
FIG. 34 illustrates a communications interface next to the video content.
Figure 35:
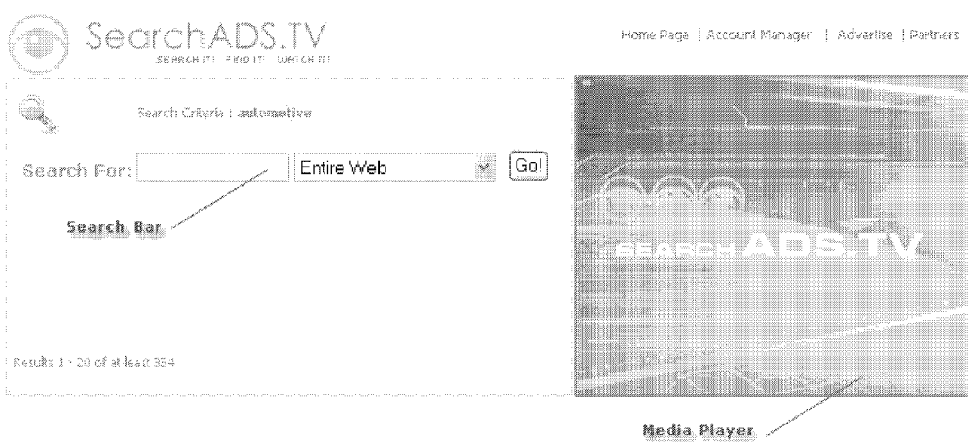
FIG. 35 illustrates the relation of the search bar and the media player.
Figure 36:
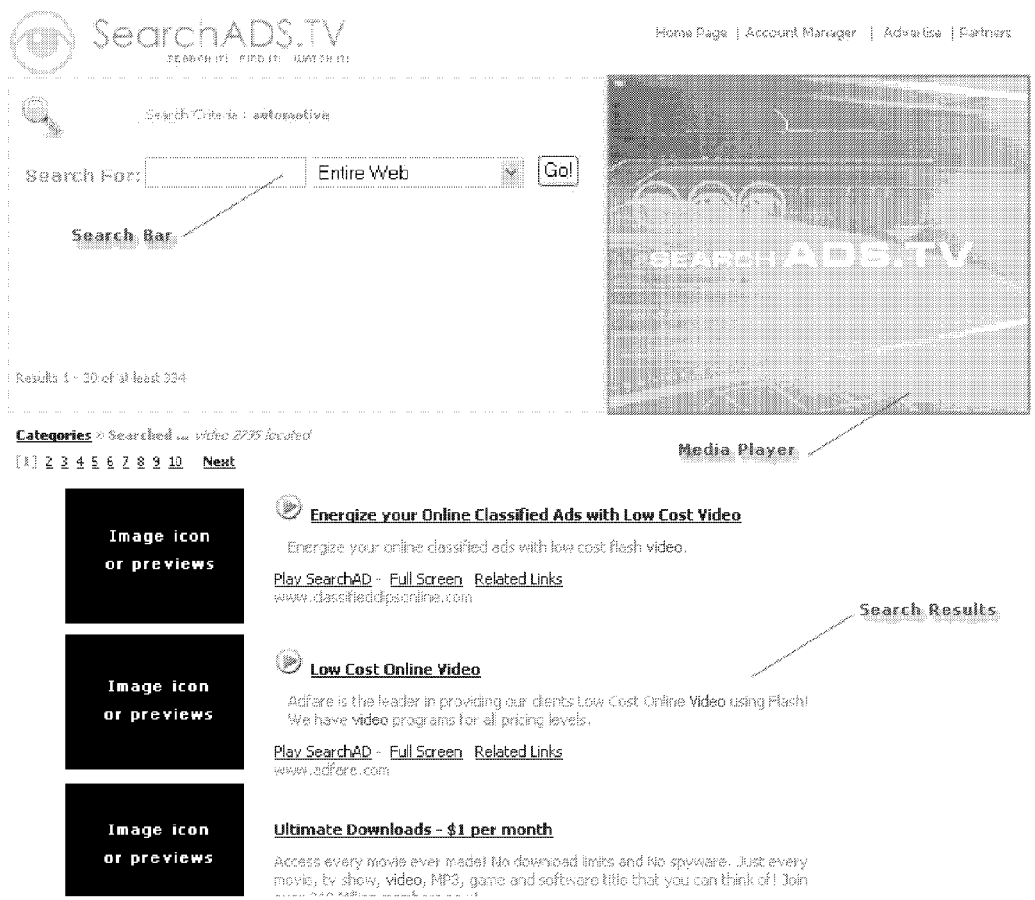
FIG. 36 illustrates the relation of the search bar and the media player and search results once a search is conducted.
Figure 37:
FIG. 37 illustrates status indicators to alert the user of the type of communication available to him.
Figure 38:
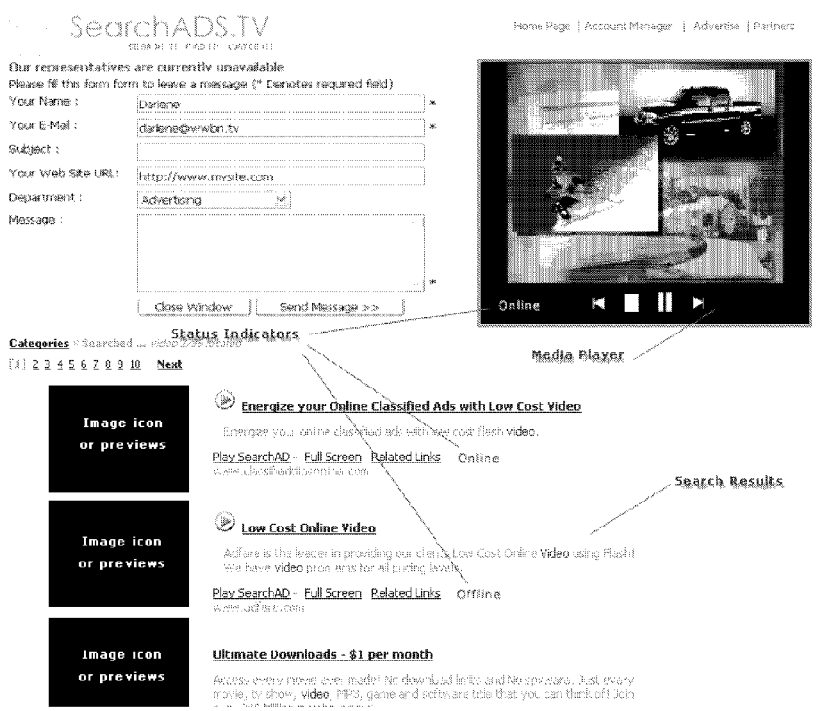
FIG. 38 illustrates the communication interface used when the content owner is not available (offline).
Figure 39:
FIG. 39 illustrates the communication interface used when the content owner is available (online).
Figure 43:
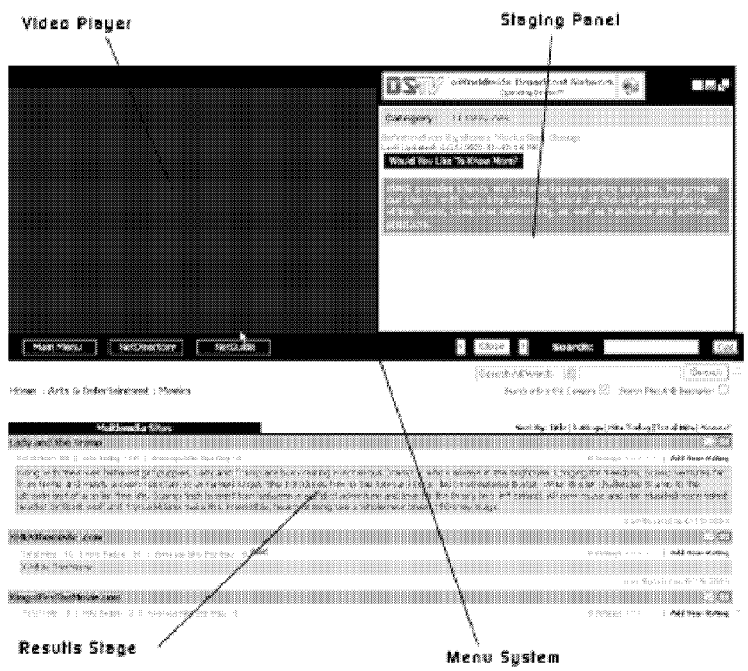
FIG. 43 illustrates one embodiment of the broadcast network platform system.

The figures also provide sample window images used to manage the system. For example, the media player window is illustrated in FIG. 31. FIGS. 32-33 illustrate the Client Initiated Dialog webpage. The client initiated dialog works as follows: FIG. 32 illustrates Step 1 of the Client Initiated Dialog: The Invitation Call Dialog. When the Client clicks on the Invite link (or button) to invite the User watching the client media file to a dialog. FIG. 33 illustrates Step 2 of the Client Initiated Dialog: On the User Interface: The User that is watching the media File belonging to the Client will receive a prompt displaying the Client Open Dialog Message and prompting the User for action. Click OK to initiate a dialog, click cancel to continue browsing through the media files in the search results list. FIG. 34 illustrates Step 3 of the Client Initiated Dialog: The User Interface. The User is presented with a communication interface that enables the User and the Client to enter into a text based chat session. When the User clicks OK in the Client Open Dialog Message the User is presented with a text based chat system. Enabling the User and the client to enter into a dialog session. The User Initiated Dialog operates as follows: In the Broadcast Network Platform System a User can input a search term and in return receive a list of rich media search results that can be viewed by the User before choosing to interact with the Client website. The user initiated dialogue works as follows: FIG. 35 illustrates Step 1 of the User Initiated Dialog: The User enters a search term into the search bar. FIG. 36 illustrates Step 2 of the User Initiated Dialog: Results are presented to the User. FIG. 37 illustrates Step 3 of the User Initiated Dialog: The user clicks on the play media button. The Media is displayed to the User through the Media Player Window. Once the media is displayed on the Media Player Window a signal is sent to the server alerting the Client that a User is viewing the media using the media Tracking Code. The Status Indicators will indicate to the user whether the Client is currently online monitoring the broadcast or if the Client is offline. FIG. 38 illustrates Step 4 of the User Initiated Dialogue: If the Client is Offline, the User will receive a form enabling the User to email that Client upon clicking on any "Offline" Client Status Indicators. FIG. 39 illustrates Step 5 of the User Initiated Dialog: If the Client is Online monitoring the broadcasts. The user can click on any Online Status Indicator in order to be presented with a private communication session with the Client. FIG. 40 illustrates Step 6 of the User Initiated Dialog: The User Interface. The User is presented with a communication interface that enables the User to call the Client and enter into a text based chat session with the Client.

Entering Into Dialog Overview: Once a User is viewing the rich media search results, the Client (Broadcaster, or content owner) can now view, from an administrative control panel, the User that is currently watching the rich media search results and thus offer to provide more information and initiate a chat session. While the session is in progress the Client can send in real time other rich media files to be viewed by the User as well as web content and other related file types.

The Client Communication Control Panel with 2 Way Communication: FIG. 41 illustrates Step 1 of the two way communications between the client and a user: The Client can send text messages to the User in order to assist, sell, or provide more information using the Client Communication Control Panel.

File Sharing: The send command enables the Client to push content to the User. The media files pushed to the User open in the media Player window enabling the Client to switch broadcasts and provide the User with more video content. The Push system sends the Media files to the media Player window. Image files, Website URLs or Email is Pushed to the User to open in a separate window. In essence the User could have been watching a video of a product, then the client can send him more videos of other products or more information on the same product, that will play automatically in the Media Player Window. The Client can also send PDF files such as product literature, Contracts etc., Website URLs to open a specific page on their site such as a payment gateway or product information and or image files. These file types will not open in the media Player Window, but will open in a separate window for the User to access.

Canned Exchanges: The system provides the ability for Clients to send Pre-recorded or preformatted messages to users. As shown in FIG. 42, a user can be directed to a specific website or file which contains desired information.

Another or in front of aspect of the invention is that it provides an Open System TV (OSTV) Desktop System Using An Area Wide Network. The present invention in this a system that enables computer owners, manufacturers, and others to place a brandable version of OSTV as it is presented herein. Will OSTV is an HTML interface that will enable users to watch television, record television, skip commercial with PVR functions and search commercials with multimedia output. The system supports Pay Per Click business models for everyone who watches an advertisement, where the advertiser pays per click when a user sees his commercial. In addition, the system supports Pay Per Broadcast business models for everyone who watches an advertisement, where the advertiser pays per broadcast when a user sees his commercial. Further, the model support Pay Per View business models for every one who watches a content providers video, where the user pays per click when a user sees his a broadcast. Finally, the system supports pay per listing on broadcasts.

Figure 44:
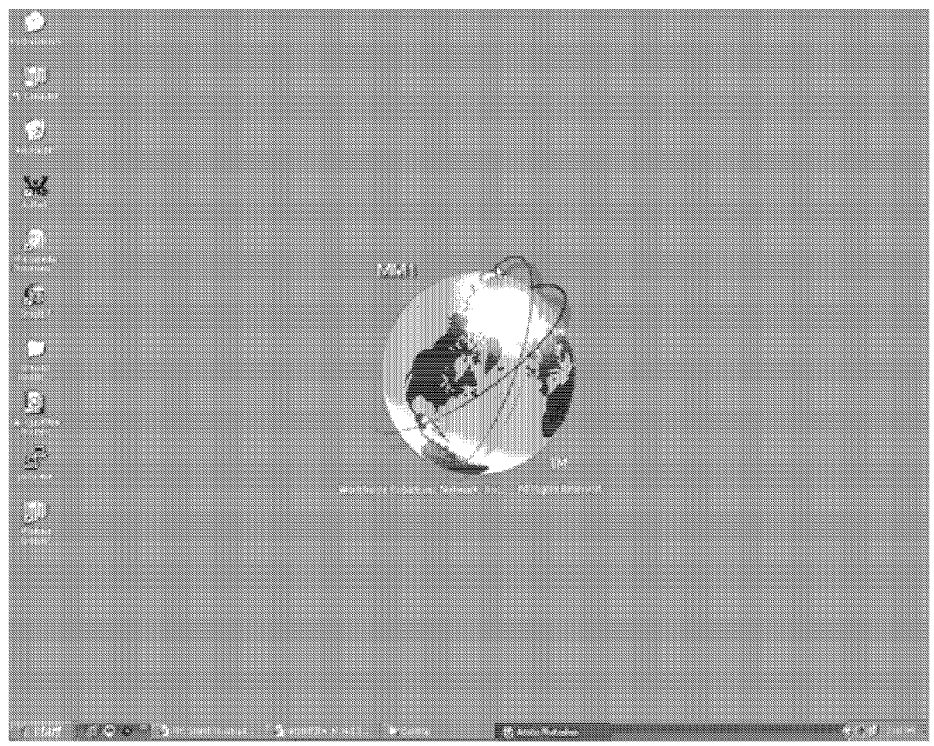
FIG. 44 illustrates a computer desktop.

Currently, when affiliates place the Broadcast Network Platform System on their website, they earn a revenue share on all clicks, PPC, PPS, PPB, PPL revenues earned from their sites or network. The current application related to the Broadcast Network Platform System proposes to make use of a computer systems desktop. At the present time computer manufacturers such as Dell™, Compaq™, Hewlett Packard™, Gateway™, etc. and operating system developers such as Microsoft Windows™, Apple Mac OSX™, and Linux™ with all their variations, etc. currently use a computer's desktop to present a branded image on the background and/or to create shortcuts to programs stored in their system directory, as displayed in FIG. 44.

The present convention proposes that the desktop become the broadcast platform enabling the computer to transform itself into OSTV—Open Systems Television. By embedding the OSTV platform into the desktop computers are provided with a method to view PPV & PreRoll broadcasts, videoconference, video commercials etc. right from their desktop. Users will be confronted with the OSTV interface when they start their system and while the system is on. Changing the roles of a PC from a personal computer as a primary role to that of an OSTV as a primary role. The video portion or player of OSTV can be switched to play in full screen mode as desired.

Figure 45:
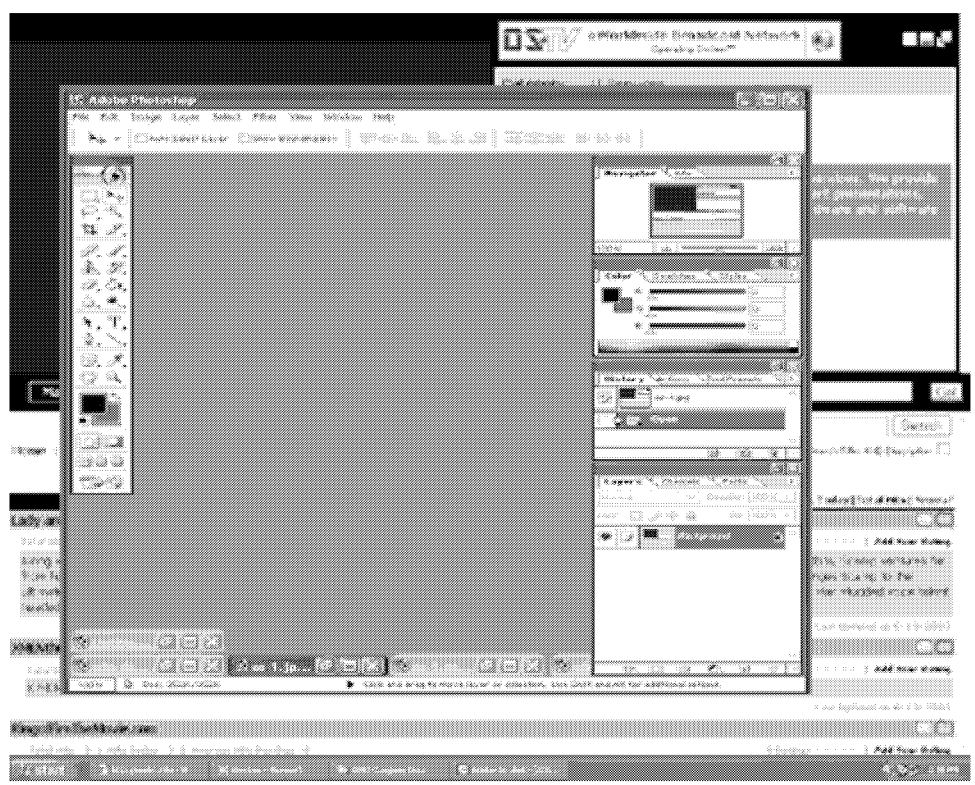
FIG. 45 illustrates a computer desktop and one embodiment of the broadcast network platform system implemented.

As shown in FIG. 45, users can still use the computer in a conventional manner from the task bar, start button, or drop downs (depending on the operating system) to access programs in their program directory. This figure illustrates how a program opens in a program interface window. Notice that the OSTV desktop does not in any way interfere with the application features of the operating system as the OSTV platform runs directly on the desktop behind all open windows. Conventional application programs and OSTV can run on the desktop without any interference from one another. OSTV performs as a broadcast network platform system on the desktop making available multitude of web based and system based applications from the OSTV Desktop interface. This enables computers and their users to have a more versatile operating system bringing web applications and services directly to their desktops. OSTV application can also open to full screen and sit on the desktop without interfering with the OSTV Desktop Platform System.

In addition, the following features and advantages are associated with OSTV: 1) When the system starts it is primarily an OSTV system. Presenting users with the OSTV platform on their Desktop. 2) The OSTV Desktop Platform can be customized to meet manufacturers needs in order for them to brand their companies. 3) It will provide computer vendors and software (Operating System) developers or manufacturers to earn new revenues with Pay Per Click search, video, Pay Per Vide Video, Pay Per Listing, and pay per broadcast models from every system or operating system they sell with the OSTV as their desktops. 4) It will enable computer manufacturers and software (Operating system) developers to provide custom programming to their users from the OSTV Desktop System. 5) It will enable computer manufacturers and software vendors (operating systems) to gain a captive audience from their customers who buy their computers and/or their operating systems. 6) The system transforms an otherwise dull desktop into an OSTV system that can generate revenues for vendors and provide a service channel to service those members directly from their desktop.

Figure 46:
FIG. 46 illustrates one embodiment of a Searchmercials interface. Where a list of search results is displayed illustrating title, description, play button, thumbnails, icons, calls for action related to a searchmercials.

FIG. 46 illustrates one embodiment of the searchmercials search results where the play button can be triggered by clicking on a button, icon or thumbnail. The Searchmercials title can trigger a searchmercial playback or a call to action. Call for actions displayed can consist of one or more calls for action depending on the device and device capabilities.

Figure 47:
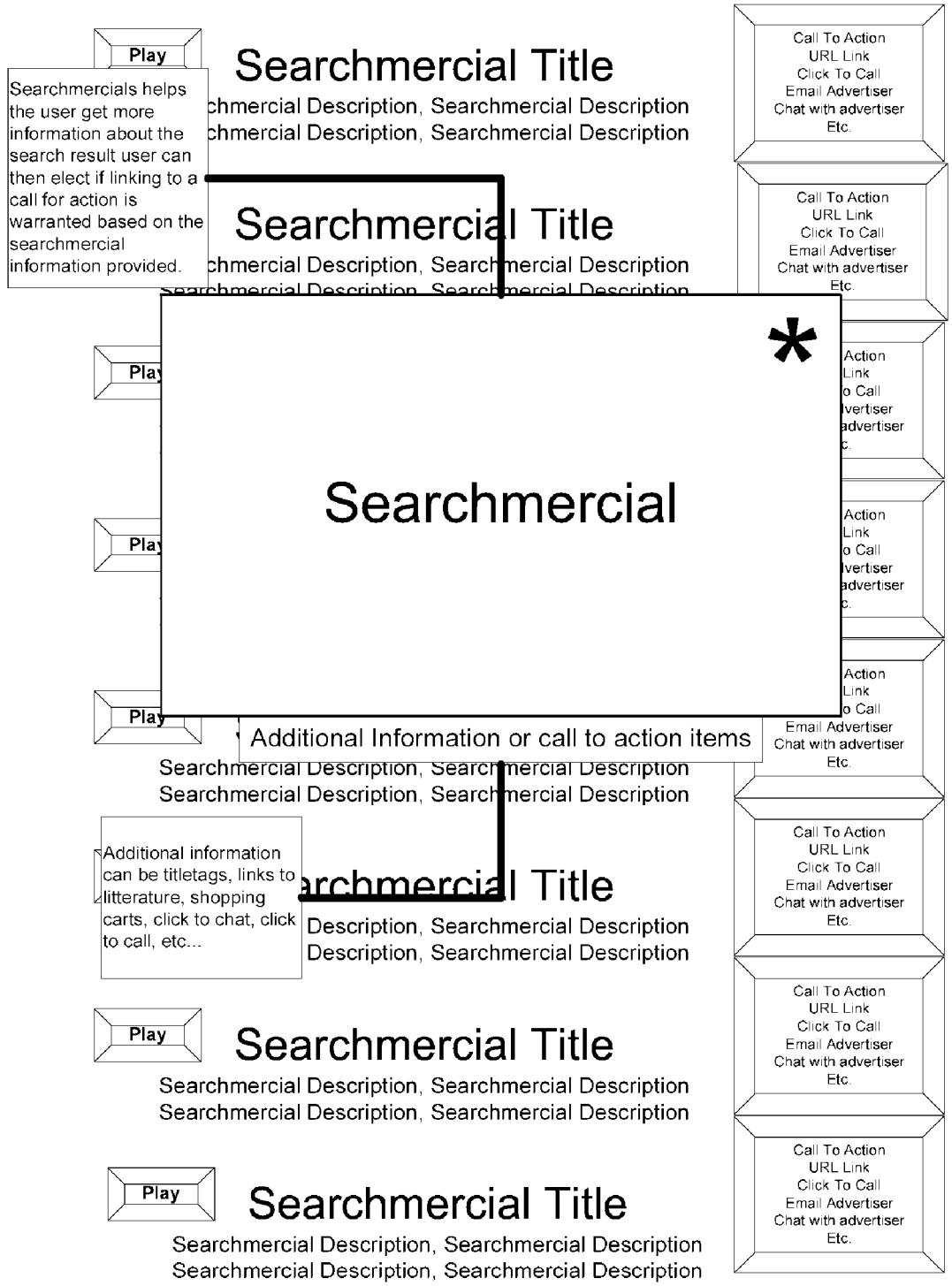
FIG. 47 illustrates a user requested searchmercials before clicking on a call to action.

FIG. 47 illustrates the same embodiment with searchmercials activated. Searchmercials helps the user get more information about the search result user can then elect if linking to a call for action is warranted based on the searchmercial information provided. Additional information can be title tags, links to literature, shopping carts, click to chat, click to call, etc. The searchmercials can be displayed as full screen video, layered video, or any other means of displaying a searchmercial.

Figure 48:
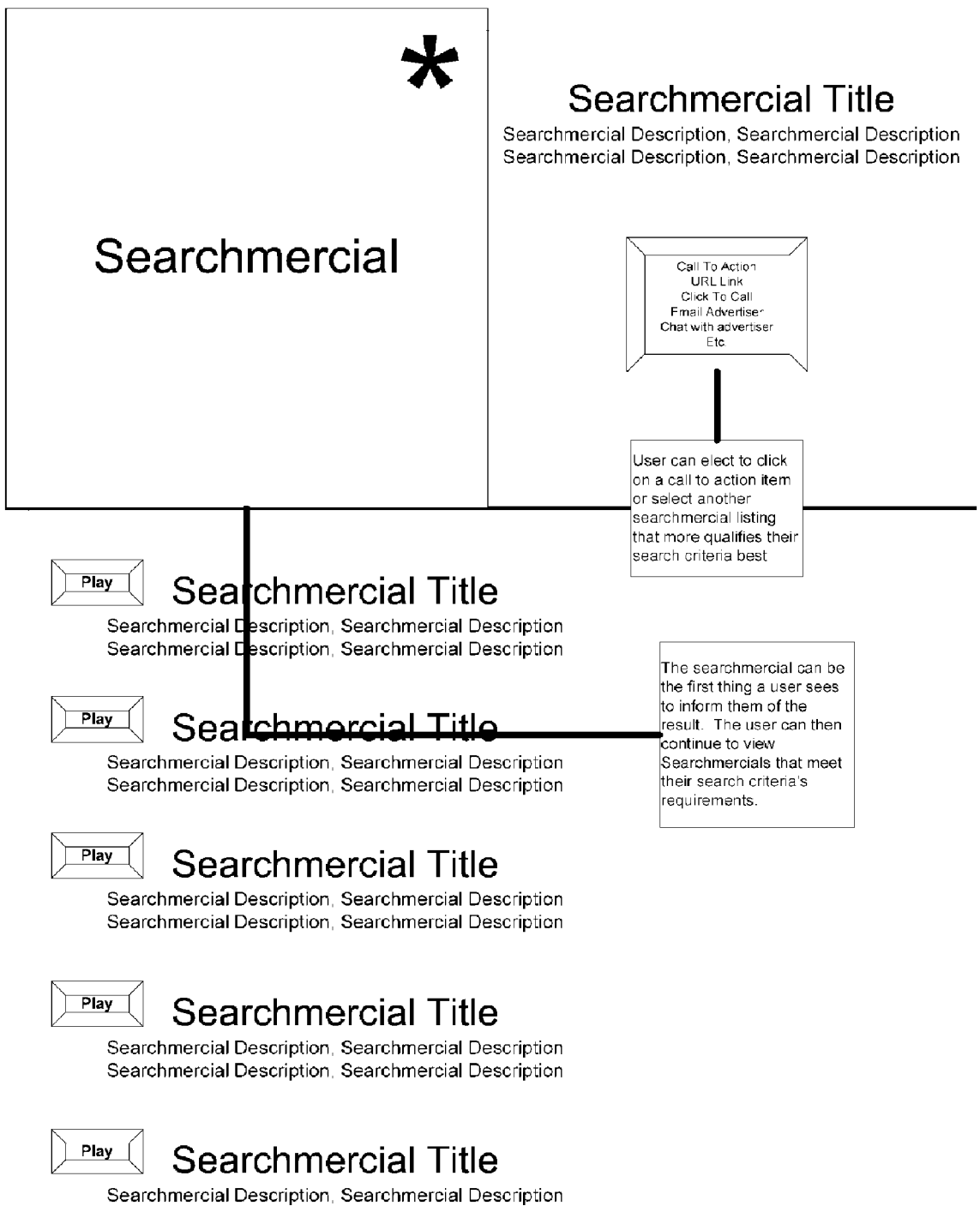
FIG. 48 illustrates another embodiment where the searchmercial that ranks first is displayed in a display window immediately without user interaction, giving the user the option to view other searchmercials before linking to a call for action.

FIG. 48 illustrates another embodiment where a searchmercial is displayed in a window beside the searchmercials search results and Metadata and calls for action are displayed beside the searchmercials video. Where the searchmercial can be the first thing a user sees to inform them of the result. The user can then continue to view Searchmercials that meet their search criteria's requirements.

FIG. 49 illustrates an embodiment where searchmercial results can be presented on other websites or text based search engines, blogs, widgets, operating systems, or devices using technologies such as JavaScript, flash or other available methods. Results are based on searches or content of the webpage translated into queries and in turn searchmercials results are displayed, results can also be based on other criteria and predetermined criteria such as locational, IP, geo, context, content and other criteria not mentioned.

Figure 50:
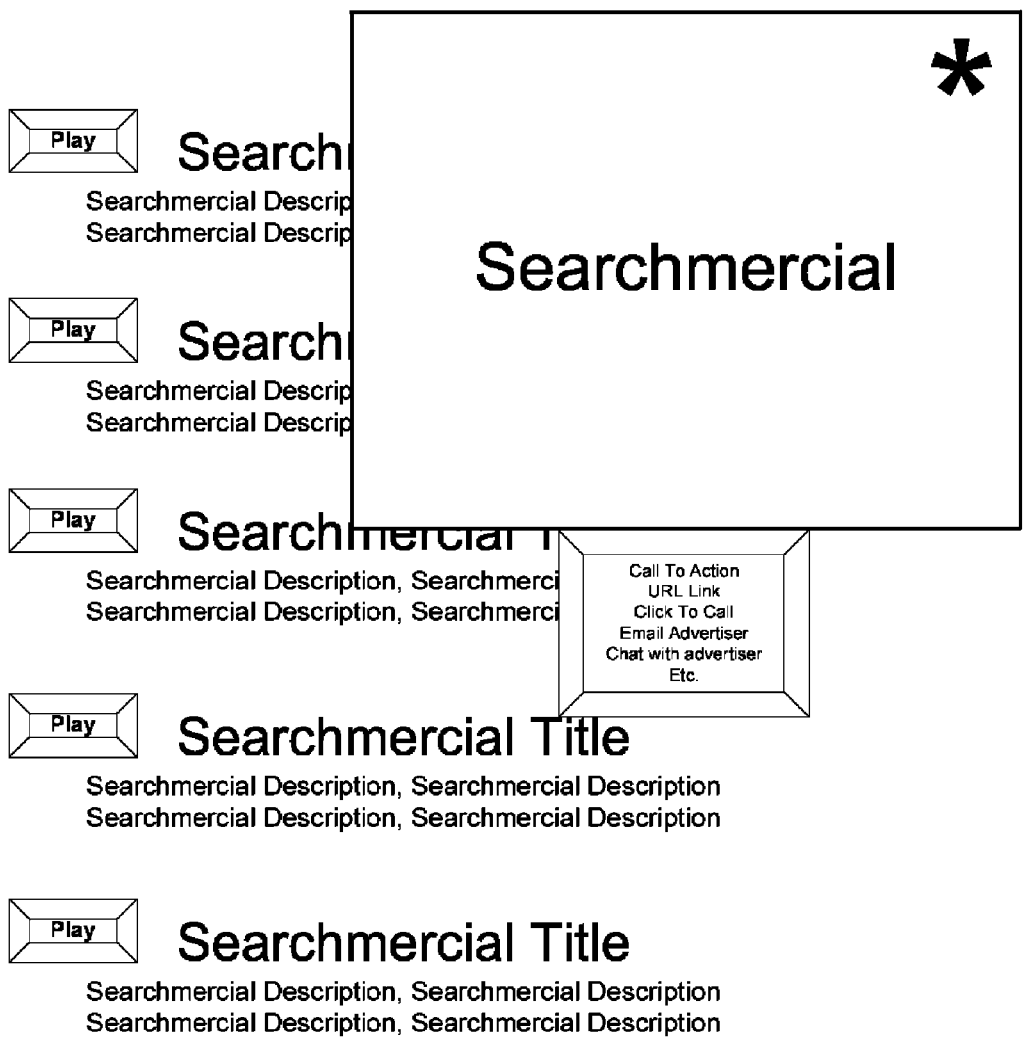
FIG. 50 illustrates the action item: On mouseover, onclick, on mouse down or instantaneously the Searchmercial can be activated providing a call to action options menu.

FIG. 50 illustrates the same embodiment where the searchmercials is activated. On mouse over, on click, on mouse down, instantaneously or other activation method the searchmercial can be activated providing a call to action options menu.

Figure 51:
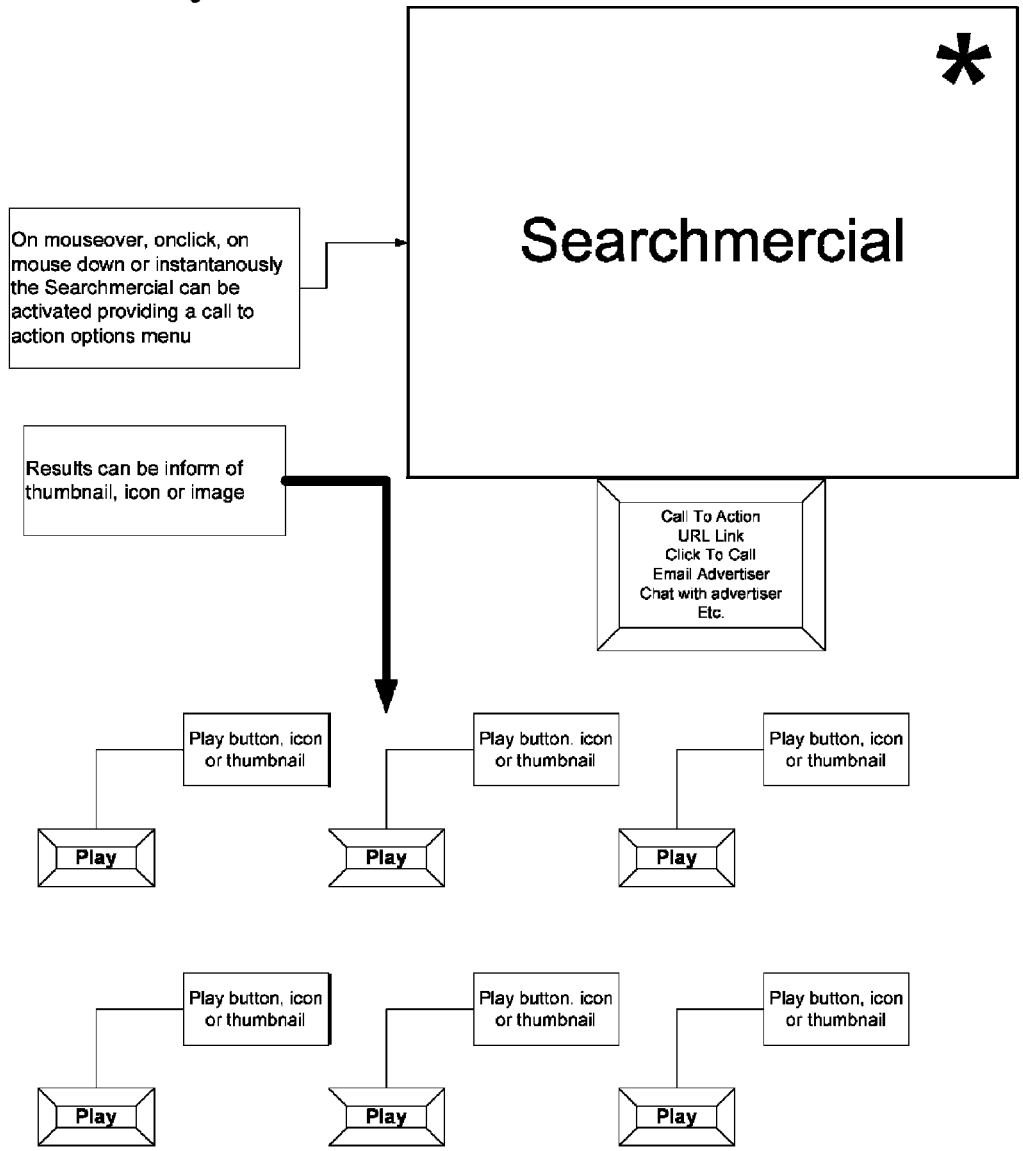
FIG. 51 illustrates illustrated thumbnails or icons representing searchmercials in an image view of the interface.

FIG. 51 illustrates the same embodiment where the searchmercials are represented by images, icons, thumbnails.

Figure 52:
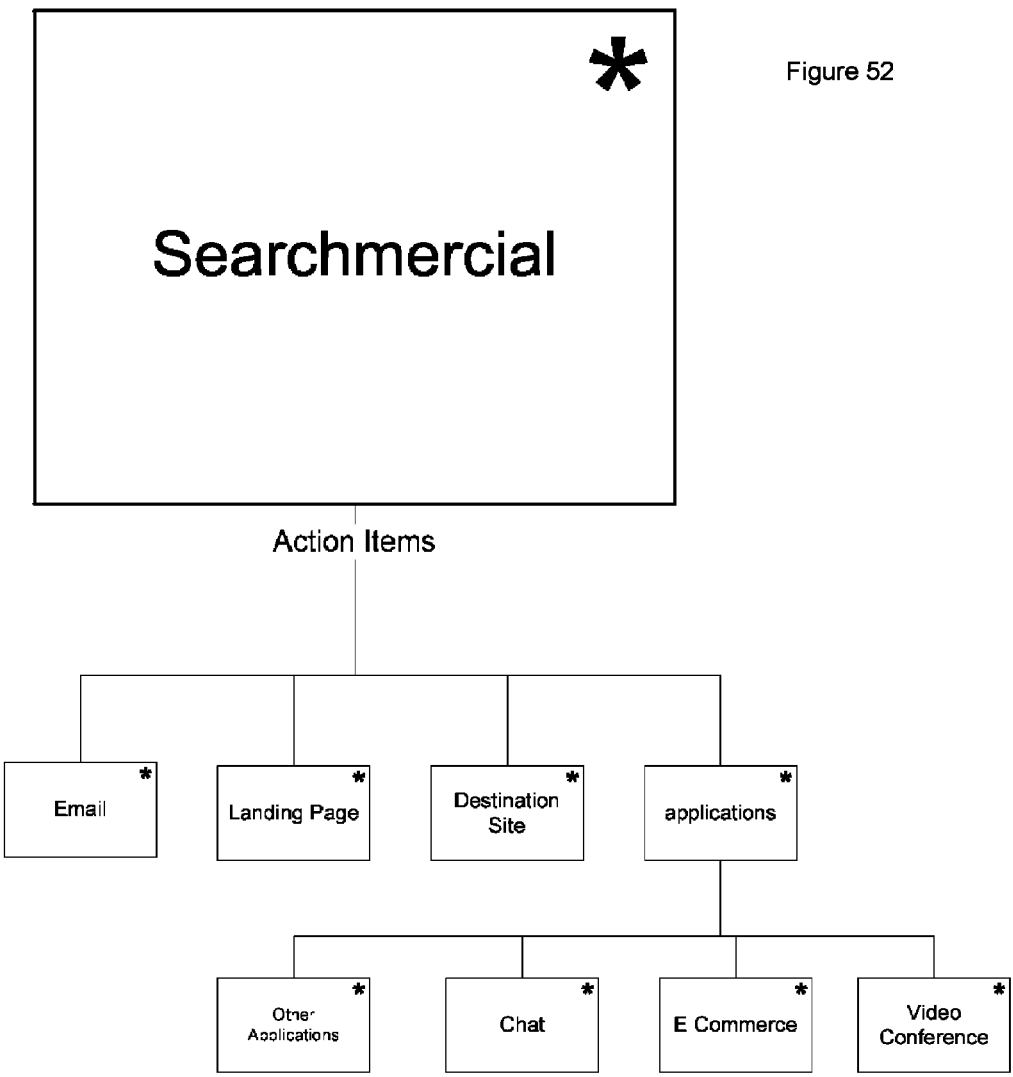
FIG. 52 illustrates the various calls to action such as landing pages, destination sites, email, and apps such as click to call, chat, etc.

FIG. 52 illustrated the various calls for action a searchmercial can consist of, but is not limited to, for example other calls for action not mentioned can be the mailing of a letter.

Figure 53A:
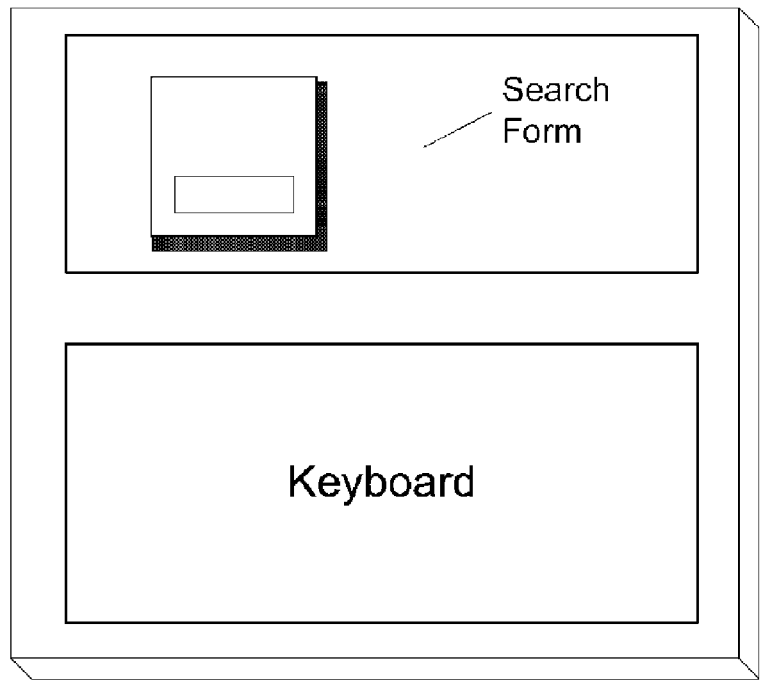
FIG. 53A-B illustrates a device search form interface and search results.

FIG. 53A illustrates a device with display and keyboard integrated. Those familiar with the art know that the keyboard can be physical keyboard or digital and the device can be a hand held, mobile, television, monitor, GPS, locational, or any other device that enables user input or predetermined inputs.

Figure 53B:
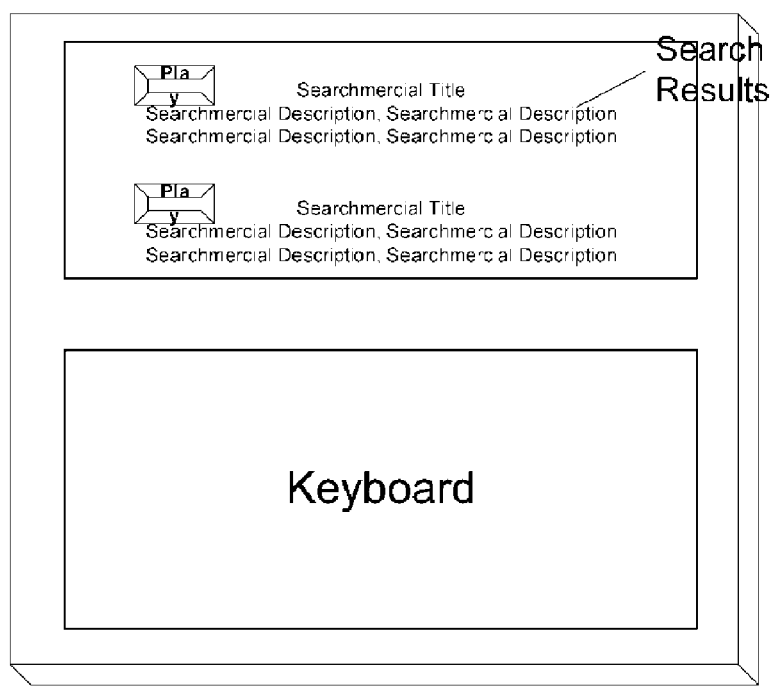

FIG. 53B illustrates the device displaying searchmercial results in the display.

Figure 54A:
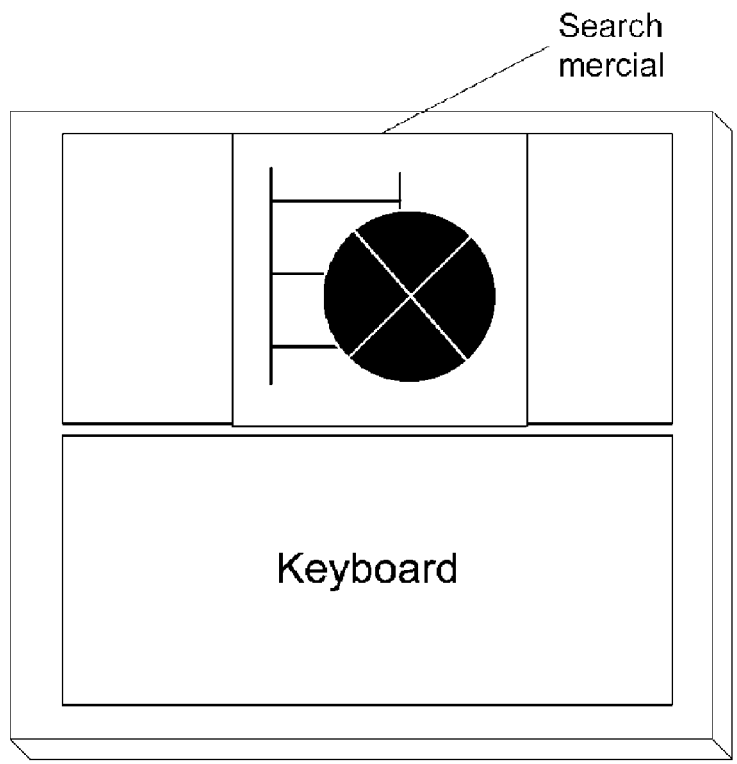
FIG. 54A-B illustrates a device presenting a searchmercials and a call for action.

FIG. 54A illustrates the device with a searchmercials playback on the display window.

Figure 54B:
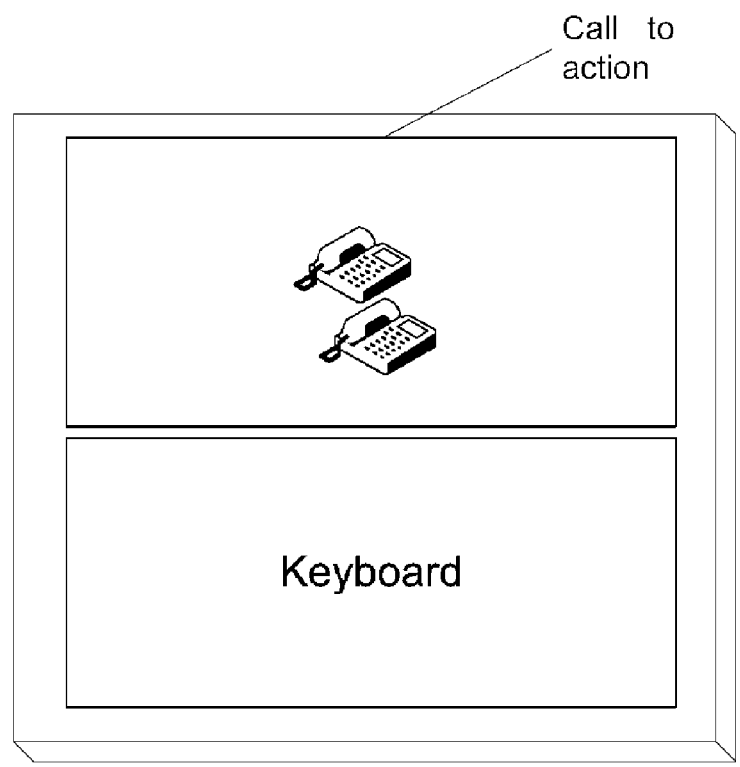

FIG. 54B illustrates a call for action in the display window. In this drawing the call for action is accentuated by a telephone image indicating that if this was a cell phone device the user would dial the number as a call to action on that specific device. Other calls for action can be presented depending on the device.

While the invention has been described with respect to a preferred embodiment thereof, it will be understood by those skilled in the art that various changes in detail may be made therein without departing from the spirit, scope, and teaching of the invention. Accordingly, the invention herein disclosed is to be limited only as specified in the following claims.

I claim:

1. A method for searching for audio/video to gather information, including the steps of:
   providing Metadata describing a audio/video having text data, image data, icon data, audio data, video data, and/or multimedia data and further including destination location information;
   inputting information from the Metadata to the search system;
   querying the information from the Metadata;
   using text data, image data, icon data, audio data, video data, and/or multimedia data types to represent audio/video result entries;
   displaying search results, as text data, image data, icon data, audio data, video data, and/or multimedia data types representing result entries related to at least one audio/video; and
   using information described in the audio/video to selectively link to a call for action;
   whereby the user can examine the audio/video containing information describing the objective of the audio/video in the search results list to determine if to a call to action is warranted without leaving the search results screen.

2. A method, as in claim 1, including the additional step of:
   using location information from the Metadata to selectably display audio/video multimedia data, and displaying the multimedia data on the search results screen.

3. A method, as in claim 2, including the additional steps of:
   associating location information from the audio/video data with text data, image data, icon data, and/or multimedia data; and
   selecting the text data, image data, icon data, and/or multimedia data or any combination of the data and using the associated audio/video information to determine if linking to the associated call to action is warranted.

4. A method, as in claim 3, including the additional steps of:
   updating information in the Metadata at a remote URL;
   remotely gathering information from the Metadata on the remote web site; and
   updating the database with information gathered from the Metadata under control of a client representing the remote web site;
   whereby the client determines the contents of the Metadata, and determines when the database is updated with the contents of the Metadata.

5. A method, as in claim 4, including the additional step of:
   using a management system, controlled by a user, to selectively categorize search results by using user input related to the Metadata to filter the search results.

6. A method, as in claim 5, including the additional steps of:
   accepting one or more user initiated queries;
   accepting one or more predetermined queries; and
   displaying one or more audio/videos content;
   wherein one or more user initiated or predetermined search criteria can be submitted to the system and related audio/videos search results can be displayed to the user.

7. A method, as in claim 6, including the additional steps of:
   inputting one or more calls to action items consisting of one or more URLs, landing pages, destinations sites, PDF files, literature, email addresses, presentations, phone numbers, or applications including chat, video conferences, text messaging, click to call, shopping carts, and/or order forms; and
   selecting one or more calls to action items per audio/video.

8. A method, as in claim 7, including the additional steps of:
   scheduling the display of audio/video listings by time of day;
   scheduling the display of a audio/video listing by location; and
   scheduling the display of audio/video listings by topic;

whereby an audio/video broadcast can be tailored to specific audiences at specific times, specific locations, and/or specific languages to achieve a call to action.

9. A method, as in claim 8, including the additional steps of:
displaying an audio/video listing by time of day;
displaying an audio/video listing by location; and
displaying an audio/video listing by topic;
whereby an audio/video user can view a message tailored to message to the user at specific times and specific locations to match the message with the audiences and languages to achieve a call to action.

10. A system for managing audio/video advertisements, and associated Metadata, comprising:
a database having video, audio, or media content specifically designed for advertising searches;
a search engine for searching the database, and producing a search results list including one or more entries representing advertisements formatted as text, image, audio, video, multimedia, and/or icon data;
display means to display the advertisements;
each advertisement further containing information describing the content of at least one call to action, wherein a call to action is a landing page, a click to call, or click to chat;
means to selectively initiate a call to action;
means to search the system with one or more user input search criteria comprising, search terms, categories and subcategories, content, and/or location data;
at least one media format is associated with the advertisement;
at least one of the audio/video advertisements is associated with one or more data sources;
the audio/video advertisements have multiple media formats for playback on multiple devices;
an advertising audio/video display window in the display means;
the system further comprises destination address data having a link address for advertising audio/video data; and
means to select the destination address data in the database and to present the advertising audio/video data to the multimedia display window;
whereby a user can selectively search the system and produce a list of results having at least one advertising audio/video result containing information describing an associated call to action in order to determine if initiating the call to action or using an optional call to action is warranted.

11. A system, as in claim 10, wherein:
each audio/video advertisement has at least one call to action; and
means to selectably link to a call to action provided by the advertising audio/video; and
a call for action is a URL for landing pages, destination sites, shopping carts, literature, video, conference, and/or chat.

12. A system, as in claim 11, further comprising:
an administrative interface having means to enter Metadata comprising title, description, media URLs, landing pages, address, phone numbers, locational data, IP Address and/or call for action options and associated Metadata;

the Metadata is located in a URL consisting of a feed or Metadata associated with at least one audio/video advertisement;
the Metadata includes information describing the source location of multimedia files associated with at least one audio/video advertisement, call to action URL such as landing pages, chat, email, click to call, and/or applications;
means to update the information in a database with the information contained in the Metadata; and
a client administration site, having means to update Metadata information associated with at least one audio/video advertisement;
whereby the Metadata relates to information associated with at least one audio/video advertisement.

13. A system, as in claim 12, further comprising:
means to automatically retrieve Metadata information from a remote URL, feed or a remote server;
means to schedule the update or retrieval of data;
the Metadata is located in a URL consisting of a feed or Metadata associated to at least one audio/video advertisement;
the Metadata includes information describing the source location of multimedia files associated with at least one advertising audio/video, call to action URL such as landing pages, chat, email, and/or click to call;
means to automatically retrieve Metadata information from a media file, remote URL, feed or a remote server;
means to access remote URLs, retrieve the Metadata information associated with the remote URLs, and store the Metadata information in the system; and
means to input a feed containing Metadata information, retrieve the updated Metadata information from the feed, and store the updated Metadata information in the system.

14. A system, as in claim 13, further comprising:
means to accept one or more user initiated queries;
means to accept one or more predetermined queries; and
means to display one or more audio/video advertisements;
wherein one or more user initiated or predetermined search criteria can be submitted to the system and advertising audio/video search results can be displayed.

15. A system, as in claim 14, further comprising:
means to input one or more calls to action items per audio/video advertisement, the calls to action consisting of one or more URLs, landing pages, destinations sites, PDF files, literature, email addresses, presentations, phone numbers, or applications including chat, video conferences, text messaging, click to call, shopping carts, and/or order forms; and
means to select one or more calls to action items per audio/video advertisement.

16. A system, as in claim 15, further comprising:
means to schedule the display of an advertising audio/video listing by time of day;
means to schedule the display of an advertising audio/video listing by location; and
means to schedule the display of an advertising audio/video listing by topic;
whereby an advertising audio/video campaign sends a message tailored to audiences at specific times and specific locations to achieve a call to action.

* * * * *